(12) United States Patent
Drake et al.

(10) Patent No.: US 9,862,881 B2
(45) Date of Patent: Jan. 9, 2018

(54) HYDROPHOBIC COATING OF PARTICULATES FOR ENHANCED WELL PRODUCTIVITY

(71) Applicant: Preferred Technology, LLC, Radnor, PA (US)

(72) Inventors: Kerry Drake, Radnor, PA (US); Spyridon Monastiriotis, Radnor, PA (US); Amr M. Radwan, Radnor, PA (US); Anthony P. Haddock, Radnor, PA (US); Robert Ray McDaniel, Radnor, PA (US); Andrew F. Nordquist, Radnor, PA (US)

(73) Assignee: PREFERRED TECHNOLOGY, LLC, Radnor, PA (US)

( * ) Notice: Subject to any disclaimer, the term of this patent is extended or adjusted under 35 U.S.C. 154(b) by 0 days.

(21) Appl. No.: 15/073,840

(22) Filed: Mar. 18, 2016

(65) Prior Publication Data

US 2016/0333258 A1 Nov. 17, 2016

Related U.S. Application Data

(60) Provisional application No. 62/160,786, filed on May 13, 2015, provisional application No. 62/197,916, filed on Jul. 28, 2015, provisional application No. 62/220,373, filed on Sep. 18, 2015, provisional application No. 62/237,182, filed on Oct. 5, 2015, provisional application No. 62/310,039, filed on Mar. 18, 2016.

(51) Int. Cl.
| | |
|---|---|
| *C09K 8/68* | (2006.01) |
| *E21B 43/267* | (2006.01) |
| *E21B 43/26* | (2006.01) |
| *C09K 8/80* | (2006.01) |
| *C09K 8/536* | (2006.01) |

(52) U.S. Cl.
CPC .............. *C09K 8/805* (2013.01); *C09K 8/536* (2013.01)

(58) Field of Classification Search
CPC ........ C08K 8/536; C09K 8/805; C09K 8/605; C09K 8/68; E21B 43/267; E21B 43/26
USPC ....................................................... 524/437
See application file for complete search history.

(56) References Cited

U.S. PATENT DOCUMENTS

| | | | |
|---|---|---|---|
| 2,163,972 A | 6/1939 | Anderson | |
| 2,366,007 A | 12/1944 | D'Alelio | |
| 2,653,089 A | 9/1953 | Bulson | |
| 2,823,753 A | 2/1958 | Henderson | |
| 3,020,250 A | 2/1962 | Norwalk | |
| 3,026,938 A | 3/1962 | Huitt | |
| 3,392,148 A | 7/1968 | Hunter | |
| 3,492,147 A | 1/1970 | Young et al. | |
| 3,763,072 A | 10/1973 | Krieger | |
| 3,805,531 A | 4/1974 | Kistner | |
| 3,817,939 A | 6/1974 | Allen et al. | |
| 3,837,892 A | 9/1974 | Marzocchi | |
| 3,900,611 A | 8/1975 | Corbett et al. | |
| 3,929,191 A | 12/1975 | Graham et al. | |
| 3,931,428 A | 1/1976 | Reick | |
| 3,971,751 A | 7/1976 | Isayama et al. | |
| 3,976,135 A | 8/1976 | Anderson | |
| 3,991,225 A | 11/1976 | Blouin | |
| 4,074,760 A | 2/1978 | Copeland et al. | |
| 4,102,703 A | 7/1978 | Tully | |
| 4,113,014 A | 9/1978 | Kubens et al. | |
| 4,177,228 A | 12/1979 | Prolss | |
| 4,199,484 A | 4/1980 | Murphey | |
| 4,252,655 A | 2/1981 | Carney | |
| 4,273,910 A | 6/1981 | Lederer | |
| 4,417,992 A | 11/1983 | Bhattacharyya et al. | |
| 4,439,489 A | 3/1984 | Johnson et al. | |
| 4,443,347 A | 4/1984 | Underdown et al. | |
| 4,465,815 A | 8/1984 | Chattha | |
| 4,493,875 A | 1/1985 | Beck et al. | |
| 4,518,039 A | 5/1985 | Graham et al. | |
| 4,547,469 A | 10/1985 | Jackson et al. | |
| 4,553,596 A | 11/1985 | Graham et al. | |
| 4,554,188 A | 11/1985 | Holubka et al. | |
| 4,580,633 A | 4/1986 | Watkins et al. | |
| 4,585,064 A | 4/1986 | Graham et al. | |
| 4,592,931 A | 6/1986 | Cargle | |
| 4,594,268 A | 6/1986 | Kirwin | |
| 4,632,876 A | 12/1986 | Laird et al. | |
| 4,680,230 A | 7/1987 | Gibb et al. | |
| 4,732,920 A | 3/1988 | Graham et al. | |
| 4,746,543 A | 5/1988 | Zinkan et al. | |
| 4,785,884 A | 11/1988 | Armbruster | |
| 4,792,262 A | 12/1988 | Kapps et al. | |

(Continued)

FOREIGN PATENT DOCUMENTS

| | | |
|---|---|---|
| CA | 1087833 A | 10/1980 |
| CA | 2423031 A1 | 10/2003 |

(Continued)

OTHER PUBLICATIONS

AkzoNobel Declaration of Compliance Bindzil CC401, Eka Chemical, Jan. 27, 2010, pp. 1-4.

(Continued)

*Primary Examiner* — Deve E Valdez
(74) *Attorney, Agent, or Firm* — Pepper Hamilton LLP

(57) ABSTRACT

Compositions and methods for coated or uncoated particulates, such as proppants, are provided that can, among other things, provide a hydrophobic surface that can enhance well productivity and other compositions and methods are disclosed.

22 Claims, 12 Drawing Sheets

(56) References Cited

U.S. PATENT DOCUMENTS

| | | |
|---|---|---|
| 4,801,635 A | 1/1989 | Zinkan et al. |
| 4,822,425 A | 4/1989 | Burch |
| 4,920,192 A | 4/1990 | Wiser-Halladay |
| 5,048,608 A | 9/1991 | Wiser-Halladay et al. |
| 5,073,195 A | 12/1991 | Cuthbert et al. |
| 5,092,404 A | 3/1992 | Falk et al. |
| 5,138,055 A | 8/1992 | Parekh |
| 5,181,957 A | 1/1993 | Gross et al. |
| 5,188,175 A | 2/1993 | Sweet |
| 5,194,174 A | 3/1993 | Roe et al. |
| 5,199,491 A | 4/1993 | Kutta et al. |
| 5,218,038 A | 6/1993 | Johnson et al. |
| 5,242,248 A | 9/1993 | Bramwell |
| 5,256,729 A | 10/1993 | Kutta et al. |
| 5,264,572 A | 11/1993 | Endo et al. |
| 5,330,836 A | 7/1994 | Buese et al. |
| 5,376,629 A | 12/1994 | Smith |
| 5,420,174 A | 5/1995 | Dewprashad |
| 5,422,183 A | 6/1995 | Sinclair et al. |
| 5,480,584 A | 1/1996 | Urano et al. |
| 5,582,249 A | 12/1996 | Caveny et al. |
| 5,597,784 A | 1/1997 | Sinclair et al. |
| 5,721,315 A | 2/1998 | Evans et al. |
| 5,728,302 A | 3/1998 | Connor et al. |
| 5,733,952 A | 3/1998 | Geoffrey |
| 5,824,462 A | 10/1998 | Ashida et al. |
| 5,837,656 A | 11/1998 | Sinclair et al. |
| 5,849,818 A | 12/1998 | Walles et al. |
| 5,856,271 A | 1/1999 | Cataldo et al. |
| 5,911,876 A | 6/1999 | Rose |
| 5,924,488 A | 7/1999 | Nguyen et al. |
| 5,955,144 A | 9/1999 | Sinclair et al. |
| 5,964,291 A | 10/1999 | Bourne et al. |
| 6,003,600 A | 12/1999 | Nguyen et al. |
| 6,071,990 A | 6/2000 | Yip et al. |
| 6,079,492 A | 6/2000 | Hoogteijling et al. |
| 6,093,469 A | 7/2000 | Callas |
| 6,093,496 A | 7/2000 | Dominguez et al. |
| 6,114,410 A | 9/2000 | Betzold |
| 6,127,308 A | 10/2000 | Slack et al. |
| 6,187,892 B1 | 2/2001 | Markusch et al. |
| 6,207,766 B1 | 3/2001 | Doi et al. |
| 6,270,692 B1 | 8/2001 | Geissler et al. |
| 6,306,964 B1 | 10/2001 | Evans et al. |
| 6,328,105 B1 | 12/2001 | Betzold |
| 6,372,842 B1 | 4/2002 | Grisso et al. |
| 6,387,501 B1 | 5/2002 | McCrary et al. |
| 6,406,789 B1 | 6/2002 | McDaniel et al. |
| 6,413,647 B1 | 7/2002 | Hayashi et al. |
| 6,439,309 B1 | 8/2002 | Matherly et al. |
| 6,486,287 B2 | 11/2002 | McGall et al. |
| 6,528,157 B1 | 3/2003 | Hussain et al. |
| 6,582,819 B2 | 6/2003 | McDaniel et al. |
| 6,632,527 B1 | 10/2003 | McDaniel et al. |
| 6,668,926 B2 | 12/2003 | Nguyen et al. |
| 6,705,400 B1 | 3/2004 | Nguyen et al. |
| 6,732,800 B2 | 5/2004 | Acock et al. |
| 6,756,124 B2 | 6/2004 | Kanamori et al. |
| 6,767,978 B2 | 7/2004 | Aubart et al. |
| 6,790,245 B2 | 9/2004 | Wolff et al. |
| 6,809,149 B2 | 10/2004 | Meyer et al. |
| 6,866,099 B2 | 3/2005 | Nguyen |
| 6,875,728 B2 | 4/2005 | Gupta et al. |
| 6,904,972 B2 | 6/2005 | Zhang et al. |
| 6,906,009 B2 | 6/2005 | Shinbach et al. |
| 6,913,080 B2 | 7/2005 | Lehman et al. |
| 7,012,043 B2 | 3/2006 | Klein et al. |
| 7,074,257 B2 | 7/2006 | Lockwood et al. |
| 7,078,442 B2 | 7/2006 | Brown |
| 7,129,308 B2 | 10/2006 | McGall et al. |
| 7,135,231 B1 | 11/2006 | Sinclair et al. |
| 7,153,575 B2 | 12/2006 | Anderson et al. |
| 7,157,021 B2 | 1/2007 | Bytnar et al. |
| 7,216,711 B2 | 5/2007 | Nguyen et al. |
| 7,244,492 B2 | 7/2007 | Sinclair et al. |
| 7,247,350 B2 | 7/2007 | Sepeur et al. |
| 7,261,156 B2 | 8/2007 | Nguyen et al. |
| 7,270,879 B2 | 9/2007 | McCrary |
| 7,281,580 B2 | 10/2007 | Parker et al. |
| 7,281,581 B2 | 10/2007 | Nguyen et al. |
| 7,318,472 B2 | 1/2008 | Smith |
| 7,318,474 B2 | 1/2008 | Welton et al. |
| 7,322,411 B2 | 1/2008 | Brannon et al. |
| 7,326,346 B2 | 2/2008 | Lovell et al. |
| 7,332,089 B2 | 2/2008 | Harjula et al. |
| 7,334,635 B2 | 2/2008 | Nguyen |
| 7,334,783 B2 | 2/2008 | Yoneyama et al. |
| 7,343,973 B2 | 3/2008 | Dusterhoft et al. |
| 7,344,783 B2 | 3/2008 | Shea |
| 7,350,571 B2 | 4/2008 | Nguyen et al. |
| 7,399,715 B2 | 7/2008 | Tsuchiya et al. |
| 7,407,010 B2 | 8/2008 | Rickman et al. |
| 7,528,096 B2 | 5/2009 | Brannon et al. |
| 7,537,702 B2 | 5/2009 | Lupton et al. |
| 7,624,802 B2 | 12/2009 | McCrary et al. |
| 7,678,872 B2 | 3/2010 | Glass et al. |
| 7,721,804 B2 | 5/2010 | Duenckel |
| 7,726,399 B2 | 6/2010 | Brannon et al. |
| 7,754,659 B2 | 7/2010 | Rediger et al. |
| 7,772,163 B1 | 8/2010 | Brannon et al. |
| 7,789,147 B2 | 9/2010 | Brannon et al. |
| 7,803,742 B2 | 9/2010 | Bicerano et al. |
| 7,884,043 B2 | 2/2011 | Lisetskiy et al. |
| 7,896,080 B1 | 3/2011 | Watters et al. |
| 7,919,183 B2 | 4/2011 | McDaniel et al. |
| 7,921,910 B2 | 4/2011 | Wilson et al. |
| 7,932,295 B2 | 4/2011 | Tsuchiya et al. |
| 7,999,013 B2 | 8/2011 | Brown |
| 8,006,754 B2 | 8/2011 | Bicerano |
| 8,006,755 B2 | 8/2011 | Bicerano |
| 8,052,890 B2 | 11/2011 | Nguyen |
| 8,133,587 B2 | 3/2012 | Rediger et al. |
| 8,183,179 B2 | 5/2012 | Garcia-Lopez De Victoria et al. |
| 8,236,738 B2 | 8/2012 | Zhang |
| 8,258,206 B2 | 9/2012 | Kanagasabapathy et al. |
| 8,298,667 B2 | 10/2012 | Smith et al. |
| 8,338,351 B2 | 12/2012 | Kanagasabapathy et al. |
| 8,349,911 B2 | 1/2013 | Kuehnle |
| 8,354,279 B2 | 1/2013 | Nguyen et al. |
| 8,360,149 B2 | 1/2013 | Hughes et al. |
| 8,431,220 B2 | 4/2013 | Wu et al. |
| 8,513,342 B2 | 8/2013 | Gao et al. |
| 8,524,441 B2 | 9/2013 | Zhang et al. |
| 8,592,015 B2 | 11/2013 | Bicker et al. |
| 8,763,700 B2 | 7/2014 | McDaniel et al. |
| 8,785,356 B2 | 7/2014 | Plotnikov et al. |
| 8,796,188 B2 | 8/2014 | Pisklak et al. |
| 8,800,658 B2 | 8/2014 | Zhang |
| 8,936,083 B2 | 1/2015 | Nguyen |
| 9,040,467 B2 | 5/2015 | McDaniel et al. |
| 9,097,996 B2 | 8/2015 | Hille |
| 9,487,692 B2 | 11/2016 | Nguyen et al. |
| 9,523,030 B2 | 12/2016 | Zhang |
| 2001/0014453 A1 | 8/2001 | McGall et al. |
| 2002/0048676 A1 | 4/2002 | McDaniel et al. |
| 2003/0102128 A1 | 6/2003 | Dawson et al. |
| 2003/0131998 A1 | 7/2003 | Nguyen et al. |
| 2003/0168217 A1 | 9/2003 | Zhang et al. |
| 2003/0196805 A1 | 10/2003 | Boney |
| 2003/0224165 A1 | 12/2003 | Anderson et al. |
| 2004/0010267 A1 | 1/2004 | Nakamura et al. |
| 2004/0023818 A1 | 2/2004 | Nguyen et al. |
| 2004/0129923 A1 | 7/2004 | Nguyen et al. |
| 2004/0138343 A1 | 7/2004 | Campbell et al. |
| 2005/0018193 A1 | 1/2005 | Chilese et al. |
| 2005/0019574 A1 | 1/2005 | McCrary |
| 2005/0028979 A1 | 2/2005 | Brannon et al. |
| 2005/0034861 A1 | 2/2005 | Saini et al. |
| 2005/0173116 A1 | 8/2005 | Nguyen et al. |
| 2005/0244641 A1 | 11/2005 | Vincent |
| 2005/0244658 A1 | 11/2005 | Bae et al. |
| 2005/0274523 A1 | 12/2005 | Brannon et al. |
| 2006/0035790 A1 | 2/2006 | Okell et al. |
| 2006/0073980 A1 | 4/2006 | Brannon et al. |

(56) References Cited

U.S. PATENT DOCUMENTS

| | | |
|---|---|---|
| 2006/0157243 A1 | 7/2006 | Nguyen |
| 2006/0241198 A1 | 10/2006 | Motz et al. |
| 2006/0243441 A1 | 11/2006 | Cornelius de Grood et al. |
| 2006/0260808 A1 | 11/2006 | Weaver et al. |
| 2006/0292345 A1 | 12/2006 | Dave et al. |
| 2007/0021309 A1 | 1/2007 | Bicerano |
| 2007/0034373 A1 | 2/2007 | McDaniel et al. |
| 2007/0036977 A1 | 2/2007 | Sinclair et al. |
| 2007/0066742 A1 | 3/2007 | Mhetar et al. |
| 2007/0073590 A1 | 3/2007 | Cosentino et al. |
| 2007/0079965 A1 | 4/2007 | Nguyen et al. |
| 2007/0088137 A1 | 4/2007 | Georgeau et al. |
| 2007/0161515 A1 | 7/2007 | Bicerano |
| 2007/0204992 A1 | 9/2007 | Davis et al. |
| 2007/0208156 A1 | 9/2007 | Posey et al. |
| 2007/0209794 A1 | 9/2007 | Kaufman et al. |
| 2007/0215354 A1 | 9/2007 | Rickman et al. |
| 2007/0228322 A1 | 10/2007 | Chaves et al. |
| 2007/0289781 A1 | 12/2007 | Rickman et al. |
| 2008/0011478 A1 | 1/2008 | Welton et al. |
| 2008/0063868 A1 | 3/2008 | Chung et al. |
| 2008/0087429 A1 | 4/2008 | Brannon et al. |
| 2008/0202744 A1 | 8/2008 | Crews et al. |
| 2008/0202750 A1 | 8/2008 | Rediger et al. |
| 2008/0230223 A1 | 9/2008 | McCrary et al. |
| 2008/0236825 A1 | 10/2008 | Barmatov et al. |
| 2008/0318812 A1* | 12/2008 | Kakadjian, Sr. ........ C09K 8/035 507/221 |
| 2009/0029097 A1 | 1/2009 | Riddle et al. |
| 2009/0044942 A1 | 2/2009 | Gupta |
| 2009/0176667 A1 | 7/2009 | Nguyen |
| 2009/0238988 A1 | 9/2009 | McDaniel et al. |
| 2010/0065271 A1 | 3/2010 | McCrary et al. |
| 2010/0147507 A1* | 6/2010 | Korte ................ A61L 24/043 166/118 |
| 2010/0196621 A1 | 8/2010 | Larson-Smith et al. |
| 2010/0212898 A1 | 8/2010 | Nguyen et al. |
| 2010/0282462 A1 | 11/2010 | Xu et al. |
| 2010/0286000 A1 | 11/2010 | Huang et al. |
| 2011/0016837 A1 | 1/2011 | Fischer et al. |
| 2011/0024129 A1 | 2/2011 | Turakhia et al. |
| 2011/0053809 A1 | 3/2011 | Sanders et al. |
| 2011/0120719 A1 | 5/2011 | Soane et al. |
| 2011/0160097 A1* | 6/2011 | Mirzaei ................ C09K 8/34 507/117 |
| 2011/0162837 A1 | 7/2011 | O'Malley et al. |
| 2011/0244125 A1 | 10/2011 | Weisenberg et al. |
| 2011/0272146 A1 | 11/2011 | Green et al. |
| 2011/0297383 A1 | 12/2011 | Tanguay et al. |
| 2012/0018162 A1 | 1/2012 | Tanguay et al. |
| 2012/0040194 A1 | 2/2012 | Kanai et al. |
| 2012/0122363 A1 | 5/2012 | Owens |
| 2012/0267112 A1 | 10/2012 | Zhang et al. |
| 2012/0277130 A1 | 11/2012 | Usova |
| 2012/0279703 A1 | 11/2012 | McDaniel et al. |
| 2012/0283153 A1 | 11/2012 | McDaniel et al. |
| 2012/0283155 A1 | 11/2012 | Huang et al. |
| 2012/0318514 A1 | 12/2012 | Mesher |
| 2012/0322925 A1 | 12/2012 | Arigo et al. |
| 2013/0005856 A1 | 1/2013 | Phonthammachai et al. |
| 2013/0037048 A1 | 2/2013 | Edgington et al. |
| 2013/0045901 A1 | 2/2013 | Bicerano |
| 2013/0048365 A1 | 2/2013 | Kim et al. |
| 2013/0065800 A1 | 3/2013 | McDaniel et al. |
| 2013/0081812 A1* | 4/2013 | Green ................ C09K 8/805 166/280.1 |
| 2013/0095276 A1 | 4/2013 | Dave et al. |
| 2013/0164449 A1 | 6/2013 | Tadepalli et al. |
| 2013/0178568 A1 | 7/2013 | Meuler et al. |
| 2013/0184381 A1 | 7/2013 | Bilodeau et al. |
| 2013/0186624 A1 | 7/2013 | McCrary et al. |
| 2013/0203917 A1 | 8/2013 | Harris et al. |
| 2013/0233545 A1 | 9/2013 | Mahoney et al. |
| 2013/0312974 A1 | 11/2013 | McClung, IV |
| 2014/0060826 A1 | 3/2014 | Nguyen |
| 2014/0060831 A1 | 3/2014 | Miller |
| 2014/0060832 A1 | 3/2014 | Mahoney et al. |
| 2014/0116698 A1 | 5/2014 | Tang et al. |
| 2014/0162911 A1 | 6/2014 | Monastiriotis et al. |
| 2014/0262247 A1 | 9/2014 | Duenckel et al. |
| 2014/0274819 A1 | 9/2014 | McCrary et al. |
| 2014/0305650 A1 | 10/2014 | Song et al. |
| 2014/0338906 A1 | 11/2014 | Monastiriotis et al. |
| 2015/0034314 A1 | 2/2015 | Hudson et al. |
| 2015/0119301 A1* | 4/2015 | McDaniel ............ C09K 8/805 507/224 |
| 2015/0175750 A1 | 6/2015 | Hopkins et al. |
| 2015/0196940 A1 | 7/2015 | Aizenberg et al. |
| 2015/0322335 A1 | 11/2015 | Lawrence |
| 2016/0137904 A1 | 5/2016 | Drake et al. |
| 2016/0177129 A1 | 6/2016 | McCarthy et al. |
| 2016/0251803 A1 | 9/2016 | Tuteja et al. |
| 2017/0015835 A1 | 1/2017 | Aizenberg et al. |
| 2017/0015892 A1 | 1/2017 | Nguyen et al. |

FOREIGN PATENT DOCUMENTS

| | | |
|---|---|---|
| CA | 2574808 C | 12/2010 |
| CN | 102203211 B | 12/2013 |
| CN | 103889706 A | 6/2014 |
| EP | 0207668 A1 | 1/1987 |
| EP | 0544303 A3 | 9/1993 |
| EP | 2440630 A1 | 4/2012 |
| EP | 2469020 A1 | 6/2012 |
| GB | 1294017 A | 10/1972 |
| WO | 2001033039 A1 | 5/2001 |
| WO | 2005075551 A1 | 8/2005 |
| WO | 2005121272 A1 | 12/2005 |
| WO | 2010049467 A1 | 5/2010 |
| WO | 2013048365 A1 | 4/2013 |
| WO | 2013112251 A1 | 8/2013 |
| WO | 2013158306 A1 | 10/2013 |
| WO | 2014144464 A2 | 9/2014 |
| WO | 2016144361 A1 | 9/2016 |
| WO | 2016176350 A1 | 11/2016 |

OTHER PUBLICATIONS

AkzoNobel Silane Modified Colloidal Silca Bindzil CC in Waterborne Coating Applications Use and Benefits, 2011, pp. 1-6.
Boster, Ronald S., A Study of Ground-Water Contamination Due to Oil-Field Brines in Morrow and Delaware; Counties, Ohio, With Emphasis on Detection Utilizing Electrical Resistivity Techniques, The Ohio State University,; 1967.
Cao et al., Mesoporous SiO2-supported Pt Nanoparticles for catalytic application, ISRN Nanomaterials, 2013, Article ID 745397, 7 pages.
CARBO Ceramics, Topical Reference, Physical Properites of Proppants, 2011, pp. 1-5.
EPA, Oil and Gas Extraction, Compliance and Enforcement History, Sector Notebook Project, Oct. 2000, pp. 115-155.
Halimoon, Removal of heavy metals from textile wastewater using zeolite, Environment Asia, 2010, 3(special issue):124-130.
Hui et al., Removal of mixed heavy metal ions in wasterwater by zeolite 4A and residual products from recycled coal fly ash, Jounal of Hazardous Materials, Aug. 1, 2005, vol. B124, pp. 89-101.
Huntsman, JEFFCAT Amine Catalysts for the Polyurethane Industry, Americas Region, 2010, pp. 1-4.
Huntsman, Performance Products, JEFFCAT catalysts for the polyurethane industry, Asia Pacific, 2010, pp. 1-6.
Huntsman, The JEFFAMINE Polyetheramines, 2007.
International Search Report and Written Opinion issued in PCT/US2012/036093 dated Aug. 14, 2012.
International Search Report and Written Opinion issued in PCT/US2012/047519 dated Nov. 2, 2012.
International Search Report and Written Opinion issued in PCT/US2012/053277 dated Nov. 20, 2012.
International Search Report issued in PCT/US2012/070844 dated Mar. 8, 2013.

(56) References Cited

OTHER PUBLICATIONS

Interstate Oil and Gas Compact Commission and All Consulting, A Guide to Practical Management of Produced; Water from Onshore Oil and Gas Operations in the United States, Oct. 2006.
Kuang et al., Controllable fabrication of SnO2-coated multiwalled carbon nanotubes by chemical vapor deposition, Carbon 2006 44(7):1166-1172.
Madaan and Tyagi, Quaternary pryidinium salts: a review, J Oleo Sci 2008 57(4):197-215.
Mellaerts et al., Enhanced release of itraconazole from ordered mesoporous SBA-15 silica materials, Chem Commun 2007 7(13):1375-7.
Notice of Allowance dated Dec. 22, 2015 in U.S. Appl. No. 13/626,055.
Official Action dated Nov. 30, 2015 from U.S. Appl. No. 14/798,774.
Polyurethanes, Ullmann's Encyclopedia of Industrial Chemistry, 2012, vol. 29.
Sanchez, Mariano, FRAC Packing: Fracturing for Sand Control, Middle East and Asia Reservoir Review, Nov. 8, 2007, pp. 37-49.
The removal of heavy metals cations by natural zeolites; retrieved from the Internet http://www.resultsrna.com/research/zeolite_binds_heavy_metals.php; Aug. 31, 2011.
Wikipedia, ion-exchange resin, en.wikipedia.org/wikiIon_exchange_resins, pp. 1-5.
Wikipedia, Methylene diphenyl diisocyanate, retrieved from the internet http://en.wikipedia.org/wiki/Methylene_diphenyl_diisocyanate; Jul. 21, 2011.
Wikipedia, Piezoelectricity, en.wikipedia.org.wiki/Piezoelectricity, pp. 1-15.
Wingenfelder et al., Removal of heavy metals from mine waters by natural zeolites, Environ Sci Technol, 2005, 39:4606-4613.
Non-Final Office Action dated Mar. 18, 2016 in U.S. Appl. No. 13/355,969.
Non-Final Office Action dated Apr. 5, 2016 in U.S. Appl. No. 14/314,573.
Non-Final Office Action dated Apr. 5, 2016 in U.S. Appl. No. 13/897,288.
Final Office Action dated May 27, 2016 in U.S. Appl. No. 13/837,396.
Non-final Office Action dated Dec. 6, 2016 in U.S. Appl. No. 14/673,340.
Notice of Allowance dated Dec. 8, 2016 in U.S. Appl. No. 14/314,573.
Dewprashad et al., Modifying the proppant surface to enhance fracture condictivity, Society of Petroleum Engineers 1999 SPE50733.
Weaver et al., Sustaining Conductivity, Society of Petroleum Engineers 2006 SPE98236.
Samuel et al., Gelled Oil: new chemistry using surfactants, SPE International 2005 SPE 97545.
Final Office Action dated Jan. 4, 2017 in U.S. Appl. No. 13/897,288.
Momentive Safety Data Sheet, 2015.
Non-final Office Action dated Feb. 17, 2017 in U.S. Appl. No. 14/713,235.
Notice of Allowance dated Oct. 31, 2016 in U.S. Appl. No. 13/355,969.
Notice of Allowance dated Nov. 9, 2016 in U.S. Appl. No. 14/015,629.
Chemicalland21, "Lauryl alcohol ethoxylates" Mar. 18, 2006, https://web.archive.org/web/20060318023334/http://www.chemicalland21.com/specialtychem/perchem/LAURYL%20ALCOHOL%20ETHOXYLATE.htm.
Ramirez et al., Synthesis of crosslinked and functionalized polystyrene by miniemulsion polymerization: particle size control, Macromex 2014.
Sigma-Aldrich, "Polybutadiene, hydroxyl terminated" Jun. 8, 2014, https://web.archive.org/web/20140608155646/http:product/aldrich/190799?lang=en&region=).
Notice of Allowance dated Aug. 8, 2016 in U.S. Appl. No. 13/837,396.
Non-final Office Action dated Jul. 12, 2017 in U.S. Appl. No. 14/798,774.
Non-final Office Action dated Jul. 26, 2017 in U.S. Appl. No. 14/673,340.
Office Action dated Jun. 6, 2017 in U.S. Appl. No. 14/528,070.
Notice of Allowance dated Jun. 12, 2017 in U.S. Appl. No. 14/266,179.
Final Office Action dated Apr. 29, 2016 in U.S. Appl. No. 14/798,774.
Final Office Action dated May 3, 2016 in U.S. Appl. No. 14/266,179.

* cited by examiner

HYDROPHOBIC COATING OF PARTICULATES FOR ENHANCED WELL PRODUCTIVITY

CROSS-REFERENCE TO RELATED APPLICATIONS

This application claims priority to U.S. Provisional Application No. 62/160,786, filed May 13, 2015, U.S. Provisional Application No. 62/197,916, filed Jul. 28, 2015, U.S. Provisional Application No. 62/220,373, filed Sep. 18, 2015, U.S. Provisional Application No. 62/237,182, filed Oct. 5, 2015, and U.S. Provisional Application No. 62/310,039, filed Mar. 18, 2016, each of which is hereby incorporated by reference in its entirety.

FIELD

Embodiments disclosed herein relate to, for example, treatments for coated or uncoated proppants that can, among other things, enhance well productivity.

BACKGROUND

Hydraulic fracturing is a technique that is commonly used to enhance oil and gas production. In this process, a large amount of fluid is pumped into a drilled wellbore with targeted areas of the rock are exposed to the fluid. The high pressure fluid induces a crack or fracture in the rock. The hydraulic pressure and type of fracturing fluid system affects the size, depth and surface area of the fracture that allows for hydrocarbon production from the formation. Once the hydraulic pressure is removed, the fracture closes in a short period of time. In order to keep the fracture open to allow hydrocarbons to escape and be collected, particles called proppants are introduced into the well to "prop" open the fracture. Commonly used proppants are sand or ceramics. The amount of oil or gas produced from the fracture is highly dependent on the quantity and placement of the proppant in the fracture. Better proppant placement deeper into a well yields a longer effective fracture length, and thus better production. Therefore, in order to improve hydrocarbon yield from hydraulically fractured wells, any improvement in placement can have a large impact on production.

Hydraulic fracturing fluids can be water based, and such systems can be categorized broadly into 3 main classes: Polymer gels that are crosslinked with metal ions or non-metallic compounds such as borates form fracturing fluid with maximum viscosity to create wide fracture width and carry the proppant deep into the fractured matrix, polymer gels in which the polymer concentration is sufficient to create a substantial viscosity increase but is not crosslinked and a low concentration of polymer in the water to provide substantial reduction in friction pressure but minimal increase in viscosity to aid in proppant transport. This third class of fracturing fluid system is also known as "slick water". Since most proppants are higher density than the fluids used to hydraulically fracture wells, particles settling out of the fluid suspension (rather than being carried further out in the fracture) can be a limiting factor in the effectiveness of the fracturing process. Proppant that settles out of the fluid prior to placement in a fracture is not only wasted; but can quickly contribute to the premature termination of the fracturing treatment. In addition, the proppant that settles in the near wellbore (or the widest part/base of the fracture) creates dunes which can further limit effective placement of the particles that remain in the suspension.

Proppant settling rate is affected by several factors; primary amongst these is the density of the particles relative to the fluid, the drag imparted on the particle surface as it flows through fluid and the viscosity of the fluid carrying the proppant.

Accordingly, there is a need to reduce proppant density to enhance transport. However, there are problems with prior methods and compositions for reducing proppant density. For example, proppant densities can be reduced by creating a porous proppant structure, by adding a coating so that the coated particle has a lower density than the carrier and/or that increases particle drag to reduce settling, or by attachment of gas bubbles to reduce the density of the bubble/particle aggregate. Engineering of materials to generate a low density porous proppant results in an expensive low density ceramic material or a very high cost thermoplastic material. Adding of coatings such as hydrogels to increase particle drag and reduce density have the disadvantage of high cost, complex processing, and the possibility of leaving a residue on the sand that can have a negative impact on well production due to clogging of pores with the hydrogel.

Generation of bubbles on the surface of the particles can be used to reduce density and increase transport. Nitrogen can be used as a component in energized fracturing systems and can be added as an additional component in a fracturing job. However, current chemistries for hydrophobic surface coating of proppant via addition of liquid ingredients such as frothers are quite complex and costly, and require the use of hazardous chemicals on the wellsite.

Thus there is a need for a simpler, less complex method and chemistry for preparation of a hydrophobic surface on a proppant to allow for enhanced transport via attachment of buoyant gas bubbles. The present embodiments satisfy these needs as well as other.

SUMMARY

Embodiments disclosed herein provide coated particulates comprising a particulate core coated with an optional compatibilizing agent and a hydrophobic polymer coating the particulate core, wherein a portion of the hydrophobic polymer is exposed to provide an exposed hydrophobic surface of the coated particulate.

In some embodiments, processes for preparing coated particulates are provided. In some embodiments, the coated particulates comprise a particulate core coated with an optional compatibilizing agent and a hydrophobic polymer, the process comprising contacting the particulate core with the optionally compatibilizing agent and the hydrophobic polymer under conditions sufficient to coat the particulate core to produce the coated particulate.

In some embodiments, methods of extracting oil and/or gas from a subterranean stratum are provided. In some embodiments, the methods comprise injecting into the subterranean stratum a coated particulate comprising a particulate core with a compatibilizing agent and a hydrophobic polymer coating the particulate core, wherein a portion of the hydrophobic polymer is exposed to provide an exposed hydrophobic surface of the coated particulate; and extracting the oil and/or gas from the subterranean stratum.

In some embodiments, methods of extracting oil and/or gas from a previously fractured subterranean stratum comprising proppants are provided. In some embodiments, the methods comprise injecting into the previously fractured subterranean stratum comprising proppants a coated particulate comprising a particulate core with an optional compatibilizing agent and a hydrophobic polymer coating the particulate core, wherein a portion of the hydrophobic polymer is exposed to provide an exposed hydrophobic surface of the coated particulate; and extracting the oil and/or gas from the previously fractured subterranean stratum.

In some embodiments, methods of increasing oil mobility out of a fractured subterranean stratum are provided. In some embodiments, the method comprise injecting into a fractured subterranean stratum a coated particulate comprising a particulate core with an optional compatibilizing agent and a hydrophobic polymer coating the particulate core, wherein a portion of the hydrophobic polymer is exposed to provide an exposed hydrophobic surface of the coated particulate; and extracting the oil and/or gas from the fractured subterranean stratum.

In some embodiments, coated particulates with reduced fugitive dust are provided. In some embodiments, the coated particulates comprise a particulate core with an optional compatibilizing agent and a hydrophobic polymer coating the particulate core, wherein a portion of the hydrophobic polymer is exposed to provide an exposed hydrophobic surface of the coated particulate.

In some embodiments, methods of extracting oil and/or gas from a subterranean stratum with reduced dust production are provided. In some embodiments, the methods comprise injecting into the subterranean stratum a coated particulate comprising a particulate core with an optional compatibilizing agent and a hydrophobic polymer coating the particulate core, wherein a portion of the hydrophobic polymer is exposed to provide an exposed hydrophobic surface of the coated particulate; and extracting the oil and/or gas from the subterranean stratum, wherein an amount of dust produced is less as compared to an uncoated particulate.

In some embodiments, coated particulates comprising a particulate core coated with a surfactant, a polymer binder, and a hydrophobic polymer are provided.

In some embodiments, methods of preparing the coated particulate core described herein are provided. In some embodiments, the methods comprise contacting the particulate core with the hydrophobic polymer and an emulsion comprising the surfactant and the polymer binder.

In some embodiments, methods of extracting oil and/or gas from a subterranean stratum, are provided. In some embodiments, the methods comprise injecting into the subterranean stratum a coated particulate as described herein and extracting the oil and/or gas from the subterranean stratum.

In some embodiments, coated particulates are provided. In some embodiments, the coating is a mixture of 1) an alkoxylate or an alkoxylated alcohol, 2) an acrylic polymer, and 3) an amorphous polyalphaolefin. In some embodiments, the coating further comprises fumed silica.

In some embodiments, methods of preparing coated particulates described herein are provided, wherein the methods comprise mixing the particulates with 1) an alkoxylate or an alkoxylated alcohol, 2) an acrylic polymer, and 3) an amorphous poly-alpha-olefin.

In some embodiments, coated particulates are provided, wherein the coating comprises a mixture a polybutadiene and fumed silica.

In some embodiments, methods of preparing coated particulates are provided, wherein the methods comprise mixing a polybutadiene and fumed silica with the particulates to produce the coated particulates.

In some embodiments, methods of extracting oil and/or gas from a subterranean stratum are provided. In some embodiments, the methods comprise injecting into the subterranean stratum a coated particulate described herein; and extracting the oil and/or gas from the subterranean stratum. In some embodiments, the methods further comprise injecting a gas into the subterranean stratum concurrently or sequentially with the coated particulate. In some embodiments, the methods, further comprise injecting a gas into the subterranean stratum after the injection of the coated particulate. In some embodiments, the gas is air, nitrogen, carbon dioxide, or any combination thereof.

In some embodiments, methods of cleaning out a well bore are provided. In some embodiments, the method comprises injecting a gas into the well bore that comprises coated particulates to suspend the coated particulates in the well bore and displacing the coated particulate from the well bore.

Embodiments disclosed herein also provide coated particulates comprising a particulate core with a compatibilizing agent and a hydrophobic polymer coating the particulate core, wherein a portion of the hydrophobic polymer is exposed to provide an exposed hydrophobic surface of the coated particulate.

Embodiments disclosed herein also provide processes for preparing a coated particulate, the coated particulate comprising a particulate core coated with a compatibilizing agent and a hydrophobic polymer, the process comprising contacting the particulate core with the compatibilizing agent and the hydrophobic polymer under conditions sufficient to coat the particulate core to produce the coated particulate.

Embodiments disclosed herein also provide methods of extracting oil and/or gas from a subterranean stratum, the method comprising injecting into the subterranean stratum a coated particulate comprising a particulate core with a compatibilizing agent and a hydrophobic polymer coating the particulate core, wherein a portion of the hydrophobic polymer is exposed to provide an exposed hydrophobic surface of the coated particulate; and extracting the oil and/or gas from the subterranean stratum.

Embodiments disclosed herein also provide methods of extracting oil and/or gas from a previously fractured subterranean stratum comprising proppants, the method comprising injecting into the previously fractured subterranean stratum comprising proppants a coated particulate comprising a particulate core with a compatibilizing agent and a hydrophobic polymer coating the particulate core, wherein a portion of the hydrophobic polymer is exposed to provide an exposed hydrophobic surface of the coated particulate; and extracting the oil and/or gas from the previously fractured subterranean stratum.

DETAILED DESCRIPTION

Figure 1:
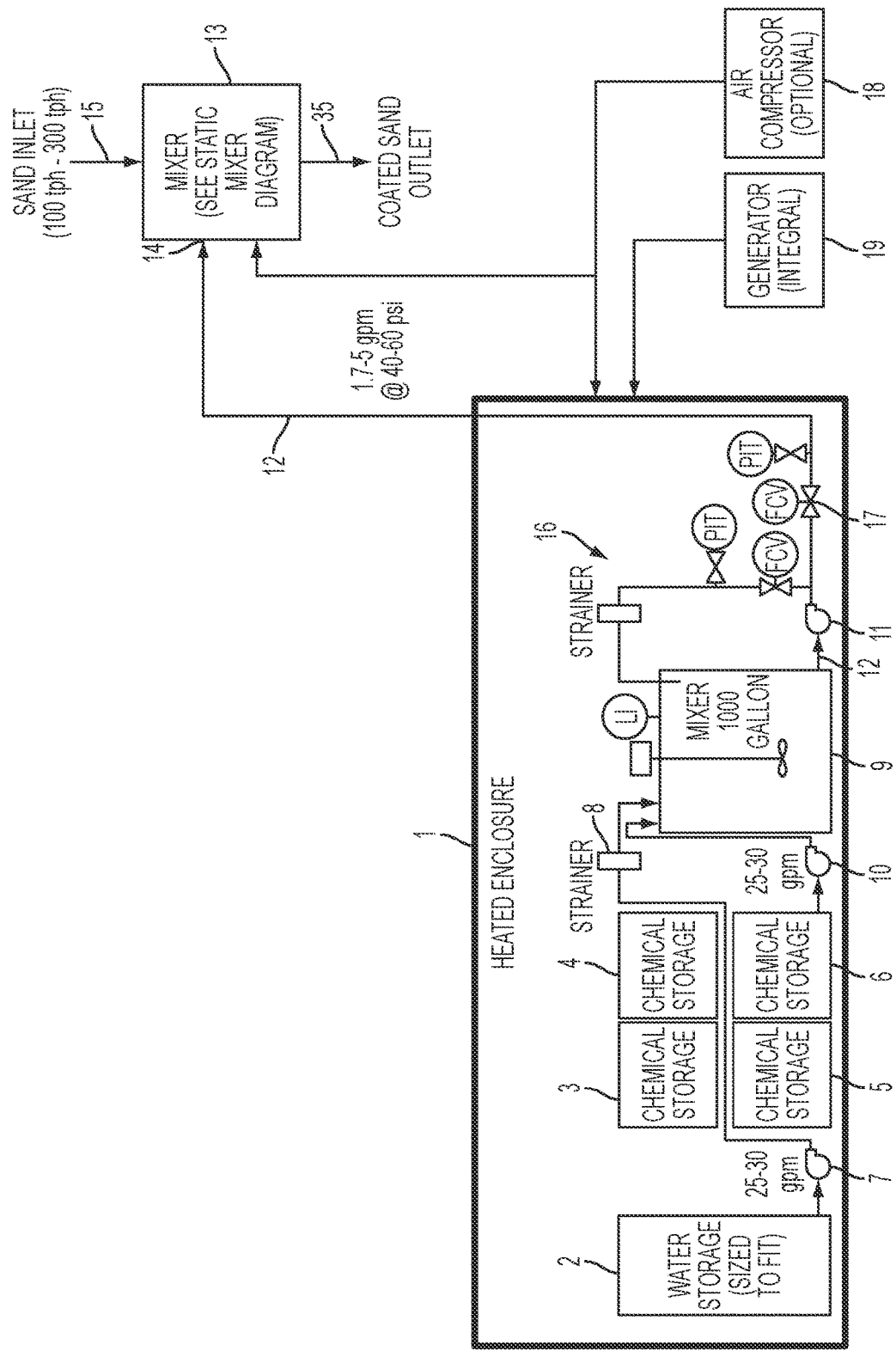
FIG. 1 is a diagram showing the types of equipment and process flow sequence described herein.

Embodiments provided herein provide hydrophobic polymer coated particulates (proppants). The coated particulates can provide a hydrophobic surface that can enhance proppant transport into a fracture during the process of hydraulic fracturing. This can enhance the productivity of the well. This enhanced transport can be when the particulates are in combination with a gas phase in the fracturing fluid/slurry. Additional coatings and coated particulates are also described herein. The coatings can be applied through the use of one or more treatment agents. The treatment agents can be a single agent or a combination of agents. Non-limiting examples of such singular agents or combinations are provided herein.

"Treatment agents" are described herein. They can be liquid treatment agents. Examples, include, but are not limited to an aqueous solution, dispersion, or emulsion. The treatment agent can also be a combination of solids that are applied to the particulate core that makes up the proppant. The treatment agents can be heated or not heated before, after, or during the application processes described herein. In some embodiments, the treatment agent is not heated before, after, or during the application process. In some embodiments, the treatment agent is heated on the particulate downhole or in the well.

Embodiments disclosed herein provide methods and compositions for treating frac sands, whether or not provided with a hydrophobic coating, as well as other finely divided particulate solids (e.g., sand, resin-coated sand, bauxite or ceramics).

Embodiments disclosed herein also provide methods that reduce fugitive dust associated with the proppant material itself and do not require users, transporters and well sites to purchase or use additional equipment to handle the thus-treated solids.

Embodiments disclosed herein provide compositions and methods for maintaining or improving performance of the proppant solids pack by reducing loss of sphericity and/or minimizing the inclusion of fine particles that could affect the performance of the proppant solids.

Embodiments disclosed herein provide methods for treating a proppant quickly and with minimal effect on the conventional handling techniques and equipment currently in use for loading, moving, and unloading coated or uncoated proppant sands or ceramics.

Embodiments disclosed herein include, but are not limited to, free-flowing proppant solids being treated with a treatment agent, such as those disclosed herein, quickly and at a sufficiently low application rate in order to maintain the free-flowing properties of the treated solids. Without wishing to be bound by any particular theory, such low levels of treatment with the agents allow the treated solids to be handled with conventional handling equipment without adversely affecting the handling and conveying process. The treatment agent can also help to avoid the degradation or deterioration of the proppant solids. Some of the unexpected advantages of the processes and compositions described herein include, but are not limited to, preserving sphericity and the crush resistance benefits associated with the proppants while avoiding the formation of fines (e.g. dust) that can become an airborne health hazard or in a high enough concentration to affect the properties of the fracturing fluid. Embodiments described herein can also be used to provide the proppant with additional functions and/or benefits of value for oil and gas well operation by incorporating functional molecules into the coating. The coatings can also be added using traditional techniques such as using heat and other resin coating methods. The coatings can also provide a hydrophobic coating as described herein. The coatings can also be supplemented with other elements and coatings as described herein. Any coating described herein can be combined with one another.

Embodiments disclosed herein provide coated particulates. In some embodiments, the coated particulate comprises a particulate core coated with a compatibilizing agent and a hydrophobic polymer coating the particulate core. In some embodiments, a portion of the hydrophobic polymer is exposed to provide an exposed hydrophobic surface of the coated particulate. The compatibilizing agent can be any agent that facilitates the binding of the hydrophobic polymer to the particulate core. For example, when hydrophobic polymers are mixed with particulate cores without a compatibilizing agent the hydrophobic polymer can flake off and leave the particulate core without a coating or a sufficient coating. Thus, the compatibilizing agent can enhance the hydrophobic coating by enabling the hydrophobic polymer to more readily bind to the particulate core. In some embodiments, a compatibilizing agent can refer to a coupling reagent. Non-limiting examples of compatibilizing agents are provided herein, however, any agent that can facilitate the binding of the hydrophobic polymer to the particulate core can be used. Examples of hydrophobic polymers are also provided herein, but others can be also be used. Without wishing to be bound by any particular theory, the hydrophobic coating provides the following functionality. Hydrophobic polymers containing groups that have low surface energy that imparts an enhanced chemical affinity for non-polar nitrogen molecules, and thus supports the formation of bubbles or a plastron (trapped film or air) to form on the surface of the polymer. The bubbles or plastron will generate increased buoyancy of the particles and thus enhance the transport in a flowing fluid media. Polymers with functional groups or side chains that contain aliphatic methyl, ethyl, propyl, butyl and higher alkyl homologs can be used to generate this type of effect. Polymers with fluoro groups also impart low surface energies and oleophobic as well as hydrophobic character. Examples of these include trifluoromethyl, methyldifluoro (vinilidyine fluoride copolymers, hexafluoropropyl containing polymers, side chains that contain short chains of fluoropolymers and the like. Therefore, these polymers can also be used in some embodiments. Commercially available fluorosilicones can also be used. Examples of hydrophobic polymers include, but are not limited to, polybutadienes. Examples of such polybutadienes include, but are not limited to, non-functionalized polybutadienes, maleic anhydride functionalized polybutadienes, hydroxyl, amine, amide, keto, aldehyde, mercaptan, carboxylic, epoxy, alkoxy silane, azide, halide terminated polybutadienes, and the like, or any combination thereof. One non-limiting example includes those sold under the tradename Polyvest and the like. In some embodiments, the hydrophobic polymer may be a di-, tri-, or ter-block polymers or a combination thereof that are terminated with hydroxyl, amine, amide, mercaptan, carboxylic, epoxy, halide, azide, or alkoxy silane functionality. Examples of such diblock and triblock or terblock polymers backbone are not limited to styrene butadiene, acrylonitrile butadiene styrene, acrylonitrile butadiene, ethylene-acrylate rubber, polyacrylate rubber, isobutylene isoprene butyl, styrene ethylene butylene styrene copolymer, styrene butadiene carboxy block copolymer, chloro isobutylene isoprene, ethylene-acrylate rubber, styrene-acrylonitrile, poly(ethylene-vinyl acetate) polyethyleneglycol-polylactic acid, polyethyleneglycol-polylactide-co-glycolide, polystyrene-co-poly(methyl methacrylate), poly(styrene-block-maleic anhydride), poly(styrene)-block-poly(acrylic acid), Poly (styrene-co-methacrylic acid, poly(styrene-co-α-methylstyrene), poly(ε-caprolactone)-poly(ethylene glycol), styrene-isoprene-styrene, and the lie. The polymer that forms the hydrophobic coating can also be a cured polymer as described herein.

In some embodiments, the compatibilizing agent binds the hydrophobic polymer to the particulate. In some embodiments, the compatibilizing agent encapsulates the particulate core and a first surface of the hydrophobic polymer binds to the compatibilizing agent and a second surface of the hydrophobic polymer is exposed to provide the exposed hydrophobic surface of the coated particulate.

In some embodiments, the coated particulate has enhanced particulate transport as compared to a particulate without the exposed hydrophobic surface. The enhanced transport can be in the presence of a gas, such as but not limited to nitrogen gas, carbon dioxide, air, nonpolar gases, or any combination thereof.

Examples of compatibilizing agents include, but are not limited to, silanes, surfactants, alkoxylated alcohol, acrylate polymer, or combinations thereof. The compatibilizing agent ca also be a combination of two or more of such agents. In some embodiments, the compatibilizing agent is a mixture of 2, 3, 4, or 5 of such agents. The surfactant is not being used as a frother, or ingredient which is designed to be released into the fluid media to enhance bubble formation, but rather as a compatibilizing agent or a coupling agent that enables the hydrophobic polymer to better bind to the particulate core. In some embodiments, the silane is an alkoxysilane. Examples of alkoxysilanes include, but are not limited to, methoxymethylsilane, ethoxysilane, butoxysilane, or octoxysilane including, but not limited to, Dynasylan® or Geniosil®.

An example of a surfactant that can be used as a compatibilizing agents includes, but is not limited to a hydroxysultaine. A non-limiting example of a hydroxysultaine is cocamidopropyl hydroxysultaine.

Non-limiting examples of alkoxylated alcohols are, but not limited to, Brij™ or Ecosurf™ products.

Various hydrophobic polymers are described herein that can be used in conjunction with the compatibilizing agent.

In some embodiments, the coated particulate with a coating comprising a compatibilizing agents and a hydrophobic polymer comprises a hydrophobic polymer that is a polyalphaolefin, such as but not limited to, an amorphous polyalphaolefin. In some embodiments, the polyalphaolefin is crosslinked. The crosslinking of the polyolefins can, for example, improve the durability of the coating. An improvement in durability can refer to the ability of a material to retain its physical properties while subjected to stress such as heavy use or environmental conditions as opposed to the particulate core without the coating. For example, the improved durability can include, but not limited to, maintenance of chemical properties as well as physical properties, such as maintenance of hydrophobicity, barrier properties, chemical functionality, and the like. The polyalphaolefin can be crosslinked by any method suitable to crosslink a polyalphaolefin. For example, crosslinking of polyolefins may be performed in a similar manner as crosslinking of polyethylene, which is commonly practiced in the pipe industry, and often called PEX (for crosslinked polyethylene). The cross-linking of the hydrophobic coating, such as a crosslinked polyalphaolefin can improve the performance of the coated particulate core. For example, the improvements can include, but are not limited to, enhanced environmental stress crack resistance, resistance to crack growth, increase in yield strength, increased creep resistance, increased chemical resistance, and the like. Additionally, the cross-linked polymers should not melt, which enhances the durability of the coating at higher temperatures, such as those experienced downhole in a well by a particulate core coating. The cross-linking can be performed by using radical initiators such as peroxides, as given in table 5 of Tamboli et al., Indian Journal of Chemical Technology, Vol. 11, pp. 853-864, which is hereby incorporated by reference in its entirety. Examples of the radical initiators, include but are not limited to, dicumyl peroxide, di-t-butyl peroxide, di-t-amyl peroxide, 2,5-dimethyl-2,5-di (t-butyl-peroxy) hexane, 2,5-dimethyl-2,5-di (t-butyl-peroxy) hexynes, n-butyl-4,4-bis (t-butyl peroxy) valerate, 1,1-Bis (t-butyl peroxy)-3,3,5-tri methylcyclohexane, benzoyl peroxide, and the like, or any combination thereof. The polyalphaolefin polymer may also be crosslinked by irradiation, such as electron beam, or by grafting of reactive silanes to the polymer. Crosslinking by chemical radical initiators provides an advantage because the process requires standard chemical process equipment, as opposed to irradiation processes. In some embodiments, dicumyl peroxide and AIBN (azoisobutyronitrile) are used as a radical initiator, to crosslink the polyalphaolefin polymer. One non-limiting example of a polyalphaolefin polymer for crosslinking is VESTOPLAST® W-1750 (amorphous poly-alpha-olefins dispersion), an amorphous polyalphaolefin polymer in an aqueous dispersion.

In some embodiments, the hydrophobic polymer is a polybutadiene. Examples of such polybutadienes include, but are not limited to, non-functionalized polybutadienes, maleic anhydride functionalized polybutadienes, hydroxyl, amine, amide, keto, aldehyde, mercaptan, carboxylic, epoxy, alkoxy silane, halide, azide terminated polybutadienes, and the like, or any combination thereof. One non-limiting example includes those sold under the tradename Polyvest and the like. In some embodiments, the hydrophobic polymer is a non-siloxane hydrophobic polymer.

In some embodiments, the hydrophobic polymer is a copolymer or a graft polymer. In some embodiments, the copolymer and/or the graft polymer comprises both hydrophilic groups and hydrophobic groups, provided that the majority of groups are hydrophobic groups. In some embodiments, the hydrophilic groups bond with the particulate surface through van der Waals forces. In some embodiments, the hydrophilic groups are an ether, amine, amide, ethoxylated alcohol, ester, urethane, alkoxy silane, carboxylic, epoxy, mercaptan, halide, keto, aldehyde, azide or any combination thereof.

In some embodiments, the hydrophobic polymer is a low molecular weight polymer below or slightly above the critical entanglement chain length (which varies by polymer). For example, critical molecular weights (Mc or Me) can range from 3,000 to 350,000 depending on the polymer (See Mark "Physical Properties of Polymers Handbook, Chapter 25 Tables 25.2-25.6. In some embodiments, the low molecular weight polymer is a hydrophobic olefin polymer. In some embodiments, the hydrophobic polymer has a crosslinkable moiety. In some embodiments, the hydrophobic polymer has an irregular backbone or pendant groups that disrupt crystallization.

In some embodiments, the hydrophobic coated particle is coated with a combination of an ethoxylated alcohol, an acrylic polymer(s), and an alphaolefin (e.g. amorphous polyalphaolefins). In some embodiments, the particle is coated by contacting the particle with an emulsion, which can also be referred to as an aqueous composition, comprising the ethoxylated alcohol and an acrylic polymer and a composition comprising the alphaolefin. In some embodiments, the alphaolefin is a polyalphaolefin, such as but not limited to, an amorphous polyalphaolefin. Examples are described herein and include, but are not limited to, Evonik VESTO-PLAST® W-1750 (amorphous poly-alpha-olefins dispersion). Examples of emulsions that can be used are described in, for example, WO2015/073292, which is hereby incorporated by reference in its entirety. Ethoxylated alcohols can also be referred to as a surfactant.

The surfactant may be a nonionic, cationic, or anionic material, and it may be a blend of surfactants. Non-limiting examples of surfactants known in the art that may suitably be used include those described in U.S. Pre-Grant publication 2002/0045559, which is incorporated herein by reference. Examples of appropriate anionic surfactants may include, but are not limited to, a sulfonic acid surfactant, such as a linear alkyl benzene sulfonic acid, or salt thereof. Anionic sulfonate or sulfonic acid surfactants suitable for use herein include the acid and salt forms of $C_5$-$C_{20}$, $C_{10}$-$C_{16}$, $C_{11}$-$C_{13}$ alkylbenzene sulfonates, alkyl ester sulfonates, $C_6$-$C_{22}$ primary or secondary alkane sulfonates, sulfonated polycarboxylic acids, and any mixtures thereof. In some embodiments, it is a $C_{11}$-$C_{13}$ alkylbenzene sulfonates. Anionic sulfate salts or acids surfactants include the primary and secondary alkyl sulfates, having a linear or branched alkyl or alkenyl moiety having from 9 to 22 carbon atoms or $C_{12}$ to $C_{18}$ alkyl can also be used.

Anionic surfactants that may be used also include beta-branched alkyl sulfate surfactants or mixtures of commercially available materials, having a weight average (of the surfactant or the mixture) branching degree of at least 50% or even at least 60% or even at least 80% or even at least 95%. Mid-chain branched alkyl sulfates or sulfonates are also suitable anionic surfactants for use. In some embodiments, the mid-chain branched alkyl sulfates are used.

Suitable mono-methyl branched primary alkyl sulfates that may be used include those selected from the group consisting of: 3-methyl pentadecanol sulfate, 4-methyl pentadecanol sulfate, 5-methyl pentadecanol sulfate, 6-methyl pentadecanol sulfate, 7-methyl pentadecanol sulfate, 8-methyl pentadecanol sulfate, 9-methyl pentadecanol sulfate, 10-methyl pentadecanol sulfate, 11-methyl pentadecanol sulfate, 12-methyl pentadecanol sulfate, 13-methyl pentadecanol sulfate, 3-methyl hexadecanol sulfate, 4-methyl hexadecanol sulfate, 5-methyl hexadecanol sulfate, 6-methyl hexadecanol sulfate, 7-methyl hexadecanol sulfate, 8-methyl hexadecanol sulfate, 9-methyl hexadecanol sulfate, 10-methyl hexadecanol sulfate, 11-methyl hexadecanol sulfate, 12-methyl hexadecanol sulfate, 13-methyl hexadecanol sulfate, 14-methyl hexadecanol sulfate, and mixtures thereof.

Suitable di-methyl branched primary alkyl sulfates may include materials selected from the group consisting of: 2,3-methyl tetradecanol sulfate, 2,4-methyl tetradecanol sulfate, 2,5-methyl tetradecanol sulfate, 2,6-methyl tetradecanol sulfate, 2,7-methyl tetradecanol sulfate, 2,8-methyl tetradecanol sulfate, 2,9-methyl tetradecanol sulfate, 2,10-methyl tetradecanol sulfate, 2,1-methyl tetradecanol sulfate, 2,12-methyl tetradecanol sulfate, 2,3-methyl pentadecanol sulfate, 2,4-methyl pentadecanol sulfate, 2,5-methyl pentadecanol sulfate, 2,6-methyl pentadecanol sulfate, 2,7-methyl pentadecanol sulfate, 2,8-methyl pentadecanol sulfate, 2,9-methyl pentadecanol sulfate, 2,10-methyl pentadecanol sulfate, 2,11-methyl pentadecanol sulfate, 2,12-methyl pentadecanol sulfate, 2,13-methyl pentadecanol sulfate, and mixtures thereof.

Examples of cationic surfactants that may be used include, but are not limited to, cationic mono-alkoxylated and bis-alkoxylated quaternary amine surfactants with a $C_6$-$C_{18}$ N-alkyl chain, such as of the general formula:

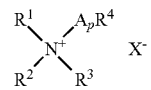

wherein $R^1$ is an alkyl or alkenyl moiety containing from about 6 to about 18 carbon atoms, preferably 6 to about 16 carbon atoms, most preferably from about 6 to about 14 carbon atoms; $R^2$ and $R^3$ are each independently alkyl groups containing from one to about three carbon atoms, e.g., methyl or where both $R^2$ and $R^3$ are methyl groups; $R^4$ is selected from hydrogen, methyl and ethyl; X is an anion such as chloride, bromide, methylsulfate, sulfate, or the like, to provide electrical neutrality; A is an alkoxy group, such as an ethyleneoxy, propyleneoxy or butyleneoxy group; and p is from 0 to about 30, 2 to about 15, 2 to about 8.

In some embodiments, The cationic bis-alkoxylated amine surfactant has the general formula:

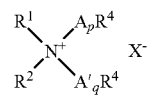

wherein $R^1$ is an alkyl or alkenyl moiety containing from about 8 to about 18 carbon atoms, about 10 to about 16 carbon atoms, or about 10 to about 14 carbon atoms; $R^2$ is an alkyl group containing from one to three carbon atoms, such as methyl; each R4 can vary independently and are selected from hydrogen, methyl and ethyl, $X^-$ is an anion such as chloride, bromide, methylsulfate, sulfate, or the like, sufficient to provide electrical neutrality. A and A' can vary independently and are each selected from $C_1$-$C_4$ alkoxy, such as, ethyleneoxy, propyleneoxy, butyleneoxy and mixtures thereof; p is from 1 to about 30, 1 to about 4 and q is from 1 to about 30, 1 to about 4. In some embodiments, both p and q are 1.

Another suitable group of cationic surfactants which can be used are cationic ester surfactants. Suitable cationic ester surfactants, including choline ester surfactants, have for example been disclosed in U.S. Pat. Nos. 4,228,042, 4,239,660 and 4,260,529, each of which are hereby incorporated by reference in its entirety.

In some embodiments, nonionic surfactants are used (including blends thereof). Suitable nonionic surfactants include, but are not limited to, alkoxylate materials including those that are derived from ethylene oxide, propylene oxide, and/or butylene oxide. Examples are described, for example, in U.S. Pat. No. 7,906,474 and U.S. Pre-Grant publication 2011/0098492, each of which is incorporated herein by reference.

In some embodiments, the surfactant is a nonionic alkoxylate of the formula I:

$$R_a O\text{-}(AO)_z\text{---}H \quad (I)$$

wherein $R_a$ is aryl (e.g., phenyl), or linear or branched $C_6$-$C_{24}$ alkyl, AO at each occurrence is independently ethyleneoxy, propyleneoxy, butyleneoxy, or random or block mixtures thereof, and z is from 1 to 50.

In some embodiments, the nonionic surfactant for use in the aqueous (emulsion) coating composition is an alkoxylate represented by the following formula II:

$$R\text{---}O\text{---}(C_3H_6O)_x(C_2H_4O)_y\text{---}H \quad (II)$$

wherein x is a real number within a range of from 0.5 to 10; y is a real number within a range of from 2 to 20, and R represents a mixture of two or more linear alkyl moieties each containing one or more linear alkyl group with an even number of carbon atoms from 4 to 20. One of the advantages of surfactants, particularly those that are natural source derived, as described below, is their general biodegradability and low toxicity.

Formula II surfactants can be prepared in a sequential manner that includes propoxylation (adding PO or poly (oxypropylene)) moieties to an alcohol or mixture of alcohols to form a PO block followed by ethoxylation (adding EO or poly(oxyethylene)) moieties to form an EO block attached to the PO block, but spaced apart from R which represents alkyl moieties from the alcohol or mixture of alcohols. One may either begin with a mixture of alcohols that provides a distribution of alkyl moieties and then sequentially propoxylate and ethoxylate the mixture or separately propoxylate and ethoxylate select alcohols and then combine such alkoxylates (propoxylated and ethoxylated alcohols) in proportions sufficient to provide a distribution, for example, as shown in the Table below.

In some embodiments, R (as shown in the formula) represents a mixture of linear alkyl moieties that are the alkyl portions of seed oil-derived alcohols. In some embodiments, R has an alkyl moiety distribution as in the table below (Table A):

TABLE A

| Amount | Alkyl Moieties |
|---|---|
| 0 wt % to 40 wt % | $C_6$ |
| 20 wt % to 40 wt % | $C_8$ |
| 20 wt % to 45 wt % | $C_{10}$ |
| 10 wt % to 45 wt % | $C_{12}$ |
| 0 wt % to 40 wt % | $C_{14}$ |
| 0 wt % to 15 wt % | $C_{16-18}$ |

In reference to the alkyl moieties, $C_{16-18}$ means $C_{16}$, $C_{18}$, or a mixture thereof. Any one or more of $C_6$, $C_{14}$, and $C_{16-18}$ alkyl moieties may, but need not be, present. When present, the amounts of $C_6$, $C_{14}$, and $C_{16-18}$ alkyl moieties may satisfy any of their respective ranges as shown in the table above as long as all weight percentages total 100 wt %. In some embodiments, one or more of $C_6$, $C_{14}$, and $C_{16-18}$ alkyl moieties are present in an amount greater than zero. In some embodiments, $C_6$ and $C_{14}$ are each present in an amount greater than zero, and there is also an amount greater than zero of $C_{16-18}$.

In some embodiments, R has an alkyl moiety distribution as in the following table (Table B).

TABLE B

| Amount | Alkyl Moieties |
|---|---|
| 0 wt % to 36 wt % | $C_6$ |
| 22 wt % to 40 wt % | $C_8$ |
| 27 wt % to 44 wt % | $C_{10}$ |
| 14 wt % to 35 wt % | $C_{12}$ |
| 5 wt % to 13 wt % | $C_{14}$ |
| 0 wt % to 5 wt % | $C_{16-18}$ |

The surfactant mixture in this table includes a mixture of at least four alkyl moieties: $C_8$, $C_{10}$, $C_{12}$, and $C_{14}$. Any one or more of $C_6$ and $C_{16-18}$ alkyl moieties may, but need not be, present in compositions. When present, the amounts of $C_6$ and $C_{16-18}$ alkyl moieties may satisfy any of their respective ranges as shown in the table as long as all weight percentages total 100 wt %. In some embodiments, the amount of $C_6$ in R is zero. Independently, in some embodiments, the amount of $C_{16-18}$ in R is not zero.

Formula II above includes variables "x" and "y" that, taken together, establish a degree of alkoxylation in an oligomer distribution. Individually, "x" and "y" represent average degrees of, respectively, propoxylation and ethoxylation. In some embodiments, the degree of propoxylation or "x" falls within a range of from 0.5 to 7, within a range of 0.5 to less than 4, within a range of from 0.5 to 3, within a range of from 2 to 3, and within a range of from 2.5 to 3. In some embodiments, the degree of ethoxylation or "y" falls within a range of from 2 to 10, within a range of from 2 to 8, within a range of from 4 to 8, or within a range of from 6 to 8.

The term "within a range" as used herein and throughout includes the endpoints. In some embodiments, the sum of x and y is 1 to 15. In some embodiments, the sum of x and y is 1 to 7. Independently, in some embodiments, y is greater than x. In some embodiments, y is greater than or equal to 2 times x. In some embodiments, x is within a range of from 2.5 to 3, y is within a range of from 2 to 10, and R has an alkyl moiety distribution as in Table B. In some embodiments, the amount of $C_6$ in R is zero, the amount of $C_{16-18}$ in R is not zero, and the sum of x and y is 1 to 7.

In some embodiments, the formula II surfactant is $C_{8-16}O(PO)_{2.5}(EO)_5H$ (based on raw material feeds) derived from an alcohol stream that provides an alkyl moiety weight percentage distribution as follows: $C_8$=22.5%, $C_{10}$=27.5%, $C_{12}$=35%, $C_{14}$=12.5 and $C_{16}$=2.5%.

In some embodiments, the formula II surfactant is a blend of $C_{8-10}O(PO)_{2.5}(EO)_{5.8}H$ (derived from an alcohol blend consisting of about 55% n-decanol and about 45% noctanol) and $C_{12-16}(PO)_{2.5}(EO)8H$ (derived from an alcohol blend consisting of about 70% n-dodecanol, 25% n-tetradecanol and 5% n-hexadecanol), such as at a ratio of the two formula II materials of 65:35.

In some embodiments, the surfactant for use in the aqueous coating composition of is an alkoxylate of the formula III:

$$R^1O-(CH_2CH(R^2)-O)_p-(CH_2CH_2O)_q-H \quad (III)$$

wherein $R^1$ is linear or branched $C_4$-$C_{18}$ alkyl; $R^2$ is $CH_3$ or $CH_3CH_2$; p is a real number from 0 to 11; and q is a real number from 1 to 20. In some embodiments, $R^1$ in formula III is linear or branched $C_6$-$C_{16}$ alkyl, alternatively linear or branched $C_8$-$C_{14}$ alkyl, alternatively linear or branched $C_6$-$C_{12}$ alkyl, alternatively linear or branched $C_6$-$C_{10}$ alkyl, alternatively linear or branched $C_8$-$C_{10}$ alkyl. In some embodiments, $R^1$ is linear or branched $C_8$ alkyl. In some embodiments, $R^1$ is 2-ethylhexyl ($CH_3CH_2CH_2CH_2CH(CH_2CH_3)CH_2-$). In some embodiments, $R^1$ is 2-propylheptyl ($CH_3CH_2CH_2CH_2CH_2CH(CH_2CH_2CH_3)CH_2-$). In some embodiments, $R^2$ in formula III is $CH_3$. In some embodiments, R2 is $CH_3CH_2$. In some embodiments, p in formula III is from 3 to 10, alternatively from 4 to 6. In some embodiments, q in formula III is from 1 to 11, alternatively from 3 to 11.

In some embodiments, the formula III surfactant is $C_8$-$C_{14}O$—$(PO)_{2-5}(EO)_{5-9}$—H, where the $C_8$-$C_{14}$ group is linear or branched. In some embodiments, it is branched. In some embodiments, the formula III surfactant is $2EH(PO)_2(EO)_4$—H, $2EH(PO)_3(EO)_{6.8}$—H, $2EH(PO)_{5.5}(EO)_8$—H, $2EH(PO)_9(EO)_9$—H, $2EH(PO)_{11}(EO)_{11}$—H, $2EH(PO)_5(EO)_3$—H, or $2EH(PO)_5(EO)_6$-H, wherein 2EH is 2-ethylhexyl.

In some embodiments, the surfactant for use in the aqueous coating composition is an alkoxylate of the formula IV:

$$R_a-O-(C_2H_4O)_m(C_4H_8O)_n-H \quad (IV)$$

wherein $R_a$ is one or more independently straight chain or branched alkyl groups or alkenyl groups having 3-22 carbon atoms, m is from 1 to 12, and n is from 1 to 8. In some embodiments, m may be from 2 to 12, or from 2 to 10, or from 5-12. In some embodiments, n may be from 2 to 8, from 3-8, or from 5 to 8.

In some embodiments, the surfactant for use in the aqueous coating composition is an alkoxylate of the formula V:

$$C_4H_9O-(C_2H_4O)_r(C_3H_9O)_s(C_2H_4O)_t-H \quad (V)$$

wherein r is from 3-10, s is from 3 to 40, and t is from 10 to 45.

In some embodiments, the surfactant is an alkoxylate of the formula VI:

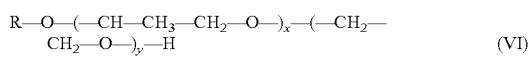

$$R-O-(-CH-CH_3-CH_2-O-)_x-(-CH_2-CH_2-O-)_y-H \quad (VI)$$

wherein x is from 0.5 to 10, y is from 2 to 20, and R is a mixture of two or more linear alkyl moieties having an even number of carbon atoms between 4 and 20.

In some embodiments, the surfactant for use in the aqueous coating composition is an alkyl polyglucoside of the formula:

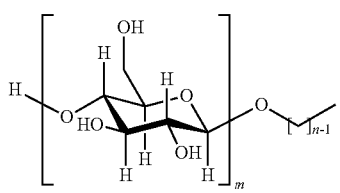

wherein m is from 1 to 10 and n is from 3 to 20.

In some embodiments, the emulsion comprises, based on the total weight, of the aqueous coating composition, from about 2 to 65 weight percent of a surfactant (e.g. ethoxylated alcohol), from about 1 to about 35 weight percent of a polymer binder, and balance water. In some embodiments, the polymer binder comprises an aqueous dispersion of particles made from a copolymer, based on the weight of the copolymer, comprising: i) from 90 to 99.9 weight percent of at least one ethylenically unsaturated monomer not including component ii; and ii) from 0.1 to 10 weight percent of (meth)acrylamide. In some embodiments, the polymer binder comprises an aqueous dispersion of particles made from a copolymer, based on the weight of the copolymer, comprising i) from 80 to 99.9 weight percent of at least one ethylenically unsaturated monomer not including component ii; and ii) from 0.1 to 20 weight percent of a carboxylic acid monomer. In some embodiments, the polymer binder comprises an aqueous dispersion of particles made from a copolymer, based on the weight of the copolymer, comprising: i) from 75 to 99 weight percent of at least one ethylenically unsaturated monomer not including component ii; ii) from 1 to 25 weight percent of an ethylenically unsaturated carboxylic acid monomer stabilized with a polyvalent metal.

In some embodiments, herein the ethylenically unsaturated carboxylic acid monomer is (meth)acrylic acid. In some embodiments, the polyvalent metal is zinc or calcium. In some embodiments, the polymer binder comprises a vinyl aromatic-diene copolymer. In some embodiments, as described herein, the surfactant is an alkoxylated.

In some embodiments, the emulsion is an aqueous coating composition, the aqueous coating composition comprising, based on the total weight of the aqueous coating composition, from 2 to 65 weight percent of a nonionic alkoxylate surfactant; from 1 to 35 weight percent of a polymer binder derived from butyl acrylate, styrene, acrylamide, and optionally hydroxyethyl methacrylate; and balance water.

The coatings can also have an optical brightener. In some embodiments, the optical brightener is coumarin or a coumarin derivative, a bis-stilbene compound, a bis(benzoxazolyl) thiophene compound, a 4,4'-bis(2-benzoxazolyl)stilbene compound, or a mixture of two or more thereof.

In some embodiments, the aqueous coating composition used in the invention may optionally comprise a flocculant. Suitable flocculants include, without limitation, a water soluble poly(ethylene oxide) resin or an acrylamide resin (e.g., Hydrolyzed Poly-Acrylamide, "HPAM") or other flocculating agent. In some embodiments, the flocculant, if used, is present in the aqueous coating composition at a concentration of from 0.01 to 5 weight percent, from 0.02 to 2, based on the total weight of the aqueous composition.

Examples of polymer binders suitable for use in the aqueous coating compositions are water insoluble emulsion polymers derived from one or more ethylenically unsaturated monomers, typically in the form of an aqueous dispersion. Suitable ethylenically unsaturated monomers include ethylenically unsaturated carboxylic acids, such as (meth)acrylic acid, derivatives thereof, such as ($C_1$-$C_{20}$) alkyl (meth)acrylate esters and (meth)acrylamide, vinyl aromatic monomers, vinyl alkyl monomers, alpha olefins, and combinations thereof. Further examples of suitable monomers include, without limitation, methyl acrylate, ethyl acrylate, propyl acrylate, isopropyl acrylate, butyl acrylate, isobutyl acrylate, secondary butyl acrylate, tertiary-butyl acrylate, methyl methacrylate, ethyl methacrylate, propyl methacrylate, isopropyl methacrylate, cyclopropyl, methacrylate, butyl methacrylate and isobutyl methacrylate, hexyl and cyclohexyl methacrylate, cyclohexyl acrylate, isobornyl methacrylate, 2-ethylhexyl acrylate (EHA), 2-ethylhexyl methacrylate, octyl (meth)acrylate, decyl (meth) acrylate, isodecyl (meth)acrylate, undecyl (meth)acrylate, dodecyl (meth)acrylate (also known as lauryl (meth)acrylate), tridecyl (meth)acrylate, tetradecyl (meth)acrylate (also known as myristyl (meth)acrylate), pentadecyl (meth)acrylate, hexadecyl (meth)acrylate (also known as cetyl (meth) acrylate), heptadecyl (meth)acrylate, octadecyl (meth)acrylate (also known as stearyl (meth)acrylate), nonadecyl (meth)acrylate, eicosyl (meth)acrylate, hydroxyethyl methacrylate, styrene, alpha-methyl styrene and substituted styrenes, such as vinyl toluene, 2-bromostyrene, 4-chlorostyrene, 2-methoxystyrene, 4-methoxystyrene, alpha-cyanostyrene, allyl phenyl ether and allyl tolyl ether, ethylene, propylene, butene, hexene, octane, decene, vinyl acetate (optionally copolymerized with an acrylate, such as butyl acrylate, or with ethylene), and combinations thereof. In some embodiments monomers include methyl acrylate, ethyl acrylate, butyl acrylate and 2-ethylhexyl acrylate, optionally in combination with a vinyl aromatic monomer. In some embodiments it is styrene. In some embodiments it is butyl acrylate optionally in combination with a vinyl aromatic monomer, such as styrene.

Further examples include, without limitation, ethylenically unsaturated ($C_3$-$C_9$) carboxylic acid monomers, such as unsaturated monocarboxylic and dicarboxylic acid monomers. For example, unsaturated monocarboxylic acids include acrylic acid (AA), methacrylic acid (MAA), alpha-ethacrylic acid, beta-dimethylacrylic acid, vinylacetic acid, allylacetic acid, ethylidineacetic acid, propylidineacetic acid, crotonic acid, acryloxypropionic acid and alkali and metal salts thereof. Suitable unsaturated dicarboxylic acid monomers include, for example, maleic acid, maleic anhydride, fumaric acid, itaconic acid, citraconic acid, mesaconic acid, or methylenemalonic acid. Methacrylic acid (MAA) is a preferred ethylenically unsaturated carboxylic acid.

Other unsaturated monomers that, when used, are can be copolymerized with one or more of the foregoing alkyl (meth)acrylates include, without limitation, butadiene, acrylonitrile, methacrylonitrile, crotononitrile, alpha-chloroacrylonitrile, ethyl vinyl ether, isopropyl vinyl ether, isobutyl vinyl ether, butyl vinyl ether, diethylene glycol vinyl ether, decyl vinyl ether, ethylene, methyl vinyl thioether and propyl vinyl thioether, esters of vinyl alcohol, and combinations thereof.

In some embodiments, the polymer binder is an aqueous dispersion of polymer units derived from, based on the weight of the polymer: i) from 90 to 99.9 weight percent of at least one ethylenically unsaturated monomer not including component ii; and ii) from 0.1 to 10 weight percent of (meth)acrylamide. In some embodiments, the monomer of i) comprises a ($C_1$-$C_{20}$)alkyl (meth)acrylate ester in combination with a vinyl aromatic monomer. In some embodiments, i) is butyl acrylate in combination with styrene. In some embodiments, the amount of butyl acrylate in such combination may be from 5 to 90 weight percent and the amount of styrene may be from 95 to 10 weight percent based on the total weight of the butyl acrylate and styrene.

In some embodiments of the invention, the polymer binder is an aqueous dispersion of polymer units derived from: butyl acrylate, styrene, and acrylamide.

As described herein, the particle can be prepared by, for example, blending in a mixer with mechanical agitation the particle and the aqueous coating composition; or by spraying the aqueous coating composition onto a moving bed or a falling stream of the particles. The other methods for coating particles as described herein can also be used. In some embodiments, the amounts, based on the weight of the polymer are: from 65 to 75 weight percent of butyl acrylate; from 23 to 33 weight percent of styrene; and from 0.5 to 6 weight percent of acrylamide. In some embodiments, the amounts, based on the weight of the polymer are: from 69 to 71 weight percent of butyl acrylate; from 27 to 29 weight percent of styrene; and from 1 to 3 weight percent of acrylamide.

In some embodiments, the polymer binder is an aqueous dispersion of polymer units derived from: butyl acrylate, styrene, hydroxyethyl methacrylate, and acrylamide. Preferably, the amounts, based on the weight of the polymer are: from 65 to 75 weight percent of butyl acrylate; from 24 to 32 weight percent of styrene; from 0.25 to 2 weight percent hydroxyethyl methacrylate; and from 0.5 to 6 weight percent of acrylamide. In some embodiments, the amounts, based on the weight of the polymer are: from 69 to 71 weight percent of butyl acrylate; from 26 to 28 weight percent of styrene; from 0.25 to 0.75 weight percent hydroxyethyl methacrylate; and from 1 to 3 weight percent of acrylamide.

In some embodiments, the polymer binder is an aqueous dispersion of polymer units derived from, based on the weight of the polymer: i) from 80 to 99.9 weight percent of at least one ethylenically unsaturated monomer not including component ii); and ii) from 0.1 to 20 weight percent of a carboxylic acid monomer. Suitable carboxylic acid monomers include those described above. Methacrylic acid (MAA) is preferred.

In some embodiments, the polymer binder used is a metal-crosslinked emulsion copolymer, such as those described in U.S. Pat. Nos. 4,150,005, 4,517,330, and U.S. Pre-Grant publications 2011/0118409, and 2011/0230612, each of which is incorporated herein by reference. Suitable metal crosslinked film-forming emulsion (co)polymers comprise polymer units derived from one or more ethylenically unsaturated monomers and one or more acid functionalized monomers reacted with a polyvalent metal compound at a temperature above or below the Tg of the acid functionalized polymer to produce a crosslinked polymer.

In some embodiments, the metal-crosslinked copolymer is derived from, based on the weight of the copolymer: i) from 75 to 99 weight percent of at least one ethylenically unsaturated monomer not including component ii; and ii) from 1 to 25 weight percent of an ethylenically unsaturated carboxylic acid monomer stabilized with a polyvalent metal. In some embodiments, the monomer of i) comprises one or more (C1-C20)alkyl (meth)acrylate esters. In some embodiments, the monomer of i) comprises one or more (C1-C20) alkyl (meth)acrylate esters optionally in combination with a vinyl aromatic monomer. In some embodiments, i) is butyl acrylate, methylmethacrylate, and styrene. In some embodiments, the amount of butyl acrylate in such combination is from 1 to 80, the amount of methylmethacrylate is from 5 to 70, and the amount of styrene is from 0 to 70 weight percent based on the total weight of the butyl acrylate, methylmethacrylate and styrene.

Suitable carboxylic acid monomers for the foregoing embodiments include, without limitation, those described above. In some embodiments, it is methacrylic acid (MAA).

The polyvalent metal crosslinker employed in the foregoing embodiments is generally in the form of a polyvalent metal complex containing the polyvalent metal moiety, an organic ligand moiety and, if the crosslinker is added as a chelate to the formulation in solubilized form, an alkaline moiety. The polyvalent metal ion may be that of beryllium, cadmium, copper, calcium, magnesium, zinc, zirconium, barium, aluminum, bismuth, antimony, lead, cobalt, iron, nickel or any other polyvalent metal which can be added to the composition by means of an oxide, hydroxide, or basic, acidic or neutral salt which has an appreciable solubility in water, such as at least about 1% by weight therein. The alkaline moiety may be provided by ammonia or an amine. The organic ligand may be ammonia or an amine or an organic bidentate amino acid. The amino acid bidentate ligand is can be an aliphatic amino acid, but may also be a heterocyclic amino acid. Examples of polyvalent metal complexes include, but are not limited to, the diammonium zinc (II) and tetra-ammonium zinc (II) ions, cadmium glycinate, nickel glycinate, zinc glycinate, zirconium glycinate, zinc alanate, copper beta-alanate, zinc beta-alanate, zinc valanate, and copper bisdimethylamino acetate.

The amount of polyvalent metal compound added can be from about 15% to 100% of the equivalent of the acid residues of the copolymer emulsion, and may be at least about 15%. In some embodiments, the amount of the polyvalent metal ionic crosslinking agent is from about 35% to 80% of the equivalent of the acid residues of the copolymer emulsion. In some embodiments, the amount of the polyvalent metal crosslinking agent is from about 40% to 70% of the equivalent of the acid residues.

In some embodiments, the metal-crosslinked copolymer is derived from butyl acrylate, methyl methacrylate, styrene, hydroxy ethyl methacrylate, acrylic acid, and methacrylic acid, crosslinked with zinc ion. In some embodiments, the amounts, based on the 30 weight of the copolymer, are: from 28 to 40 weight percent butyl acrylate, from 5 to 20 weight percent methyl methacrylate, from 35 to 45 weight percent styrene, from 1 to 10 weight percent hydroxy ethyl methacrylate, from 1 to 10 weight percent acrylic acid and from 1 to 10 weight percent methacrylic acid, crosslinked with zinc ion. In some embodiments, the amounts, based on the weight of the copolymer, are: from 29 to 31 weight percent butyl acrylate, from 15 to 17 weight percent methyl methacrylate, from 39 to 41 weight percent styrene, from 4 to 6 weight percent hydroxy ethyl methacrylate, from 4 to 6 weight percent acrylic acid and from 4 to 6 weight percent methacrylic acid, crosslinked with zinc ion (about 0.9 equivalents).

In some embodiments, the polymer binder is a copolymer of a vinyl aromatic monomer such as styrene, a-methyl styrene, p-methyl styrene, or t-butylstyrene and a diene monomer, such as butadiene or isoprene. In some embodiments, such binders are copolymers of styrene and butadiene. In some embodiments, the weight ratio of styrene to butadiene in the 10 copolymer ranges from 70:30 to 30:70.

The balance of the aqueous compositions, containing surfactant, water, polymer binder, optional poly(ethylene oxide), and any optional ingredients or co-solvents, is water. In some embodiments, the amount of water in the aqueous coating composition is 20 weight percent or less, alternatively 18 weight percent or less, or alternatively 16 weight percent or less, based on the total weight of the coating composition. In some embodiments, the amount of water in the aqueous coating composition is 5 weight percent or more, alternatively 10 weight percent or more, or alternatively 15 weight percent or more, based on the total weight of the coating composition.

Methods for preparation of water insoluble polymer binders suitable for use in the composition are known in the art and not especially limited. The preparation method may be selected from solution, dispersion and emulsion polymerization processes. Processes are also described in WO2015/073292, which is hereby incorporated by reference in its entirety.

In some embodiments, the polymer binder is present in the aqueous coating composition at a concentration of from 1 to 35 weight percent, from 5 to 20 weight percent, based on the total weight of the aqueous composition (including optional ingredients as described herein).

In some embodiments, the hydrophobic polymer is cured. Curing can be performed by many different methods and chemistries. Examples of such curing chemistries include, but are not limited to what is referred to as "Fenton's chemistry" (i.e., wet oxidation using hydrogen peroxide and iron salts, persulfates chemistry, azobisisobutyronitrile initiated curing. Other curing agents, include, but are not limited to, benzoyl peroxide, dicumyl peroxide, and more soluble persulfate compounds such as ammonium or sodium salts that can be used as well, alone or in combination with drying salts, such as, but not limited to, zirconium 2-ethylhexanoate, cobalt 2-ethylhexanoate, cobalt naphthenate, manganese chloride, or manganese acetate. The above can be used in any combination with one another.

Curing can also be performed using sulfur. For example, sulfur curing can be performed with sulfur alone, or with activators (activators increase the efficiency of the cross-linking reaction). Activators include, but are not limited to, sulfonamides. Sulfonamide curing can be accelerated through the use of accelerators (Accelerators increase the rate of reaction, not necessarily the efficiency of the reaction). In some embodiments, accelerators are often a combination of a metal oxide and a fatty acid, including but not limited to a zinc oxide/stearic acid combination. Zincdialkyldithiocarbamates can also be used as accelerators, without the need for an activator because the Zn is incorporated in the accelerator. These are only a few examples of possible chemistries known in the art for vulcanization, activators, and accelerants. Other variants are listed in Odian, Principles of Polymerization $3^{rd}$ edition p 700-707, can also be used, which is hereby incorporated by reference, as well as others known in the art. These other crosslinking variants could be used to cure the hydrophobic polymer. In some embodiments, other curing techniques can be used to cure the hydrophobic polymer, including plasma surface treatment, electron beam curing, UV curing, or crosslinking initiation via use of ionic species, and the like.

The polymer can also be cured using a metal, which can accelerate the rate of curing, which can also be referred to as "drying." Such metals can also be referred to as "drying agents." Examples of drying agents include, but are not limited to, cobalt, manganese, iron, cerium, vanadium, lead, zirconium, bismuth, barium, aluminium, strontium, calcium, zinc, lithium, potassium, or any combination thereof. Metal salts of these metals can also be used as a drying agent. For example, the metals are often present as metal salts with the ethylhexanoate anion. Without being bound to any specific theory, the use of ethylhexanoate or other organic anions help improve miscibility of the metal salt with the polymer phase of an emulsion. Use of multiple drier chemicals can often yield a significant improvement over single drier species use. Accordingly, metal oxides, metal salts, and metal compounds can be used to cure the hydrophobic polymer.

In some embodiments, a coagent is used in the curing reaction. Coagents can also be referred to "reactive diluents." The coagents have unsaturated groups that can participate in the crosslinking and accelerate both curing rate and overall degree of crosslinking. Examples of coagents, include, but are not limited to, high vinyl polybutadienes, and polymers, oligomers thereof, or small molecules that contain maleate, vinyl, ethynyl or acetylenic moieties, with, in some embodiments, functionality greater than or equal to 2. In some embodiments, these coagents (reactive diluents) remain a part of the hydrophobic polymer network, and the coating on the particle, after curing has taken place. Examples of coagents are described in Vanderbilt Rubber Handbook, 13th Edition, which is incorporated by reference in its entirety, and for example, pp 88-91, which is also specifically incorporated by reference. Examples of coagents also include those in the following table:

| Trade Name | Description |
| --- | --- |
| SR 297 (BGDMA) | Difunctional Liquid Methacrylate |
| SR 350 (TMPTMA) | Trifunctional Liquid Methacrylate |
| Saret ® SR 516 | Scorch-Retarded Liquid Dimethacrylate |
| Saret SR 517 | Scorch-Retarded Liquid Trimethacrylate |
| Saret SR 519 | Scorch-Retarded Liquid Triacrylate |
| Saret SR 521 | Scorch-Retarded Liquid Dimethacrylate |
| Saret SR 522 | Scorch-Retarded Solid Diacrylate |
| Saret SR 633 | Scorch-Retarded Metallic Diacrylate |
| Saret 75 EPM 2A (75% active) | |
| Saret SR 634 | Scorch-Retarded Metallic Dimethacrylate |
| Saret 75 EPM 2M (75% active) | |
| VANLINK ™ TAC Coagent | Triallyl Cyanurate |
| VANAX ®MBM Accelerator | Bis-maleimide |
| Ricon ® 100 | Styrene/Butadiene Copolymer (70% vinyl) |
| Ricon 153 | 85% Vinyl Liquid Polybutadiene |
| Ricon 153 D (65% active) | |
| Ricon 154 | 90% Vinyl Liquid Polybutadiene |
| Ricon 154 D (65% active) | |
| Ricobond ® 1731 | Maleinized Liquid Polybutadiene (26% vinyl) |
| Ricobond 1731 HS (69% active) | |
| Ricobond 1756 | Maleinized Liquid Polybutadiene (70% vinyl) |
| Ricobond 1756 HS (69.5% active) | |

The polymer can be cured prior to coating the sand (proppant), after coating the sand, at the same time. Any method of curing can be used, such as those described in the Examples. The Examples can be modified by increasing or decreasing the temperature or by increasing or decreasing the amount of time that the polymer is allowed to cure.

Accordingly, in some embodiments, a hydrophobic coated particle is prepared by contacting a cured and/or curable hydrophobic polymer with a particle (e.g. sand, proppant, and the like). The polymer can be completely cured or substantially cured. The hydrophobic polymer can be allowed to cure for about 1 to about 10 minutes, about 1, about 2, about 3, about 4, about 5, about 6, about 7, about 8, about 9, or about 10 minutes or any range in between. In some embodiments, the hydrophobic polymer that has been cured is contacted with the particle to coat the particle in an emulsion. In some embodiments, the cured and/or curable hydrophobic polymer is a cured and/or curable polybutadiene.

In some embodiments, the hydrophobic polymer is cured by contacting the polymer with iron or a salt thereof (e.g. ferrous sulfate) and a radical initiator (e.g. hydrogen peroxide) in an amount sufficient cure the polymer. In some embodiments, the hydrophobic polymer is cured by contacting the polymer with potassium persulfate in water in an amount sufficient to cure the polymer. In some embodiments, the hydrophobic polymer is cured by contacting the polymer with azobisisobutylnitrile in an amount sufficient to cure the polymer. In some embodiments, the curing occurs at room temperature. In some embodiments, In some embodiments, the curing occurs at a temperature of about 15 to about 25 C, about 18 to about 25 C, or about 20 to about 25 C. As described herein, in some embodiments, the hydrophobic polymer is a polybutadiene. In some embodiments, the polybutadiene is a non-functionalized polybutadiene, a maleic anhydride functionalized polybutadiene, a hydroxyl-amine, amide, keto, aldehyde, carboxyl, mercaptan, epoxy, alkoxy silane, alkoxy, azide, halide terminated polybutadiene or any combination thereof.

In some embodiments, the hydrophobic polymer is crosslinked by contacting the polymer with a radical initiator. Examples of radical initiators are described herein and include, but are not limited to, AIBN and peroxides (e.g. dicumyl peroxide), and ferrous sulfate initiators. The polymer can be contacted with the radical initiator in an amount sufficient to crosslink the polymer. In some embodiments, the hydrophobic polymer is crosslinked by contacting the polymer with azobisisobutylnitrile in an amount sufficient to cure the polymer. In some embodiments, the hydrophobic polymer is crosslinked by contacting the polymer with a peroxide in an amount sufficient to cure the polymer. In some embodiments, the hydrophobic polymer is crosslinked by contacting the polymer with ferrous sulfate (e.g. ferrous sulfate heptahydrate) in an amount sufficient to cure the polymer. In some embodiments, the crosslinking occurs at room temperature. In some embodiments, In some embodiments, the crosslinking occurs at a temperature of about 15 to about 25 C, about 18 to about 25 C, or about 20 to about 25 C. As described herein, in some embodiments, the hydrophobic polymer that is crosslinked is a polyalphaolefin, such as those described herein.

The cured or crosslinked polymer can then be contacted (e.g. mixed or sprayed as described herein) with the particle (e.g. sand) to coat the particle. The coated particle is considered to be a hydrophobic coated particle. The coating can take place using particles (e.g., sand) at an elevated temperature, such as at a temperature of about 150 to about 300 F, about 200 to about 300 F, about 225 to about 275 F, about 235 to about 265 F, about 200 F, about 210 F, about 220 F, about 230 F, about 240 F, about 250 F, or about 260 F. The particle can be allowed to cool before use. The cooling and curing, can for example take place while the particle is in storage or in transit to a well site or other location. In some embodiments, the hydrophobic polymer is a polybutadiene, or poly-isoprene or chloroprene. In another embodiments, the hydrophobic polymer may be a di or tri or ter-block polymers or a combination that are terminated with hydroxyl, amine, amide, keto, aldehyde, mercaptan, carboxylic, epoxy, halide, azide, alkoxy silane functionality. Examples of such diblock and triblock or terblock polymers backbone are not limited to styrene butadiene, acrylonitrile butadiene styrene, acrylonitrile butadiene, ethylene-acrylate rubber, polyacrylate rubber, isobutylene isoprene butyl, styrene ethylene butylene styrene copolymer, styrene butadiene carboxy block copolymer, chloro isobutylene isoprene, ethylene-acrylate rubber, styrene-acrylonitrile, polystyrene)-block-(polyisoprene) poly(ethylene-vinyl acetate) polyethyleneglycol-polylactic acid, polyethyleneglycol-polylactide-co-glycolide, polystyrene-co-poly(methyl methacrylate), poly(styrene-block-maleic anhydride), Poly(styrene)-block-poly(acrylic acid), Poly(styrene-co-methacrylic acid, poly(styrene-co-α-methylstyrene), poly(ε-caprolactone)-poly(ethylene glycol), styrene-isoprene-styrene.

In some embodiments, the particle is heated before being contacted with a coating or material described herein. The particle can be, in some embodiments, heated before being contacted, mixed, or sprayed with any coating or agent described herein. In some embodiments, the particle is heated to a temperature of about 150 to about 300 F, about 200 to about 300 F, about 225 to about 275 F, about 235 to about 265 F, about 200 F, about 210 F, about 220 F, about 230 F, about 240 F, about 250 F, or about 260 F. In some embodiments, the particle is not heated or is at a temperature of about 60 to about 80 F before being contacted with a coating or material described herein. In some embodiments, the particle is at a temperature of about 70 to about 80 F, about 70 to about 75 F, about 75 to about 80 F.

In some embodiments, the hydrophobic coated particle is free of a compatibilizing agent. In some embodiments, the hydrophobic coated particle is free of a compatibilizing agent, coupling agent, a silane and/or a siloxane.

In some embodiments, the coated particulates and/or proppants described herein are substantially free, or free, of an agent that is acting as a frother. An agent is acting as a frother if the agent increases the surface tension (bubble strength) of air bubbles in solution. However, the agent should be added with the intent of acting as a frother. Thus, although a surfactant may in some instances act as a frother, it can also act independently as a compatibilizing agent for attachment of the hydrophobic polymer to the particles. A small amount of surfactant may also be added to initially reduce the possibility of formation of bubbles or plastrons on particles when first exposed to water, but prior to introduction into a blender for hydraulic fracturing slurry preparation, so as to avoid snaking and possible cavitation and blender or pump damage. In this case the frothers do not need to be alcohols. In some embodiments, the coated particulates and/or proppants contain less than 5%, 4%, 3%, 2%, 1%, 0.9%, 0.8%, 0.7%, 0.6%, 0.5%, 0.4%, 0.3%, 0.2%, or 0.1% of a frother by wt %.

In some embodiments, the % wt of the hydrophobic polymer is greater than 0% wt of the particulate or proppant, but less than or equal to 0.5% wt of the particulate or proppant, less than or equal to 0.4% wt of the particulate or proppant, less than or equal to 0.3% wt of the particulate or proppant, or less than or equal to 0.2% wt of the particulate or proppant. In some embodiments, the % wt of the hydrophobic polymer is about 0.01% wt to about 1% wt, about 0.2% wt to about 1% wt, about 0.3% to about 1%, about 0.4% to about 1%, about 0.5% to about 1%, 0.01% wt to about 0.9% wt, about 0.2% wt to about 0.9% wt, about 0.3% wt to about 0.9% wt, about 0.4% wt to about 0.9% wt, about 0.5% wt to about 0.9% wt, 0.01% wt to about 0.8% wt, about 0.2% wt to about 0.8% wt, about 0.3% wt to about 0.8% wt, about 0.4% wt to about 0.8% wt, about 0.5% wt to about 0.8% wt, 0.01% wt to about 0.7% wt, about 0.2% wt to about 0.7% wt, about 0.3% wt to about 0.7% wt, about 0.4% wt to about 0.7% wt, about 0.5% wt to about 0.7% wt, 0.01% wt to about 0.6% wt, about 0.2% wt to about 0.6% wt, about 0.3% wt to about 0.6% wt, about 0.4% wt to about 0.6% wt, about 0.5% wt to about 0.6% wt, 0.01% wt to about 0.5% wt, about 0.2% wt to about 0.5% wt, about 0.3% wt to about 0.5% wt, about 0.4% wt to about 0.5% wt, 0.01% wt to about 0.4% wt, about 0.2% wt to about 0.4% wt, about 0.3% wt to about 0.4% wt, about 0.4% wt, 0.01% wt to about 0.3% wt, about 0.2% wt to about 0.3% wt, 0.01% wt to about 0.2%, 0.01% wt to about 0.1% of the particulate or proppant. Other % wt are provided herein and the hydrophobic polymer can also be in those proportions as well.

In some embodiments, the coating is present in similar % wt amounts. Accordingly, in some embodiments, the % wt of the coating is greater than 0% wt of the particulate or proppant, but less than or equal to 0.5% wt of the particulate or proppant, less than or equal to 0.4% wt of the particulate or proppant, less than or equal to 0.3% wt of the particulate or proppant, or less than or equal to 0.2% wt of the particulate or proppant. In some embodiments, the % wt of the coating is about 0.01% wt to about 1% wt, about 0.2% wt to about 1% wt, about 0.3% to about 1%, about 0.4% to about 1%, about 0.5% to about 1%, 0.01% wt to about 0.9% wt, about 0.2% wt to about 0.9% wt, about 0.3% wt to about 0.9% wt, about 0.4% wt to about 0.9% wt, about 0.5% wt to about 0.9% wt, 0.01% wt to about 0.8% wt, about 0.2% wt to about 0.8% wt, about 0.3% wt to about 0.8% wt, about 0.4% wt to about 0.8% wt, about 0.5% wt to about 0.8% wt, 0.01% wt to about 0.7% wt, about 0.2% wt to about 0.7% wt, about 0.3% wt to about 0.7% wt, about 0.4% wt to about 0.7% wt, about 0.5% wt to about 0.7% wt, 0.01% wt to about 0.6% wt, about 0.2% wt to about 0.6% wt, about 0.3% wt to about 0.6% wt, about 0.4% wt to about 0.6% wt, about 0.5% wt to about 0.6% wt, 0.01% wt to about 0.5% wt, about 0.2% wt to about 0.5% wt, about 0.3% wt to about 0.5% wt, about 0.4% wt to about 0.5% wt, 0.01% wt to about 0.4% wt, about 0.2% wt to about 0.4% wt, about 0.3% wt to about 0.4% wt, 0.01% wt to about 0.3% wt, about 0.2% wt to about 0.3% wt, 0.01% wt to about 0.2%, 0.01% wt to about 0.1% of the particulate or proppant. Other % wt are provided herein and the coating can also be in those proportions as well.

In some embodiments, the coated particulates (proppant solids) are substantially free or completely free of hydrogels. For the avoidance of doubt, embodiments provided herein can provide with coated proppants or particulates that include hydrogels or are substantially free or completely free of hydrogels regardless of where they are described herein. In some embodiments, the coated particulates contain less than 5%, 4%, 3%, 2%, 1%, 0.9%, 0.8%, 0.7%, 0.6%, 0.5%, 0.4%, 0.3%, 0.2%, or 0.1% of a hydrogel by wt %.

Various processes are described herein for adding coatings. Such processes can be used or modified to add the coatings and materials described herein. For example, the sprayers described below can be used to apply the coating comprising the compatibilizing agent and the hydrophobic polymer. The coatings can also be applied according to other resin coating methods, such as those described in U.S. Provisional Application No. 62/072,479 filed Oct. 30, 2014 and U.S. Provisional Application No. 62/134,058, filed Mar. 17, 2015, U.S. patent application Ser. No. 14/928,379, filed Oct. 30, 2015, and PCT Application No. PCT/US2015/058313, filed Oct. 30, 2015, each of which are hereby incorporated by reference in its entirety. For example, in some embodiments, the coatings can be applied using mixers, where the particles and the coatings, either component by component or simultaneously are mixed in mixers and then discharged from the mixers. The mixing can be done at the temperatures described herein. The particles can also be heated as described herein prior to being added to the mixer or once added to the mixer.

In some embodiments, process for preparing coated particulate are provided. In some embodiments, the coated particulate comprises a particulate core coated with a compatibilizing agent and a hydrophobic polymer. In some embodiments, the process comprises contacting the particulate core with the compatibilizing agent and the hydrophobic polymer under conditions sufficient to coat the particulate core to produce the coated particulate. The compatibilizing agent and the hydrophobic polymer can be contacted (mixed, baked, sprayed, adsorbed onto, etc. . . . ) simultaneously or sequentially. In some embodiments, the core is contacted initially with the compatibilizing agent followed by the hydrophobic polymer. In some embodiments, the core is contacted initially with the hydrophobic polymer followed by the compatibilizing agent. In some embodiments, the core is contacted with the compatibilizing agent for a period of time by itself and then together with the hydrophobic polymer.

In some embodiments, the coated particulate comprises a particulate core coated with a hydrophobic polymer or cured and/or curable hydrophobic polymer. As described herein and above, the polymer can be cured before or after is coated onto the particulate core. In some embodiments, the process comprises contacting the particulate core with the hydrophobic polymer under conditions sufficient to coat the particulate core to produce the coated particulate. In some embodiments, the process comprises contacting the particulate core with the hydrophobic polymer with a curing agent under conditions sufficient to coat the particulate core with a cured and/or curable hydrophobic polymer to produce the coated particulate. The hydrophobic polymer and curing agent can be contacted (mixed, baked, sprayed, adsorbed onto, etc. . . . ) simultaneously or sequentially. Examples of processes of coating a particulate core with a hydrophobic polymer, including a cured and/or curable hydrophobic polymer, are described herein.

As described herein, particulates (proppants) can be contacted with various treatment agents. In some embodiments, the treatment agent comprises the compatibilizing agent. In some embodiments, the treatment agent comprises the hydrophobic polymer. In some embodiments, the treatment agent comprises the cured and/or curable hydrophobic polymer. In some embodiments, the treatment agent comprises the compatibilizing agent and the hydrophobic polymer and/or the curable hydrophobic polymer. The treatment agents can be applied sequentially or simultaneously. For example, in some embodiments, the particulate core is contacted with a first treatment agent comprising a compatibilizing agent and a second treatment agent comprising a hydrophobic polymer or cured and/or curable hydrophobic polymer. In another non-limiting example, the particulate core is contacted with the first treatment agent and the second treatment agent simultaneously. In some embodiments, the particulate core is contacted with the first treatment agent and the second treatment agent sequentially. In some embodiments, a particulate core is not contacted with a compatibilizing agent.

The processes provided herein, therefore, provide a process that comprises coating a particulate core with a compatibilizing agent to produce a particulate coated with the compatibilizing agent; and coating the particulate coated with the compatibilizing agent with a hydrophobic polymer and/or a cured and/or curable hydrophobic polymer. In some embodiments, the compatibilizing agent encapsulates the particulate core and a first surface of the hydrophobic polymer binds to the compatibilizing agent and a second surface of the hydrophobic polymer is exposed to provide an exposed hydrophobic surface of the coated particulate. The hydrophobic polymer can be a cured and/or curable hydrophobic polymer. The hydrophobic polymer can also be a polymer that can be crosslinked. Examples of these include, but are not limited to, the polybutadienes and polyalphaolefins described herein.

The processes can be used to produce a coated particulate that has enhanced particulate transport as compared to a particulate without the exposed hydrophobic surface.

The compatibilizing agent and/or hydrophobic polymers can be any agent that is suitable, such as, but not limited to, those described herein.

In some embodiments of the process provided herein, the compatibilizing agent is contacted with the particulate core at a temperature of about 20-25 C. In some embodiments, the hydrophobic polymer is contacted with the particulate core at a temperature of about 20-25 C. In some embodiments, the compatibilizing agent is contacted with the particulate core at a temperature of at least 100 C. In some embodiments, the hydrophobic polymer is contacted with the particulate core at a temperature of at least 100 C.

In some embodiments, the method for the producing the coated particulates can be implemented without the use of solvents. Accordingly, the mixture obtained in the formulation process is solvent-free, or is essentially solvent-free. The mixture is essentially solvent-free, if it contains less than 20 wt %, less than 10 wt %, less than 5 wt %, less than 3 wt %, or less than 1 wt % of solvent, relative to the total mass of components of the mixture.

In some embodiments, during the formulation process, the proppant is heated to an elevated temperature and then contacted with the coating components. In some embodiments, the proppant is heated to a temperature from about 50° C. to about 150° C. to accelerate the coating of the particulate.

In addition to the systems described herein, a mixer can be used for the coating process and is not particularly restricted and can be selected from among the mixers known in the specific field. For example, a pug mill mixer or an agitation mixer can be used. For example, a drum mixer, a plate-type mixer, a tubular mixer, a trough mixer or a conical mixer can be used. In some embodiments, the mixing is performed in a rotating drum although a continuous mixer or a worm gear can also be used for a period of time within the range of 1-6 minutes, or a period of 2-4 minutes during which the coating components are combined and simultaneously reacted on the proppant solids within the mixer while the proppant solids are in motion.

Mixing can also be carried out on a continuous or discontinuous basis. In suitable mixers it is possible, for example, to add the agents continuously to the heated proppants. For example, the compatibility agent and/or the hydrophobic polymer can be mixed with the particulates in a continuous mixer (such as a worm gear) in one or more steps to make one or more layers of the coating.

The temperature can be modified or restricted as described herein. Additionally, in some embodiments, the coating step is performed at a temperature of from about 10° C. to about 200° C., from about 10° C. to about 150° C., from about 20° C. to about 200° C., from about 20° C. to about 150° C., from about 30° C. to about 200° C., from about 30° C. to about 150° C., from about 40° C. to about 200° C., from about 40° C. to about 150° C., from about 50° C. to about 200° C., from about 50° C. to about 150° C., from about 60° C. to about 200° C., from about 60° C. to about 150° C., from about 70° C. to about 200° C., from about 70° C. to about 150° C., from about 80° C. to about 200° C., from about 80° C. to about 150° C., from about 90° C. to about 200° C., from about 90° C. to about 150° C., from about 1000° C. to about 200° C., or from about 100° C. to about 150° C. In some embodiments, it is the particulate that is at the temperature. In some embodiments, the reaction (contacting/mixing) is at the temperature. Other temperatures can also be used as described herein.

In some embodiments, the agents may be applied in more than one layer. In some embodiments, the coating process is repeated as necessary (e.g. 1-5 times, 2-4 times or 2-3 times) to obtain the desired coating thickness. In some embodiments, the thickness of the coating of the particulate can be adjusted and used as either a relatively narrow range of coated particulate size or blended with proppants of other sizes, such as those with more or less numbers of coating layers of the compositions described herein, so as to form a coated particulate blend have more than one range of size distribution. In some embodiments, a range for coated particulate is about 20-70 mesh.

In some embodiments, the coated proppants can be baked or heated for a period of time. In some embodiments, baking or heating step is performed like a baking step at a temperature from about 100°-200° C. for a time of about 0.5-12 hours or at a temperature from about 125°-175° C. for 0.25-2 hours. In some embodiments, the coated particulate is cured for a time and under conditions sufficient to produce a coated particulate that exhibits a loss of coating of less than 25 wt %, less than 15 wt %, or less than 5 wt % when tested according to ISO 13503-5:2006(E).

In addition to the agents or components described herein, the coated particulate can be coated in a solution that comprises an antifreezing agent. Freezing of proppants in a transport vehicle (e.g. train, truck, car, and the like) can be a problem when temperatures are below or near freezing of the temperature of water. Therefore, in some embodiments, to avoid the freezing effect or the risk of freezing the materials described herein are added in a composition (e.g. solution) comprising an antifreeze agent. Examples of an antifreeze agent include, but are not limited to, propylene glycol, methanol, ethanol, sodium chloride, potassium chloride, ethylene glycol, glycerol, or any combination thereof, and the like. In some embodiments, however, the coating does not comprise, or is free of, an antifreezing agent.

Additionally, the coatings described herein can be applied with a tracer to monitor the coating. Due to the very low levels of coating applied to produce some coated particulate cores (0.1 to 0.5% solids applied to sand), it can be difficult to differentiate between coated particulates and uncoated particulates by visual inspection. It can also be difficult to judge the coating efficiency of a coating process when one cannot accurately measure coating thicknesses or coverage areas. Therefore, to overcome these difficulties a tracer that can be detected can be used. Examples include, but are not limited to, fluorescent dyes. In some embodiments, the tracer can be coated onto the particulate core with the compatibilizing agent and the hydrophobic polymer to coat the particulate core. The tracer can be in the same solution as the compatibilizing agent and/or the hydrophobic polymer or it can be in a different solution but it applied at the same time or essentially the same time.

As described herein, agents can be applied to the particulates in a short amount of time. The same can time limits can be applied to the application of the compatibilizing agents and/or the hydrophobic polymers to the particulates. For example, in some embodiments, the compatibilizing agent is contacted with the particulates for about less than five, four, three, or two seconds. In some embodiments, the hydrophobic polymer is contacted with the particulates for about less than five, four, three, or two seconds.

In some embodiments, the particulates are contacted more than once with the hydrophobic polymer, cured or curable hydrophobic polymer and/or compatibilizing agent.

As described herein for other process, in some embodiments, the contacting comprises spraying said compatibilizing agent and/or hydrophobic agent onto said particulate core while said particulate core is in free fall, guided free fall, or during pneumatic transport. In some embodiments, the particulate is contacted with the compatibilizing agent and/or the hydrophobic polymer for the time it takes said particulate to fall a distance of four feet by gravity.

In some embodiments, the contacting comprises spraying said particulates substantially simultaneously from more than one direction. They can be sprayed with one or more treatment agents. The treatment agents can contain the same components or different components. For example, in some embodiments, each of the treatment agents comprises both the compatibilizing agent and the hydrophobic polymer. However, in some embodiments, one agent comprises the compatibilizing agent and another agent comprises the hydrophobic polymer. Thus, just as in other embodiments, the components can be applied to the particulates separately in different or the same compositions (e.g. solutions).

In some embodiments, coated particulates are provided, wherein the coating is a mixture of 1) an alkoxylate or an alkoxylated alcohol, 2) an acrylic polymer, and 3) an amorphous polyalphaolefin. In some embodiments, the coating comprises a plurality of alkoxylated alcohols. In some embodiments, the coating comprises a plurality of different alkoxylated alcohols. In some embodiments, the coating does not comprise an alkoxylate. As described herein, the coating can be free of a hydrogel or comprise a hydrogel as described herein. In some embodiments, the coating is free of a frother, however, in some embodiments, it can also comprise a frother. In some embodiments, the coating further comprises fumed silica. The alkoxylate can have a formula of Formula I, II, III, IV, or V as described herein.

In some embodiments, the acrylic polymer comprises an aqueous dispersion of particles made from a copolymer, based on the weight of the copolymer, comprising: i) from 90 to 99.9 weight percent of at least one ethylenically unsaturated monomer not including component ii; and ii) from 0.1 to 10 weight percent of (meth)acrylamide. In some embodiments, the acrylic polymer comprises an aqueous dispersion of particles made from a copolymer, based on the weight of the copolymer, comprising: i) from 80 to 99.9 weight percent of at least one ethylenically unsaturated monomer not including component ii; and ii) from 0.1 to 20 weight percent of a carboxylic acid monomer.

In some embodiments, the acrylic polymer comprises an aqueous dispersion of particles made from a copolymer, based on the weight of the copolymer, comprising: i) from 75 to 99 weight percent of at least one ethylenically unsaturated monomer not including component ii; ii) from 1 to 25 weight percent of an ethylenically unsaturated carboxylic acid monomer stabilized with a polyvalent metal. In some embodiments, the polyvalent metal is zinc or calcium.

In some embodiments, the ethylenically unsaturated carboxylic acid monomer is (meth)acrylic acid. In some embodiments, the acrylic polymer comprises a vinyl aromatic diene copolymer. In some embodiments, the polyalphaolefin is a crosslinked polyalphaolefin polymer. In some embodiments, the crosslinked polyalphaolefin polymer is a potassium persulfate crosslinked polyalphaolefin polymer, an azobisisobutylnitrile crosslinked polyalphaolefin polymer, or a ferrous sulfate-hydrogen peroxide crosslinked polyalphaolefin polymer.

In some embodiments, the coated particulates are prepare by a method. In some embodiments, the method comprises mixing the particulates with 1) an alkoxylate or an alkoxylated alcohol, 2) an acrylic polymer, and 3) an amorphous poly-alpha-olefin. In some embodiments, the methods further comprise mixing the particulate with fumed silica.

In some embodiments, the total weight of the alkoxylate or an alkoxylated alcohol and the acrylic polymer to the weight of the particulates is in a ratio of about 0.5:1000 to 1.25:1000. In some embodiments, the ratio is about 0.5:1000, about 0.6:1000, about 0.7:1000, about 0.8:1000, about 0.9:1000, about 1.0:1000, about 1.1:1000, about 1.2:1000, about 1.3:1000, about 1.4:1000, about 1.5:1000, about 1.6:1000, about 1.7:1000, about 1:8:1000, about 1.9:1000, or about 2.0:1000 (1:500). In some embodiments, as described herein the alkoxylate or an alkoxylated alcohol and the acrylic polymer is ROHMIN DC-5500.

In some embodiments, the total weight of the amorphous poly-alpha-olefin to the weight of the particulates is in a ratio of about 0.75:1000 to 3.00:1000. In some embodiments, the total weight of the amorphous poly-alpha-olefin to the weight of the particulates is in a ratio of about 1.75:1000 to 2.75:1000. In some embodiments, the total weight of the amorphous poly-alpha-olefin to the weight of the particulates is in a ratio of about 2.50:1000. In some embodiments, the ratio is about 0.5:1000, about 0.6:1000, about 0.7:1000, about 0.8:1000, about 0.9:1000, about 1.0:1000, about 1.1:1000, about 1.2:1000, about 1.3:1000, about 1.4:1000, about 1.5:1000, about 1.6:1000, about 1.7:1000, about 1:8:1000, about 1.9:1000, about 2.0:1000 (1:500), about 2.1:1000, about 2.2:1000, about 2.3:1000, about 2.4:1000, about 2.5:1000, about 2.6:1000, about 2.7:1000, about 2.8:1000, about 2.9:1000, or about 3.0:1000. As described herein, in some embodiments, the amorphous poly-alpha-olefin is VESTOPLAST® W-1750 (amorphous poly-alpha-olefins dispersion).

In some embodiments, the ratio of the fumed silica to the particulate is about 0.5:1000 to about 1.5:1000, about 0.75:1000 to about 1.25:1000, about 0.8:1000 to about 1.15:1000, about 0.9:1000 to about 1.1:1000, or about 1:5:1000 to about 2.0:1000(1:500). In some embodiments, the ratio of the fumed silica to the particulate is about 0.5:1000, about 0.6:1000, about 0.7:1000, about 0.8:1000, about 0.9:1000, about 1.0:1000, about 1.1:1000, about 1.2:1000, about 1.3:1000, about 1.4:1000, about 1.5:1000, about 1.6:1000, about 1.7:1000, about 1:8:1000, about 1.9:1000, or about 2.0:1000 (1:500).

In some embodiments, the method comprises mixing the particulate with 1) the alkoxylate or the alkoxylated alcohol and 2) the acrylic polymer; and mixing the product with the amorphous poly-alpha-olefin to produce the coated particulate. In some embodiments, the method comprises mixing the particulate with 1) the alkoxylate or the alkoxylated alcohol and 2) the acrylic polymer; and mixing the product with the amorphous poly-alpha-olefin and fumed silica to produce the coated particulate. In some embodiments, the fumed silica is added to the particulate mixture before the amorphous poly-alpha-olefin is mixed with the sand.

In some embodiments, the method comprises mixing the particulate with 1) the alkoxylate or the alkoxylated alcohol and 2) the acrylic polymer, mixing the product with fumed silica, and then mixing the product with amorphous poly-alpha-olefin.

In some embodiments of the methods described herein, the methods further comprise mixing the product with a second amorphous poly-alpha-olefin to produce the coated particulate. In some embodiments, the second-amorphous poly-alpha-olefin is the same or different than the amorphous poly-alpha-olefin of the previous step(s).

In some embodiments, the particulates are pre-heated as described herein. In some embodiments, the chemicals are heated as described herein before being mixed. The particulates and the components can also be heated during the mixing at the temperatures described herein. In some embodiments, the methods are performed at a temperature of about 200 to about 300 F. In some embodiments, the methods are performed at a temperature of about 225 to about 275 F. In some embodiments, the method are performed at a temperature of about 240 to about 260 F.

In some embodiments, the particulates are mixed with the alkoxylate or the alkoxylated alcohol, the acrylic polymer, and the amorphous poly-alpha-olefin for about 30 to about 180 seconds.

In some embodiments, the alkoxylate or the alkoxylated alcohol, the acrylic polymer, and the amorphous poly-alpha-olefin are mixed before being contacted with the particle. In some embodiments, the components are mixed and are allowed to sit for about 12 hours before being mixed with the particles. The components can also be heated separately before being mixed. In some embodiments, the components are heated for up to 12 hours before being mixed and then coated the sand in a mixer as described herein.

In some embodiments, the process is performed without the use of an organic solvent for one or more of the mixing steps. In some embodiments, the process is performed completely without the use of an organic solvent. Without the use of an organic solvent can refer to a process where an organic solvent is not specifically used to assist coating the particulates. Traces of organic solvents that may be present on one of the components that is used to coat the sand does mean that an organic solvent is used in the process.

In some embodiments, the process comprises a drying step to remove any moisture.

In some embodiments, coated particulates are provided, wherein the coating comprises a mixture a polybutadiene and fumed silica. In some embodiments, the polybutadiene is a hydroxyl terminated polybutadiene. In some embodiments, the hydroxyl terminated polybutadiene has an average $M_w$ of about 6,200 and/or an average $M_n$ of about 2,800. In some embodiments, the hydroxyl terminated polybutadiene has a formula of

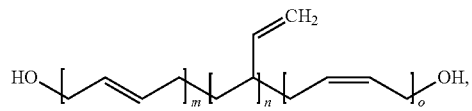

wherein m, n, and o are non-zero integers.

Hydroxyl-terminated polybutadiene oligomer reactant can be prepared, for example, as described in EP0690073A1, U.S. Pat. No. 5,043,484 and U.S. Pat. No. 5,159,123, each of which are hereby incorporated by reference in its entirety. These are non-limiting examples. The structure can be such that the hydroxyl groups are in predominantly primary, terminal positions on the main hydrocarbon chain and are allylic in configuration. In some embodiments, at least 1.8 hydroxyl groups are present per molecule on the average, and in some embodiments, there are at least from 2.1 to 3 or more hydroxyls per polymer molecule, for example, but not limited to, 2.1 to 2.8. The diene polymer has most of its unsaturation in the main hydrocarbon chain, such that m plus o in the formula above is greater than n. The formula should not be understood as implying that the polymers are necessarily in blocks, but that the cis-1,4; trans-1,4 and vinyl (1,2) unsaturation is usually distributed throughout the polymer molecule. This is true for all such formulae herein. The letter m may represent a number sufficient to give a trans-1,4 unsaturation content of 40-70 percent; n may be a number sufficient to give a 1,2-vinylic unsaturation content to the polymer in the range of 10-35 percent, while o may be sufficient to provide a cis-1,4-unsaturation of 10-30 percent, in some embodiments. In some embodiments, the polymer will contain largely trans-1,4-units, e.g. 50-65 percent and 15-25 percent cis-1,4-units, with 15-25 percent 1,2-units. Branching may also occur in the above polymers, especially those prepared at higher temperatures; ether and carbonyl linkages may appear in the lower molecular weight oligomer fractions. In some embodiments, the number average molecular weight of the oligomers of the formula is in the range of about 100 to about 20,000, and the hydroxyl (—OH) content of said products is in the range of 0.1 to 20 meq/g, or higher. In some embodiments, the number average molecular weight is in the range 200-5000 and the hydroxyl content is in the range of 0.05 to 10 meq/g. In some embodiments, polymer has an average Mw of about 6,200 and/or an average Mn of about 2,800.

In some embodiments, methods of preparing coated particulates are provided, wherein the methods comprise mixing a polybutadiene and fumed silica with the particulates to produce the coated particulates. In some embodiments, the polybutadiene is one that is described herein and above. In some embodiments, the total weight of the polybutadiene to the weight of the particulates is in a ratio of about 1.0:1000 to about 3.0:1000 or any ratio in between. In some embodiments, the ratio (polybutadiene:particulate) is about 1.5:1000 to about 3.0:1000, about 2.0:1000 to about 3.0:1000, about 2.1:1000 to about 3.0:1000, about 2.2:1000 to about 3.0:1000, about 2.3:1000 to about 3.0:1000, about 2.4:1000 to about 3.0:1000, about 2.5:1000 to about 3.0:1000, about 2.6:1000 to about 3.0:1000, about 2.7:1000 to about 3.0:1000, about 2.8:1000 to about 3.0:1000, or about 2.9:1000 to about 3.0:1000. In some embodiments, the ratio (polybutadiene:particulate) is about 1.0:1000, about 1.1:1000, about 1.2:1000, about 1.3:1000, about 1.4:1000, about 1.5:1000, about 1.6:1000, about 1.7:1000, about 1.8:1000, about 1.9:1000, about 2.0:1000, about 2.1:1000, about 2.2:1000, about 2.3:1000, about 2.4:1000, about 2.5:1000, about 2.6:1000, about 2.7:1000, about 2.8:1000, about 2.9:1000, or about 3.0:1000. In some embodiments, the ratio of the polybutadiene:particulate is about 1.0:500 to about 2.0:500, about 1.1:500 to about 2.0:500, about 1.2:500 to about 2.0:500, about 1.25:500 to about 2.0:500, about 1.3:500 to about 2.0:500, about 1.4:500 to about 2.0:500, about 1.4:500 to about 2.0:500, about 1.5:500 to about 2.0:500, about 1.6:500 to about 2.0:500, about 1.7:500 to about 2.0:500, about 1.8:500 to about 2.0:500, about 1.9:500 to about 2.0:500, about 1.1:500, about 1.15:500, about 1.2:500, about 1.25:500, about 1.3:500, about 1.35:500, about 1.4:500, about 1.45:500, or about 1.5:500.

In some embodiments, the total weight of the fumed silica to the weight of the particulates is in a ratio of about 1.5:1000 to about 2.5:1000, about 0.5:1000 to about 3.0:1000, about 1.0:1000 to about 3.0:1000, about 2.0:1000 to about 3.0:1000, about 2.2:1000 to about 3.0:1000, about 2.5:1000 to about 3.0:1000, or any ratio in between. In some embodiments, the ratio is about 0.5:1000 to about 1.5:1000, about 0.75:1000 to about 1.25:1000, about 0.8:1000 to about 1.15:1000, about 0.9:1000 to about 1.1:1000, or about 1:5:1000 to about 2.0:1000(1:500). In some embodiments, the ratio of the fumed silica to the particulate is about 0.5:1000, about 0.6:1000, about 0.7:1000, about 0.8:1000, about 0.9:1000, about 1.0:1000, about 1.1:1000, about 1.2:1000, about 1.3:1000, about 1.4:1000, about 1.5:1000, about 1.6:1000, about 1.7:1000, about 1:8:1000, about 1.9:1000, about 2.0:1000, about 2.1:1000, about 2.2:1000, about 2.3:1000, about 2.4:1000, about 2.5:1000, about 2.6:1000, about 2.7:1000, about 2.8:1000, about 2.9:1000, or about 3.0:1000.

In some embodiments, the polybutadiene, the fumed silica, and the particulates are mixed simultaneously. In some embodiments, the polybutadiene is mixed with the particulates prior to the particulates being mixed with the fumed silica. In some embodiments, the method is performed at a temperature of about 50 to about 100 F. In some embodiments, the method is performed at a temperature of about 60 to about 90 F. In some embodiments, the method is performed at a temperature of about 70 to about 75 F. In some embodiments, the method is performed at a temperature of about 70 to about 80 F, about 70 to about 75 F, about 75 to about 80 F. In some embodiments, the method is performed at about 65 to about 75 F or other temperature ranges described herein and above. In some embodiments, the particulates are mixed with the polybutadiene and the fumed silica for about 2 to about 3 minutes.

The hydrophobic coated particulates described herein can be used in conjunction with cleaning out a well bore after gas or oil has been extracted. For example, after the particulates have been injected into the well, some of the particles may end up in the well bore. This well bore can be cleaned out so as not to be clogged by the particles. This clean out can be performed by various methods. In some embodiments, methods of cleaning out a well bore comprising a coated particulate described herein, the method comprising injecting a gas into the well bore to suspend the coated particulates in the well bore and displacing the coated particulate from the well bore. In some embodiments, the gas is air, nitrogen, carbon dioxide, or any combination thereof. In some embodiments, the displacing comprises injecting a fluid into the well bore to displace the suspended particulates from the well bore.

The coated particulates described herein can also be used as friction reducers. As described in the Examples, friction reducers are used to decrease friction pressure encountered when the frac slurry is pumped through the treating string. This friction pressure is a key contributor to the surface treating pressure that pumping equipment must sustain during the fracturing treatment. The coated particulates, therefore, have the unexpected and beneficial property of reducing friction or can assist in using less of the friction reducers and obtaining the same output from the well. Accordingly, the hydrophobic coated particulates described herein can be used to reduce friction in a well or in a frac slurry. The ability to have reduced friction can also be used to put have a denser volume of coated particulates in the frac slurry because of the reduced friction. Thus, in some embodiments, more proppants (coated particulates) per gallon of fluid are used in the methods described herein. The coated particulates can also be used advantageously, in some embodiments, because it leads to a less pressure drop in the well, which leads to enhanced production of oil and gas out of the well as compared to untreated sand or other coated sands.

The coated particulates also have increased crush resistance. In some embodiments, a composition comprising a plurality of coated particulates as described herein will have less than about 9%, about 10%, or about 11% fines at about 5000, 6000, 7000, 8000, 9000, or 10000 psi. This will lead to increased buoyancy of the coated particulates as well, which also enhances production out of the well.

Devices and systems are described herein for applying the various compositions herein to particulates, such as, but not limited to sand. The compatibilizing agent, the hydrophobic polymer, and/or the cured and/or curable hydrophobic polymer can be utilized in the same devices and systems. Therefore, in some embodiments, the compatibilizing agent, the hydrophobic polymer, and/or the cured and/or curable hydrophobic polymer is contacted with the particulates immediately before, concurrently with, or immediately after passing the particulates through a static mixer. The process can also comprise applying the compatibilizing agent with a first spray assembly onto the particulate core for less than five seconds; passing the treated particulate core through a static mixer; and applying the hydrophobic polymer and/or cured and/or curable hydrophobic polymer with a second spray assembly onto the particulates for less than five seconds. In some embodiments, the first spray assembly applies a composition comprising both the compatibilizing agent, the hydrophobic polymer, and/or cured and/or curable hydrophobic polymer. In some embodiments, the second spray assembly applies a composition comprising the compatibilizing agent, the hydrophobic polymer, and/or cured and/or curable hydrophobic polymer. In some embodiments, first spray assembly applies both the compatibilizing agent, the hydrophobic polymer and/or cured and/or curable hydrophobic polymer while the second spray assembly only applies the hydrophobic polymer or cured and/or curable hydrophobic polymer. In some embodiments, first spray assembly applies both the compatibilizing agent, the hydrophobic polymer, and/or cured and/or curable hydrophobic polymer while the second spray assembly only applies the compatibilizing agent. In some embodiments, the process does not spray or coat the particulate with a compatibilizing agent.

In some embodiments, the process comprises coating the particulate with a dust reduction coating. Various dust reduction coatings are described herein and can be used. Other coatings and agents can be added to the particulate simultaneously or sequentially in addition to the coating comprising the compatibilizing agent, the hydrophobic polymer, and/or the cured and/or curable hydrophobic polymer. In some embodiments, the hydrophobic polymer, and/or the cured and/or curable hydrophobic polymer can act as a dust reduction coating.

Embodiments described herein and below can be used alone or combination with the embodiments described herein and above. Where appropriate the coatings and compositions can be substituted with one another as would be readily apparent to one of skill in the art. Therefore, although some embodiments may refer to a dust reduction coating, the coating can be replaced or supplemented with a coating comprising the compatibilizing agent, the hydrophobic polymer, and/or the cured and/or curable hydrophobic polymer.

Advantages of the embodiments described throughout and others would be readily apparent to one of skill in the art. In addition, certain advantages, the embodiments described herein include, but are not limited to, that the method that protects the proppant grains from the abrasion during handling or pneumatic transfer can also help to reduce wear on the pneumatic trucks that transport the sand for the transload to the wellsite. Thus, in some embodiments described herein not only help to control fugitive dust but also limit the wear on pipes and fittings used in moving and handling the solids. The embodiments described herein can also be effective in reducing the wear on the high pressure pipes and fittings that connect the discharge end of the high pressure pumps to a wellhead. For example, because a large amount of proppant is pumped, the high pressure pipes and fittings must be tested frequently to determine the effect of proppant abrasion on that strength. The embodiments described herein can help to reduce the wear on the equipment and thereby increase its useful life.

Controlling fugitive dust from frac sands and other proppants can be accomplished by methods and processes described herein. In some embodiments, the processes comprise contacting finely divided proppant solids with a treatment agent at an amount that is sufficient to suppress fugitive dust emissions from the treated solids and/or impart additional functional chemical benefits while still maintaining the freely flowing character of the treated solids, like those of the proppants before treatment, that continues to allow the effective use of gravity feed, pneumatic and belt conveyor handling systems. In some embodiments, the treatment occurs in 10 seconds or less and while the solids are in free fall, guided free fall (as in falling through a static mixer), or during pneumatic conveyance. During these periods, the free-flowing properties of the solids make them particularly amenable to contact with one or more dispersive liquid sprays and turbulent mixing. In some embodiments, the agent is a hydrophobic polymer and/or cured and/or curable hydrophobic polymer. Examples such polymers are described herein and include, but are not limited to polybutadienes, polyalphaolefin, and copolymers of polybutadienes, polyalphaolefin or a combination thereof.

Even when treated at an amount less than that required to make the solids perceptibly wet, i.e., in an amount of less than 0.7 wt % moisture to preserve free-flowing characteristics, or in some embodiments from 0.05-0.4 wt %, dust emissions are substantially reduced and what particulates are ejected due to discharge impact quickly settle. Such performance allows treated proppants to continue to be handled effectively with existing handling equipment like gravity-based discharge systems, moving belts, pneumatic conveyance systems, etc.

The solids and particulates described herein that can be treated are, and remain, finely divided, free-flowing, solids that generally have a size of about 0.2 mm to about 1 mm. Such solid sizes are used in hydraulic fracturing to prop open cracks formed downhole within the fractured strata. Such crack props, or "proppants" as they are known, must resist the crushing forces of crack closure to help maintain the flow of liquids and gases that have been trapped in the strata. Materials often used as proppant include coated and uncoated sand, bauxite, and ceramic proppant materials. All such materials are suitable for use in the methods and processes described herein. These include, but are not limited to, those that are coated with a coating comprising a compatibilizing agent, a hydrophobic polymer, and/or a cured and/or curable hydrophobic polymer.

In some embodiments described herein, embodiments use a treatment agent (e.g. liquid treatment agent) that is applied at extremely low levels, e.g., at levels that avoid making the particulates perceptibly wet such as observed by, e.g., drips, puddles, a visible wet sheen or a wet "feel" upon handling the treated solids. In some embodiments, some treatments might require mild drying after contact with the sprayed treating agent in order to avoid "perceptibly wet" particles, especially those prepared using non-aqueous based solvent carriers. These treatment agents can include the treatment agents described herein comprising a compatibilizing agent a hydrophobic polymer, and/or a cured and/or curable hydrophobic polymer.

In some embodiments, the treatment agent level is also fast and sufficiently low in applied volumes to avoid the formation of firmly agglomerated masses of treated solids that are not readily transported by conventional dry proppant solids handling equipment, e.g., gravity-fed conveying systems, pneumatic transport, and the like. In other words, the proppant solids that are treated according to the presently disclosed methods continue to act and be subject to handling by conventional proppant solids handling equipment and systems. In some embodiments, the treatment agent is applied or contacted with the solids for less than or equal to 20, 19, 18, 17, 16, 15, 14, 13, 12, 11, 10, 9, 8, 7, 6, 5, 4, 3, 2, or 1 seconds. As used herein, the phrase "less than" when used in reference to a certain of period of time does not include zero unless explicitly stated. In some embodiments, the treatment agent is contacted with the solids for about 0.1 to about 5 seconds, about 0.1 to about 10 seconds, about 0.1 to about 15 seconds, or about 0.1 to about 20 seconds. In some embodiments, the treatment agent is contacted with the solids for about 1 to about 10, about 1 to about 9, about 1 to about 8, about 1 to about 7, about 1 to about 6, about 1 to about 5, about 1 to about 4, about 1 to about 3, or about 1 to about 2 seconds. In some embodiments, the treatment agent is contacted with the solids for about 0.5 to about 10, about 0.5 to about 9, about 0.5 to about 8, about 0.5 to about 7, about 0.5 to about 6, about 0.5 to about 5, about 0.5 to about 4, about 0.5 to about 3, about 0.5 to about 2, or about 0.5 to about 1 seconds. In some embodiments, the treatment agent is contacted with the solids for about 2 to about 10, about 2 to about 9, about 2 to about 8, about 2 to about 7, about 2 to about 6, about 2 to about 5, about 2 to about 4, or about 2 to about 3 seconds. In some embodiments, the treatment agent is contacted with the solids for about 3 to about 10, about 3 to about 9, about 3 to about 8, about 3 to about 7, about 3 to about 6, about 3 to about 5, or about 3 to about 4 seconds. In some embodiments, the treatment agent is contacted with the solids for about 4 to about 10, about 4 to about 9, about 4 to about 8, about 4 to about 7, about 4 to about 6, or about 4 to about 5 seconds. The time periods described herein can be used in conjunction with any embodiment of the processes described herein involving the contacting of a solid with a treatment agent. The phrase "time period as described herein" refers to these time periods in addition to any time periods described specifically with any particular embodiment. A proppant solid may also be referred to as a particulate core. The particulate core, just as is the case for proppant solids described herein, can be coated or treated according to the various compositions and methods described herein.

In some embodiments, the treatment agent is presented as an aqueous solution, dispersion, or emulsion. In some embodiments, suitable levels of the treatment agent can be characterized as a weight of applied solids per unit weight of treated solids. In some embodiments, with such a reference frame, suitable application rates of treatment agent are less than 5 wt % treating agent solids per unit weight of treated solid (e.g. sand). In some embodiments, the treatment agent is applied at a rate of less than about 3 wt % and without adversely affecting free-flowing characteristics by the treated proppants after the applied materials have dried. In some embodiments, the applied materials are an agent comprising a compatibilizing agent a hydrophobic polymer, and/or a cured and/or curable hydrophobic polymer. In some embodiments, the treatment agent is applied at an amount from about 0.0002 to about 1.5 wt %, about 0.0002 to about 1 wt %, about 0.0005 to about 0.85 wt %, about 0.0007 to about 0.75 wt %, about 0.0008 to about 0.65 wt %, about 0.0009 to about 0.5 wt %, about 0.001 to about 0.35 wt % and about 0.0013 to about 0.25 wt %. In some embodiments, the amount of the treatment agent is from about 3 to about 8 lb of the treatment agent per ton of proppant solid. In some embodiments, the solids can be contacted with the treatment agent at a rate of about 400 tons/hour at commercial application rates depending on the equipment used. In some embodiments, the about 3 to about 8 lb of treatment agent is based upon a dispersion that has about 40% solids. For the avoidance of doubt, the solid can also be referred to as the particulate core herein.

As described herein, in some embodiments, the solids are contacted with the treatment agent very quickly thereby making the process amenable to treatment rapidly, "on-the-fly", at loading, handling in transport or at unloading events. As described herein, the solids can be contacted with the treatment for short periods of time, which include, but are not limited to for a period of time that is less than five seconds, but greater than zero. In some embodiments, the time period is about 1 to about 3 seconds. In some embodiments, the solids are contacted with the treatment agent in the time it takes the solids to fall 3-4 feet (1-1.3 m). In some embodiments, the treatment agent is contacted with the solids using a spray dispersion nozzle. In some embodiments, the treatment agent is contacted with the solids via a plurality of spray dispersion nozzles that impinge on a falling or guided falling stream of proppants, or which introduce the treatment agent onto the proppant solids as the solids are pneumatically conveyed for loading or unloading.

The treatment agent can be contacted with the solids in any way that is effective to provide the solids with a substantially uniform dispersion of treatment agent over as much of the solids within the treatment zone as is reasonably possible. The methods can be dependent, for example, on the existing equipment, budget and space. In some embodiments, the contacting equipment is a spraying system of at least one nozzle that distributes the treatment agent over, under, around and within the treated solids as they move past and through the treatment zone. In some embodiments there are a plurality of nozzles.

In some embodiments, a typical treatment zone might be located along a conveyor belt as proppants are unloaded from a transport vehicle and conveyed by a belt to discharge equipment. In some embodiments, a treatment zone includes 1 to 8 nozzles and/or atomizing spray nozzles, to create a fine spray, mist or fog that contacts the moving proppants from both above and below the conveyor belt or as the solids fall from the conveyor belt to effect a substantially uniform treatment.

In some embodiments, the treatment zone could be within an enclosure located around the conveying system/belt to better contain the treatment additive as it is applied, to better control the environment around the application point, or to make the contacting process more efficient.

In some embodiments, the solids can also be heated or allowed to become heated to an elevated temperature, i.e., at a temperature above 25° C. or from about 30° to about 85° C., immediately before or after the contacting step so that higher concentrations of the treatment agent can be applied to increase performance or allow a less expensive additive to be utilized. As described herein, in some embodiments, the solids are not heated or allowed to become heated to an elevated temperature prior to application of the treatment. This does not include when the solids are introduced downhole into a well where the temperature is increased.

In some embodiments, another treatment zone might be located in or in conjunction with a pneumatic conveyor. One or more spray nozzles (e.g. fine spray nozzles) can be aligned and directed to discharge the treatment agent into the pneumatic air stream at one or more locations at the appropriate injection rate so as to contact the conveyed solids as they are mixed and moving in the conveyance stream.

In some embodiments, treatment zones are located at one or more transfer points within the handling process where the solids are in motion and sufficient mixing can be performed readily. In some embodiments, they are mixed with a static mixer to enhance mixing of the treated solids and encourage a substantially even distribution of the treatment agent over the solids. In some embodiments, the locations include loading ports where stored proppant solids are delivered for transport to a delivery truck, discharge ports used for loading pneumatic transport trucks, and discharge belts when a truck unloads proppants at a well site. In some embodiments, the process comprises applying a first treatment agent with a first spray assembly onto the solids for a period of time as described herein; passing the treated solids through a static mixer; and applying a second treatment agent with a second spray assembly onto said solids for a period of time as described herein. In some embodiments, the first treatment agent and the second treatment agent are different. In some embodiments, the first treatment agent is a compatibilizing agent. In some embodiments, the second treatment agent is a hydrophobic polymer. In some embodiments, there is only one treatment agent that comprises both the compatibilizing agent, a hydrophobic polymer, and/or cured and/or curable hydrophobic polymer. Thus, in some embodiments, they are added simultaneously or sequentially. In some embodiments, a treatment agent is free of a compatibilizing agent.

In some embodiments, the second treatment is applied to the solids immediately after the solids are passed through the static mixer. In some embodiments, at least one of the first and second treatment agents is effective to coat the solids with a dust reduction coating. In some embodiments, at least one of the first and second treatment agents is effective to coat the solids with a hydrophobic polymer as described herein. In some embodiments, at least one of the first and second treatment agents is effective to coat the solids with a compatibilizing agent as described herein. In some embodiments, at least one of the first and second treatments is effective to coat the solids with an additional coating. In some embodiments, the additional coating is a hydrophobic coating, dust reduction coating, a coating that reduces friction, a coating that comprises a tracer, an impact modifier coating, a coating for timed or staged release of an additive, a coating that controls sulfides, a different polymeric coating, an acid or base resistant coating, a coating that inhibits corrosion, a coating that increases proppant crush resistance, a coating that inhibits paraffin precipitation or aggregation, a coating that inhibits asphaltene precipitation, or a coating comprising an ion exchange resin that removes anions and/or halogens. Such coatings are described herein, but other coatings can also be applied in a similar manner.

In some embodiments, the treatment agent is contacted and mixed with the proppant solids (particulate core) at a transfer point location where the proppant solids are discharged and experience some period of free fall to a vertically lower point. Such locations permit the use of one or more spray nozzles. For example, 1 to 12 nozzles in 1 to 3 stages can be disposed around the falling solids such as around a discharge port in a substantially circular pattern. In some embodiments, multiple nozzles are used. In some embodiments, multiple nozzles are used each with a fan-shaped or conical spray pattern that are aligned and aimed to spray the falling solids with the treatment agent and coat the solids. In some embodiments, the contacting occurs immediately before, during, and/or after passage through a static mixer that uses the momentum of the falling solids to encourage better mixing and distribution of the treatment agent over the solids. In some embodiments, a diagram of such a process is shown is illustrated in FIG. 1.

As shown, an insulated and/or heated enclosure (1) protects the water storage tank (2) and treatment agent concentrate storage units (3), (4), (5), (6) from substantial variations in ambient temperature. A pump (7) is used to move water from a storage tank (2) through a strainer (8) into a treatment agent mixer (9). A pump (10) delivers the treatment agent from the storage units (3-5) to the mixer (9), or to a point immediately above and preceding the mixer (9), at a controlled rate sufficient to meet the desired concentration rate for use in the presently disclosed methods. A pump (11) is used to transfer the diluted treatment agent (12) to a mixer (13) and dispersed with one or more spray nozzles (14) at, e.g., a rate within the range of 1.7-5 gallons per minute at 40-60 psi when treating sand moved at typical commercial volumes of, e.g., 100-400 tons per hour. The proppant sand (15) is delivered to the top of the mixer (13) which is suitably a static mixer sized to handle commercial volumes of sand, where the proppant sand (15) is mixed with the treatment agent issuing from the first spray assembly of spray nozzles (14).

A recirculation circuit (16) can be used to keep the treatment agent in motion within the conduits if a valve (17) is closed.

An optional air compressor (18) can be used to provide a source of pressurized air to the enclosure (1) and/or the mixer (13). An optional power generator (19) serves as a source of backup power for the enclosure (1), including the pumps (7), (10), (11) and the mixer (9).

Figure 2:
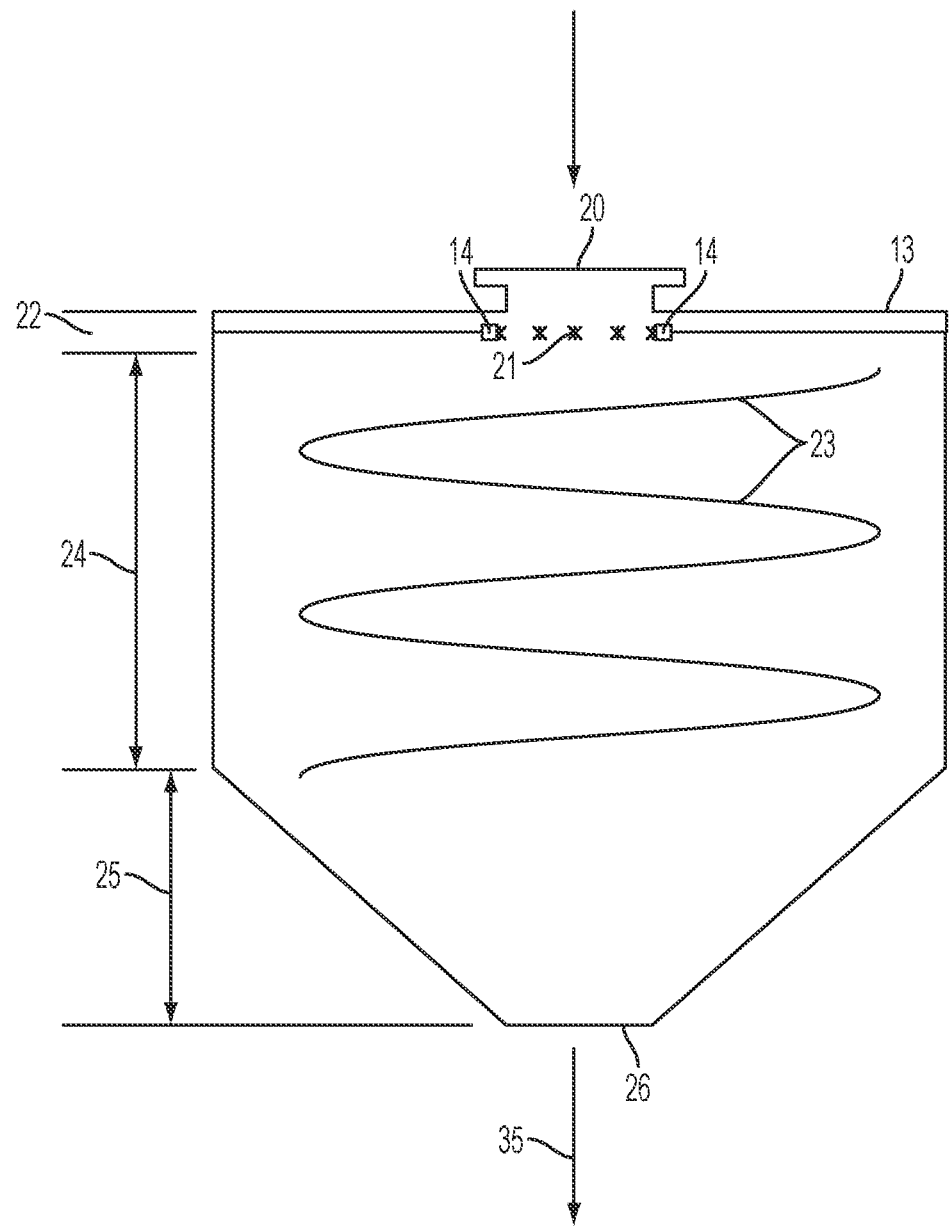
FIG. 2 shows a representative spray point in an optional static mixer that can be used as described herein.

A mixer (13), such as a static sand mixer, is shown in somewhat more detail in FIG. 2. In this view, treatment agent (12) is passed through nozzles (14) surrounding a sand inlet (20) of the mixer (13) where the treatment agent (12) contacts the sand (21) as it passes through a spraying zone (22). The sand (21) then contacts a series of mounted, impingement-type, rods or mixing members (23) that are located throughout the vertical height of the mixing zone (24). In some embodiments, the mixing members (23) are round, ovoid, curved, ramp-shaped, triangular, square (suitably disposed with an edge pointed upwardly) or diamond-shaped, or otherwise chosen to exhibit a cross-sectional shape that serves to re-direct or direct individual grains of sand (21) as they fall through the mixing zone (24) and thereby effect a mixing action. By impingement and deflection off of the lateral surfaces of rounded mixing members (23), the treatment agent (12) on the sand (21) is redistributed to more evenly distribute the treatment agent across the bulk of the sand (21) in a manner that is substantially uniform. The use of pipes or rods with a sufficient material hardness to resist the abrasive effects of falling sand are shown to facilitate construction and maintenance as members (23) become worn.

In some embodiments, the mixing members (23) are releasably connected, secured or retained within the mixer (13) by a suitable fastener or bracket to retain the members (23) within the mixer (13) despite the friction and forces of sand falling there through. Suitable fasteners can include, but are not limited to, bolts into the members (23) in a horizontal direction, transverse bolts that secure the members (23) to the mixer (13) with one or more flanges or brackets that are themselves secured, welded or connected to the lateral walls of the mixer (13), or retention brackets (not shown) having a U- or L-shape into which the member (23) is secured from vertical movement.

In some embodiments of the mixer (13), there is a transition zone (25) that allows the treated sand to settle before discharge through an outlet (26). Such a transition also serves to reduce the momentum of the discharged sand and thereby limit the forces that might serve to eject fugitive dust as the falling, treated sand is deposited.

Figure 3:
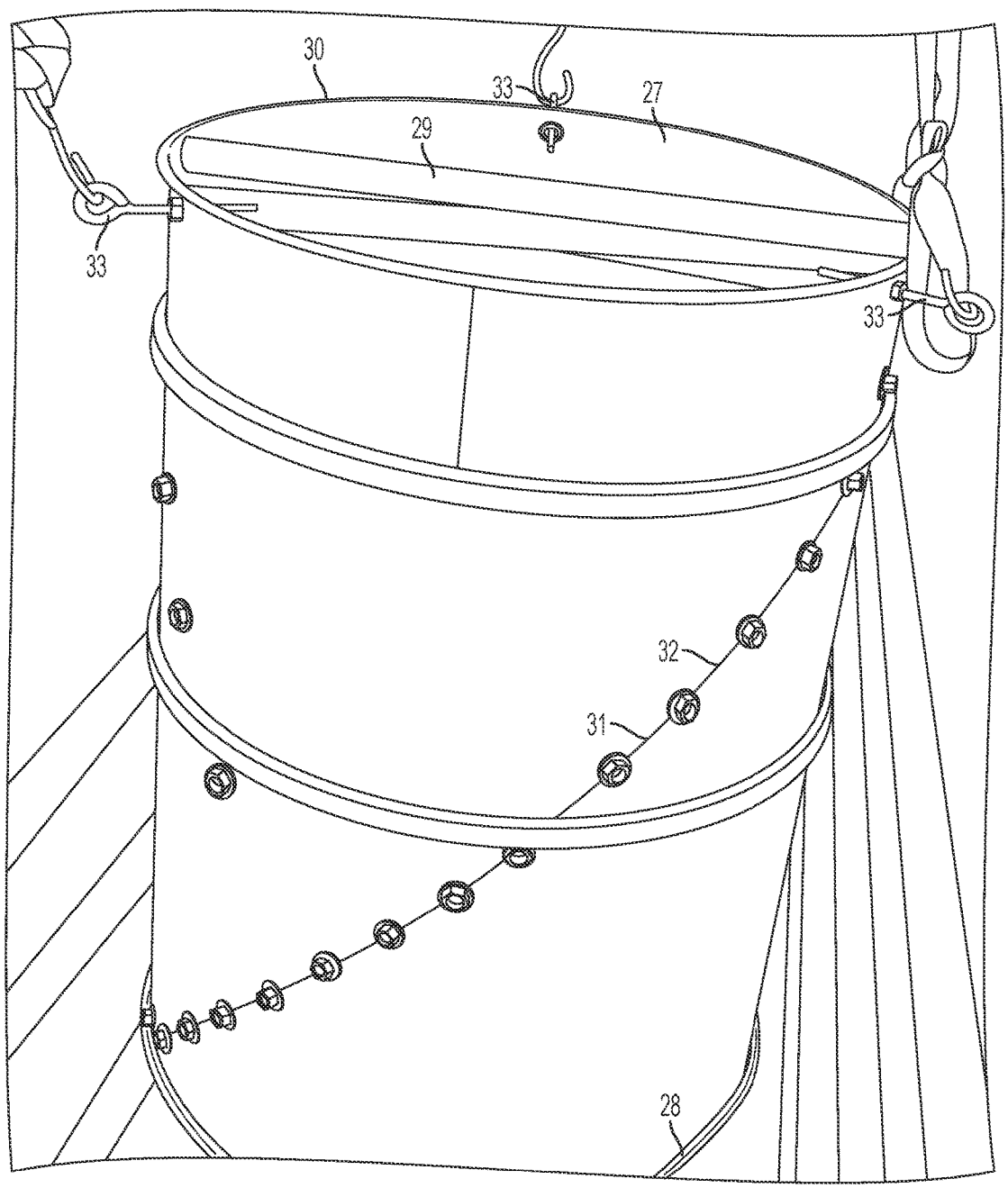
FIG. 3 shows the outside of a static mixer and the representative locations of a series of static mixing bars helically arranged within the static mixer.
Figure 4:
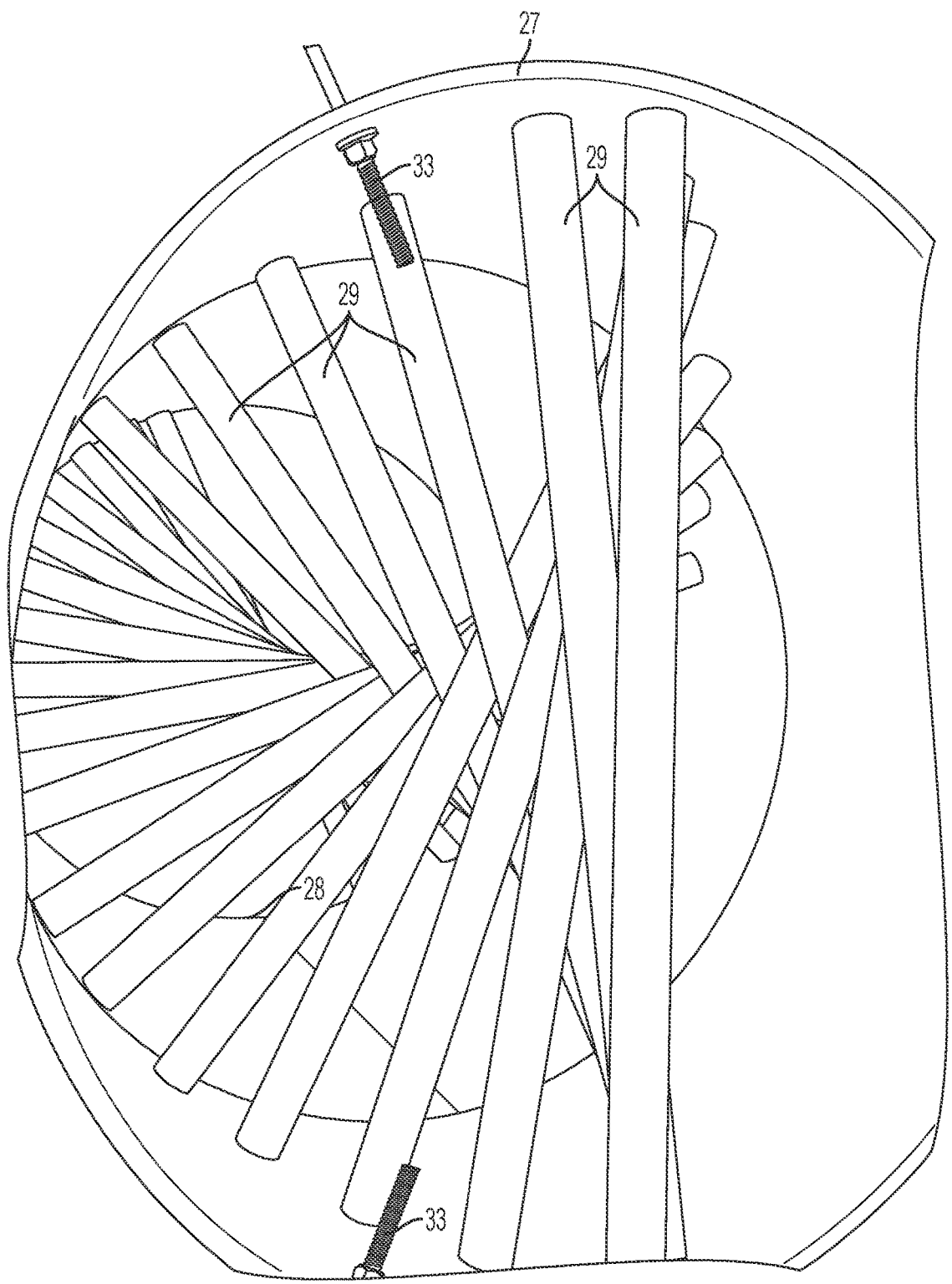
FIG. 4 is a view downwardly through a static mixer that shows the helical disposition of static mixing bars disposed within the mixer.

In some embodiments, an alternative type of static mixer (13) is shown in FIGS. 3 and 4. The static mixer shown is substantially cylindrical in shape (like a 55 gallon drum where the top inlet (27) is substantially the same diameter as the bottom outlet (28)) and dimensioned to receive, mix, and discharge high volumes of proppant sand. In this embodiment, the static, impingement-type, mixing members (23) are formed by a series of rods or pipes (29) that horizontally traverse a drum (30) and are vertically distributed in a helical pattern (31) at an inter-rod distance (32) over the height of the drum (30). Three eyelets (33) attached to the top of the drum (30) provide supports for hanging the mixer below a free-fall discharge port of conventional proppant sand handling equipment. These are non-limiting examples only and other designs or alternatives can be used that perform the same function.

Figure 5:
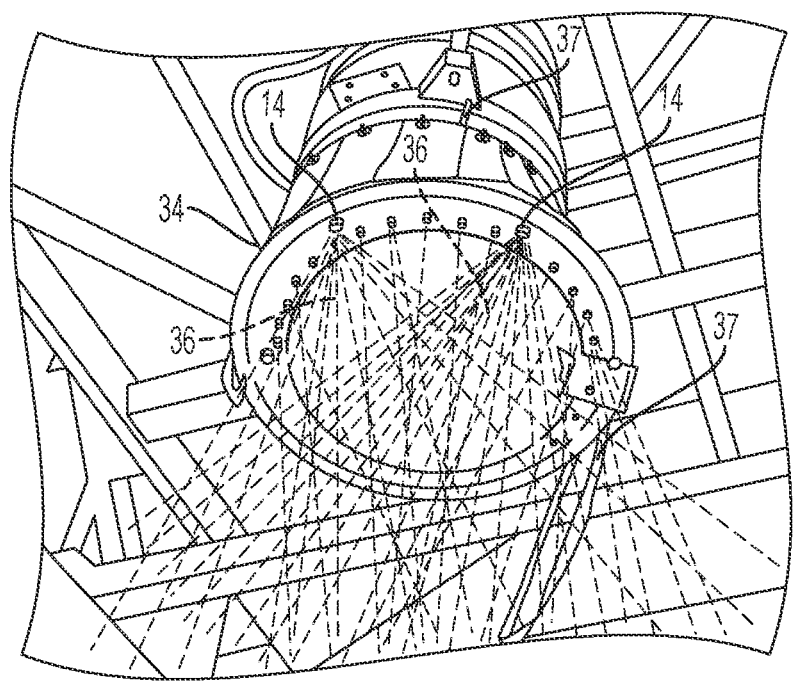
FIG. 5 shows the use of a series of spray nozzles located around the perimeter of a ring disposed around a discharge spout in a proppant handling facility.
Figure 6:
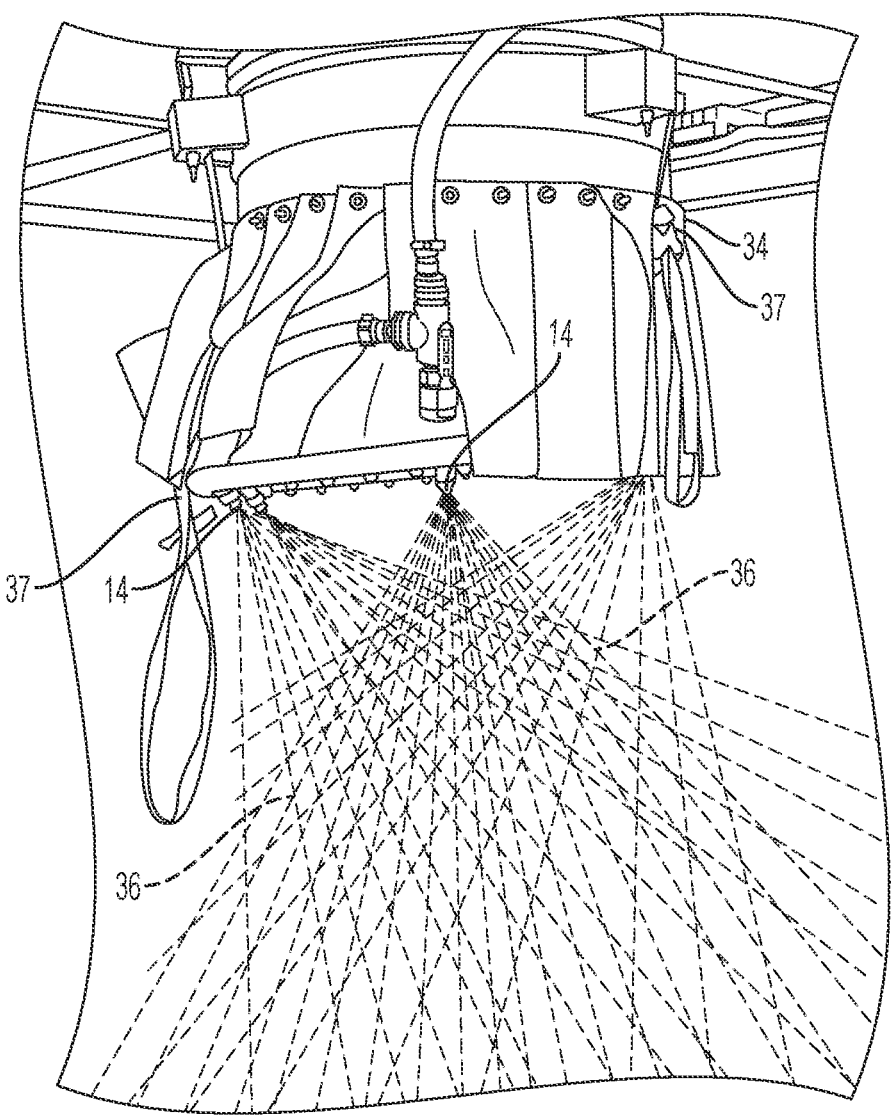
FIG. 6 is a side view of the ring sprayer shown in FIG. 5.
Figure 7:
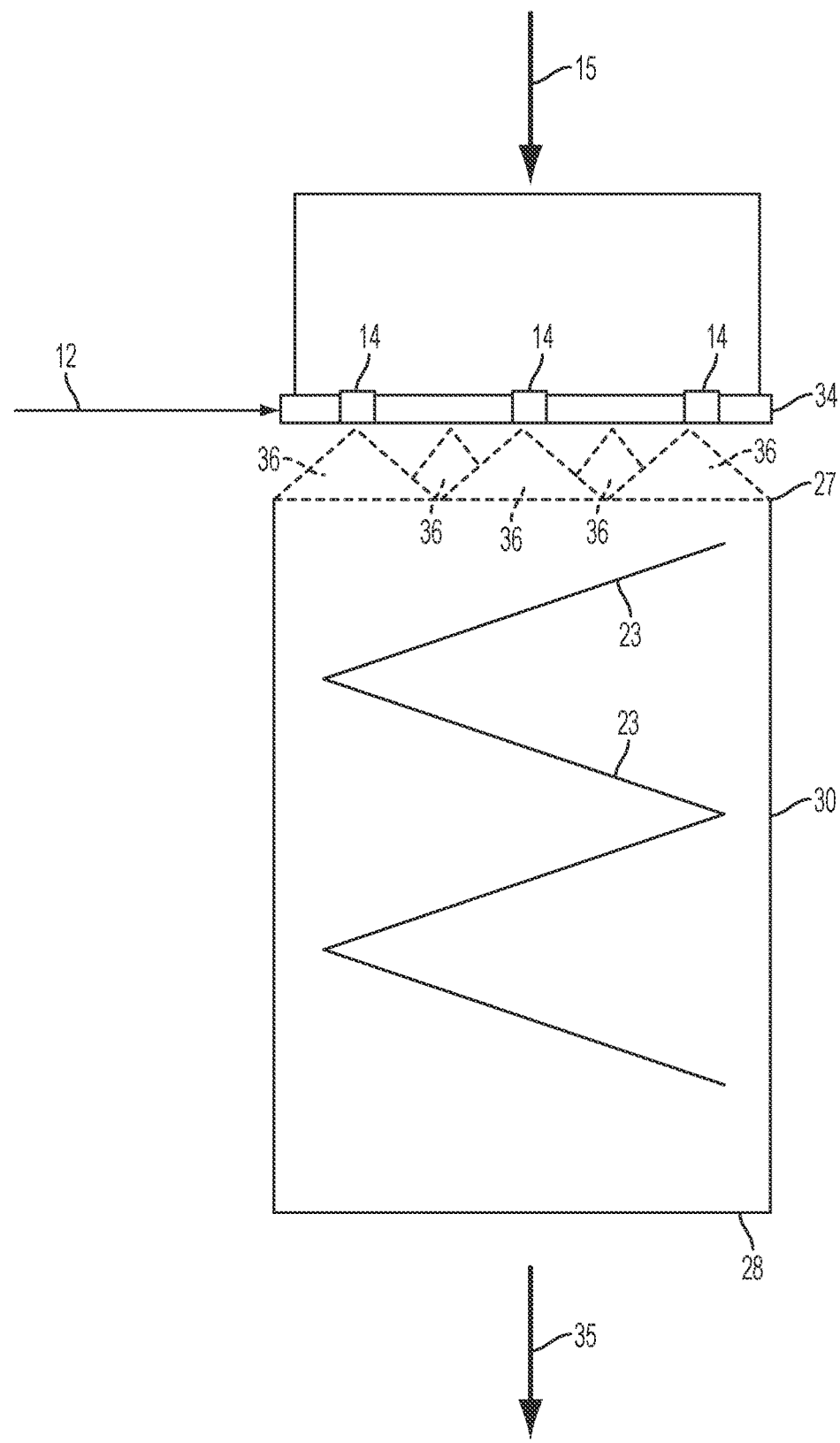
FIG. 7 shows a configuration that combines the sprayer assembly of FIGS. 5 and 6 with the drum-shaped static mixer of FIGS. 3 and 4.

A spray assembly (34) is shown in FIGS. 5 and 6 that can be used in combination with the static mixer (13) of FIGS. 3 and 4 in a configuration like that of FIG. 7. More specifically, a spray assembly (34) is attached around the perimeter of a sand discharge port with a series of one or more, suitably 3-7, spray nozzles (14) that are substantially evenly distributed around the spray assembly (34). Each nozzle (14) is oriented radially inwardly and downwardly with overlapping spray pattern areas (36) so that sand introduced into the top inlet (27) is contacted with one or more spray streams of treatment agent issuing through nozzles (14) at the top end of, or immediately before, the static mixer (13) located immediately below the spray assembly (34) to discharge a treated sand (35). Connectors or straps (37) on the spray assembly (34) are distributed to cooperate with eyehooks (33) on the static mixer for suspending the static mixer below the spray assembly.

Figure 8:
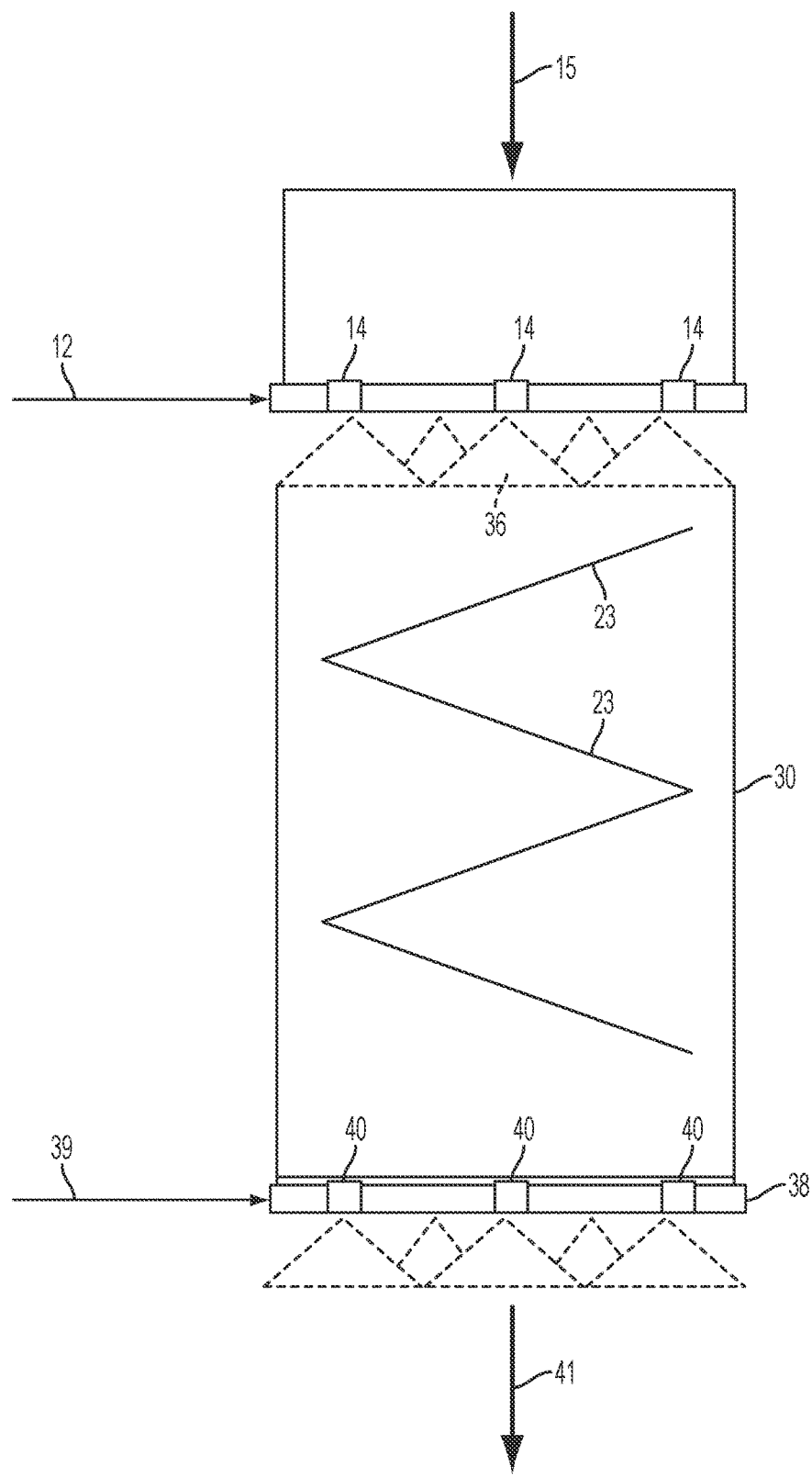
FIG. 8 shows an alternative configuration in which spray nozzles precede and follow a static mixer.
Figure 9:
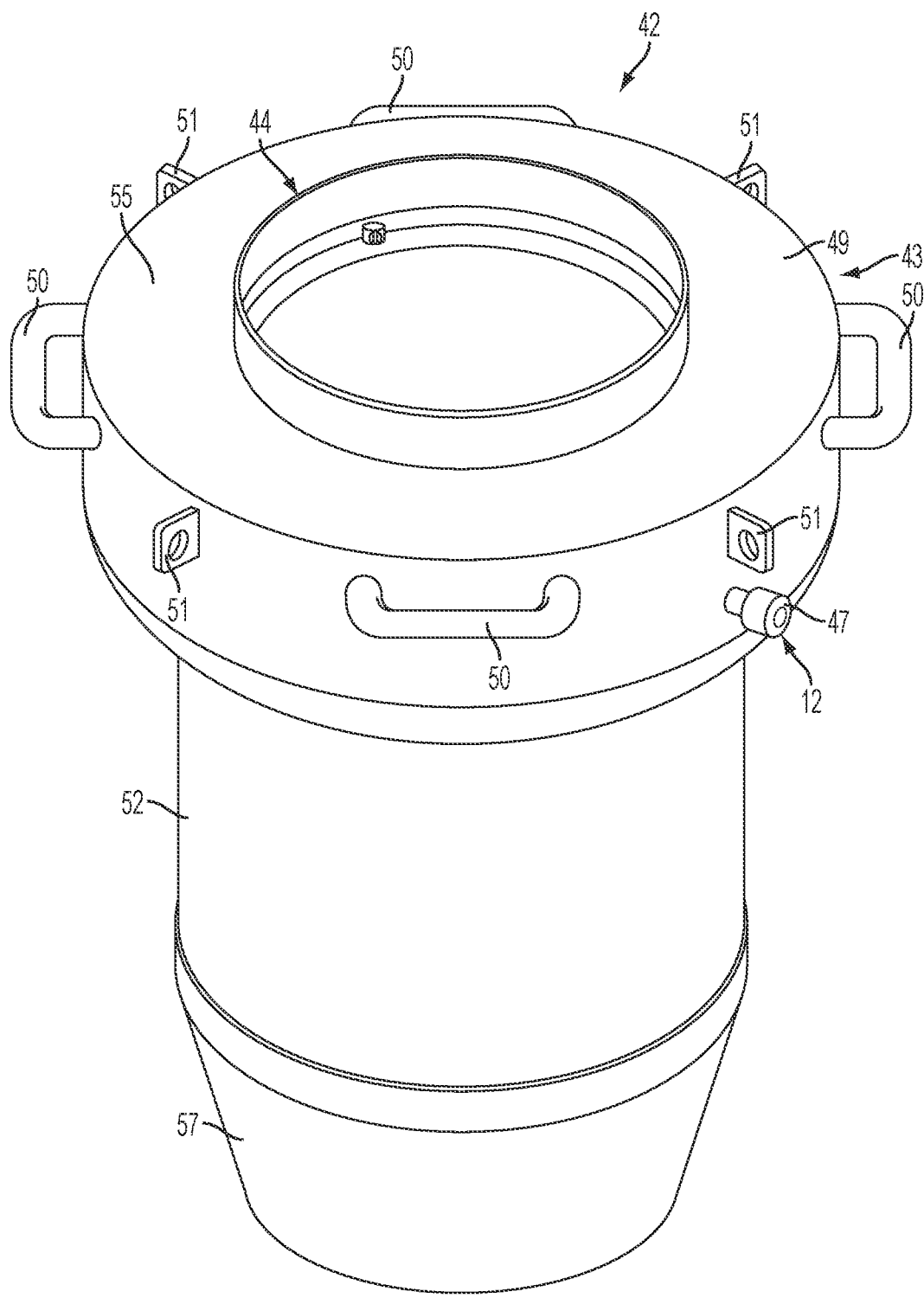
FIG. 9 illustrates non-limiting embodiments of a vertical treatment mixer that combines a partially enclosed, upper spray section above a static mixing section followed by a lower, inwardly tapered discharge section.

FIG. 8 illustrates an alternative version of the mixer that is shown in FIG. 7 but with the addition of a second spray assembly (38) connected to a second treatment agent (39) that can be the same or different than treatment agent (12). Exemplary second treatment agents can include: the dust control agents introduced as the first treatment agent (12) as well as the functional treatments that are described above. The second spray region can be used to add a second functionality to the coating or simply to help insure that more of the proppant's surface area is covered by the coating process. Second nozzles (40) are oriented to spray the second treatment agent (39) downwardly as treated sand (41) is discharged.

FIGS. 9-12 depict further alternatives for a contact device for a sprayed dust control treatment agent that contacts the proppant solids on-the-fly while the solids are in a guided free fall under the effects of gravity. It is contemplated that the use of inline spray dispersion systems can be used with minor modifications of conventional pneumatic conveyance systems to provide dust control treatment as the proppant solids are transported to or from storage.

As shown in FIGS. 9-12, a contact mixer (42) is vertically oriented to allow proppant solids to fall therethrough. The top section (43) has a reinforcing vertical lip (44) about the intake opening (45) of a cover (55). The diameter of the top section (43) is greater than that of the diameter of the opening (45) to allow the nozzles (14) to disperse the dust control treatment agent inwardly into a falling stream of proppants to be treated from a relatively safe perimeter position that is not impacted by the stream of falling solids and the abrasion associated therewith.

As shown, a supply connector (47) connects to a circular manifold (48) that is in fluid communication with nozzles (14) oriented inwardly toward the center of the device for the supply, under pressure, of treatment agent to proppants as they fall through the opening (45). A horizontal upper surface (49) of the cover (55) extends inwardly toward the lip (44) to provide a partial upper enclosure of the contact zone that also reduce upwelling fugitive dust during the treatment process. An inward taper of the sidewalls below the nozzles (14) helps to guide solids from the sidewalls toward the middle mixing section.

Handles (50), such as 2-4 handles, and/or lifting lugs (51), such as 2-4 lugs, can be secured to the outside of the sidewall of the uppermost end (43) for handling and positioning the device.

Figure 10:
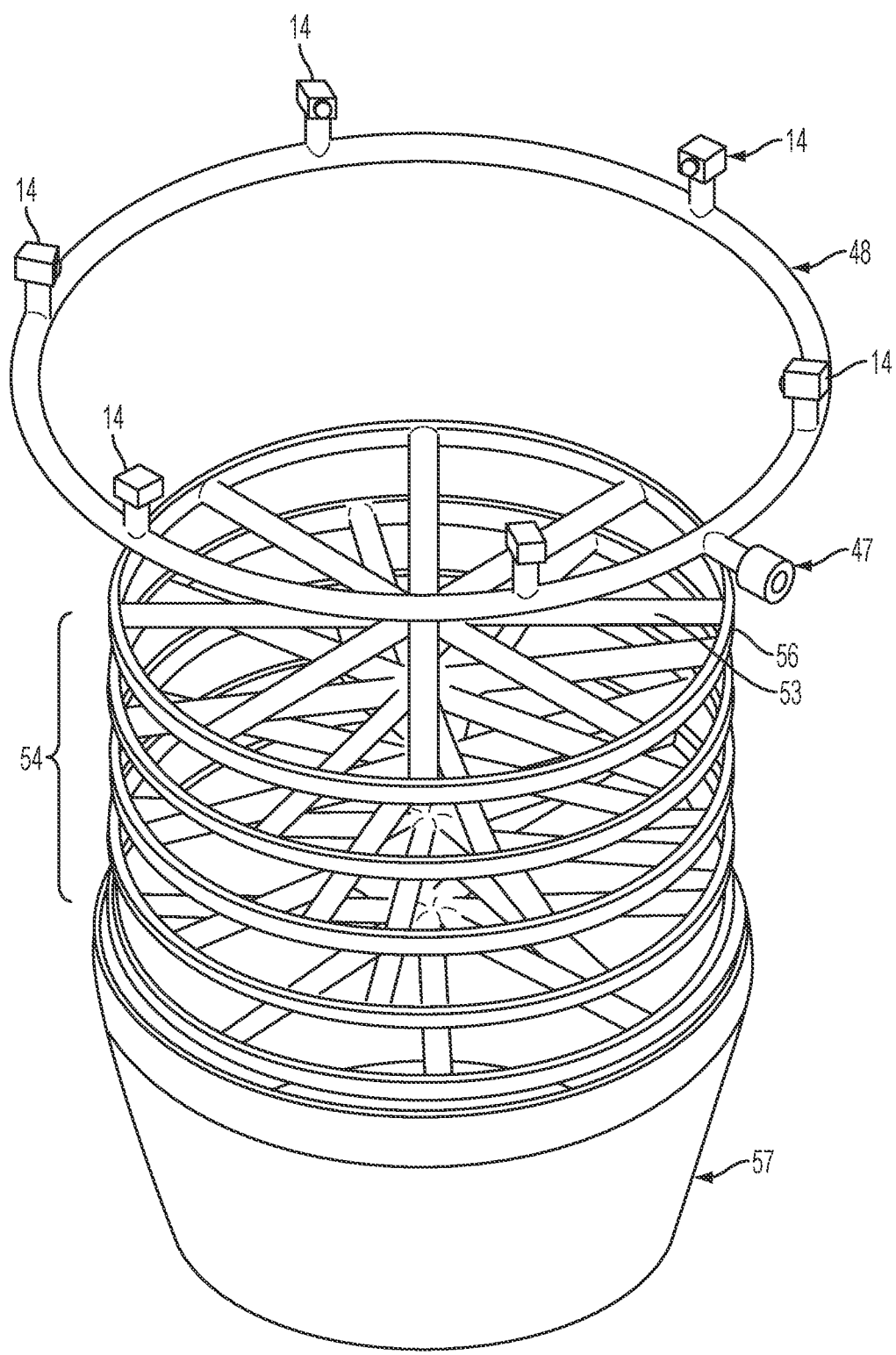
FIG. 10 illustrates non-limiting embodiments of a vertical treatment mixer that combines a partially enclosed, upper spray section above a static mixing section followed by a lower, inwardly tapered discharge section.
Figure 11:
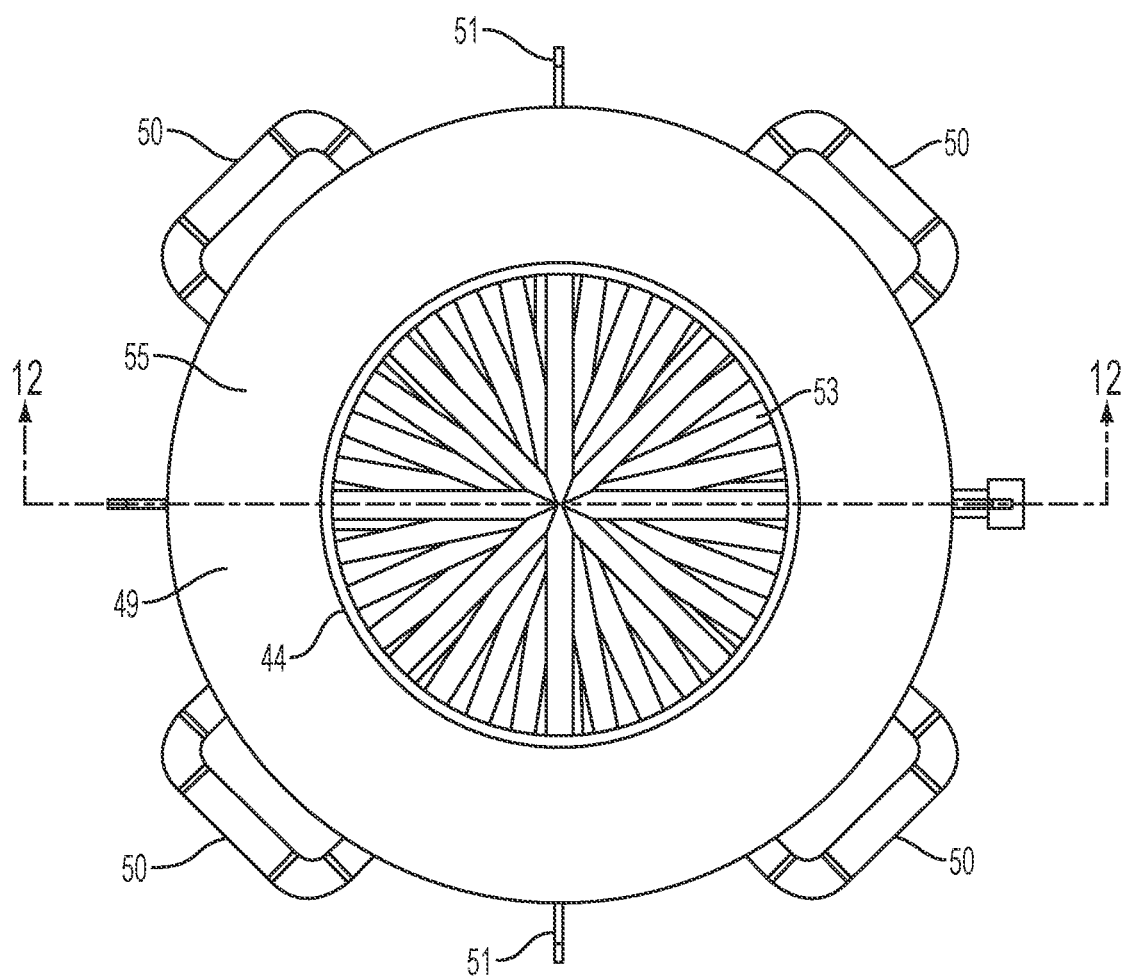
FIG. 11 illustrates non-limiting embodiments of a vertical treatment mixer that combines a partially enclosed, upper spray section above a static mixing section followed by a lower, inwardly tapered discharge section.
Figure 12:
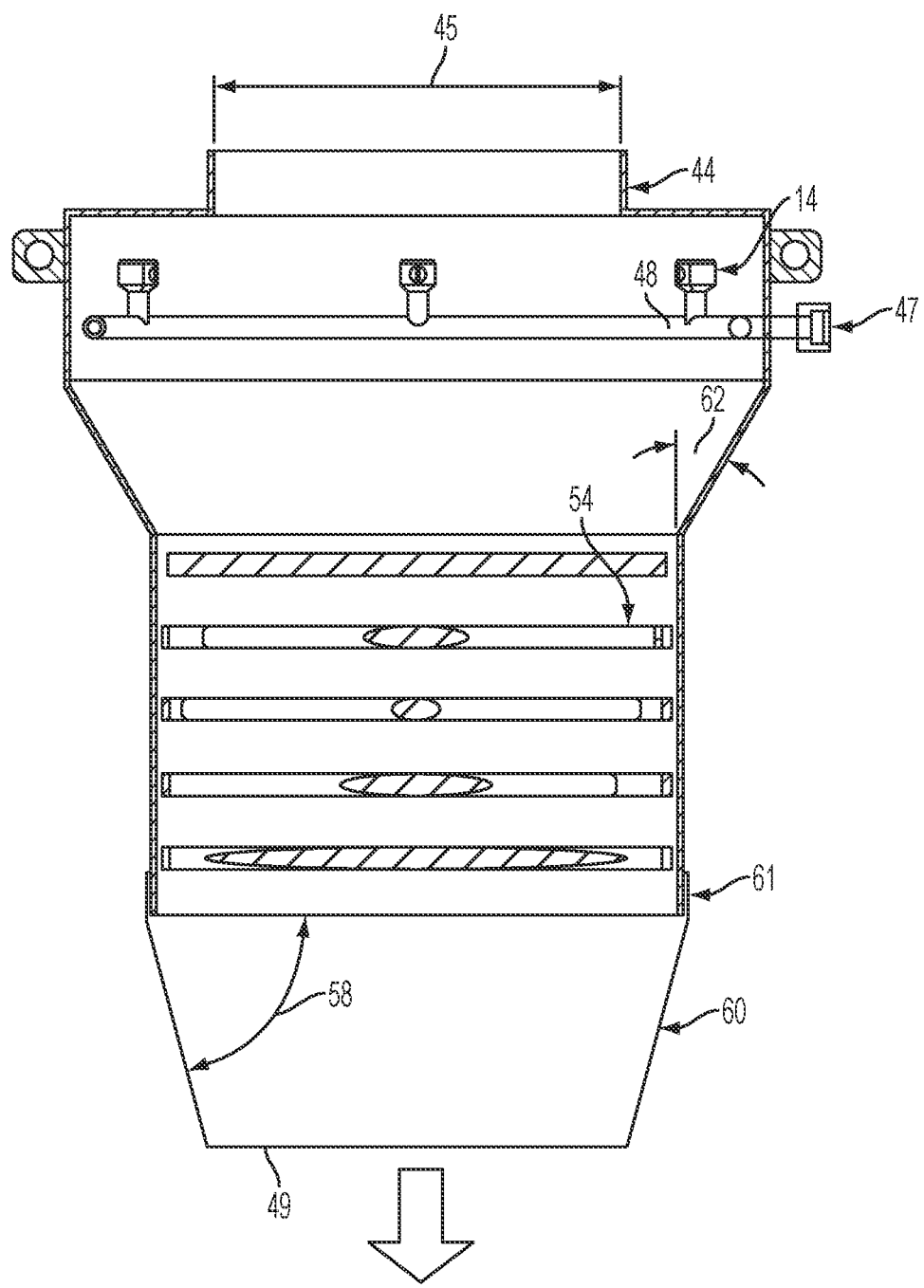
FIG. 12 illustrates non-limiting embodiments of a vertical treatment mixer that combines a partially enclosed, upper spray section above a static mixing section followed by a lower, inwardly tapered discharge section.

The middle section (52) of the contact mixer (42) can be cylindrical in external shape and include plurality of static mixing deflector members (53). As shown, the static mixing deflector members (53) can be disposed as a plurality of spoke members within an outer ring (56) as a modular, substantially planar, spoke-containing hoop unit (54). FIG. 10 shows the use of five such spoked hoop units (54), each having six deflector spoke members (55) that are evenly distributed around the interior of a ring (56) and that meet at substantially the geometric center of their respective hoop unit (54). The mixing deflector members (53) can be secured to the outer ring (56) by any method including welding, soldering, brazing and/or fasteners. Each deflection hoop member (54) can be secured to the ring (56) by welding, brazing, soldering or similarly permanent and durable connection.

Each successive hoop unit (54) is then stacked vertically within middle portion (52) above the bottom section (57) and offset an appropriate angular amount relative to the preceding hoop unit (54) to provide a helical progression of deflector members (53) down the length of the middle portion (52) in the mixer (46). The lowest hoop unit (54) can rest on the top of the bottom section (57) but can be supported by a support flange or bracket (not shown) that is secured to the interior sidewall at the bottom (61) of the middle section (52).

The modular nature of this form of mixing device permits the degree and duration of mixing to be adjusted based on the number of mixing spokes found in each unit and the number of mixing modules that are used in the device.

The bottom section (57) of the mixer (46) can be in the form of a straight cylinder (i.e., about 180 degrees relative to the outer sides of the middle section (52)) but can exhibit an inwardly tapered frustoconical cross section (60) that is at an angle (58) that is within the range from about 150-175 degrees, or at an angle within the range of about 160-170 degrees. This tapering section helps to channel and settle the particulates at the outer perimeter of the treated proppant stream for discharge from the bottom opening (59). Similarly, the bottom of the top section (43) can exhibit an inward taper at an angle (62) that is within the range from about 15-45 degrees, or 25-35 degrees from vertical.

Accordingly, in some embodiments, a process for treating free-flowing, finely divided proppant solids is provided. The treatment can be any treatment described herein. In some embodiments, the process comprises contacting the solids less than five seconds with a treatment agent with an amount of the treatment agent that substantially retains free-flowing characteristics of the treated solids. The treatment agent can be any agent described herein and contain one or more of the compositions described herein. In some embodiments, the solids are contacted with the treatment agent more than once and each contacting step is for less than five seconds. The time period for contact can also be any time period as described herein.

The processes described herein are suitable for applying coatings or agents to various finely divided proppant solids. Examples include, but are not limited to, uncoated sand, sand with a cured or partially cured coating, bauxite, ceramic, coated bauxite, or ceramic. In some embodiments, the finely divided proppant solids are uncoated sand or resin-coated sand.

In some embodiments, the process comprises spraying the treatment agent onto the proppant solids while the solids are in free fall, guided free fall, or during pneumatic transport. Other embodiments are described herein can also be part of the process. The solids can also be sprayed substantially simultaneously from more than one direction.

As described herein, the processes described herein can be used to apply a dust reduction coating. The processes can also be used to apply a compatibilizing agent and/or a hydrophobic polymer. The treatment agent can also be effective or used to coat the solids with any one or more of: a hydrophobic coating, a coating that reduces friction, a coating that comprises a tracer, an impact modifier coating, a coating for timed or staged release of an additive, a coating that controls sulfides, a different polymeric coating, an acid or base resistant coating, a coating that inhibits corrosion, a coating that increases proppant crush resistance, a coating that inhibits paraffin precipitation or aggregation, a coating that inhibits asphaltene precipitation, and/or a coating comprising an ion exchange resin that removes anions and/or halogens, or any combination thereof. Examples of such coatings are described herein.

In some embodiments, a process for producing free-flowing, finely divided proppant solids with reduced dust properties is provided. In some embodiments, the process comprise contacting the solids for a period of time as described herein with a dust reducing treatment agent with an amount of the dust reducing treatment agent that substantially retains free-flowing characteristics of the treated solids and reduces the dust produced by the solids. In some embodiments, the dust produced by free-flowing, finely divided proppant solids with reduced dust properties is less than dust produced by solids not contacted with the dust reducing treatment agent. In some embodiments, the dust reducing treatment agent is effective to coat the solids with a hydrophobic coating, a coating that reduces friction, a coating that comprises a tracer, an impact modifier coating, a coating for timed or staged release of an additive, a coating that controls sulfides, a different polymeric coating, an acid or base resistant coating, a coating that inhibits corrosion, a coating that increases proppant crush resistance, a coating that inhibits paraffin precipitation or aggregation, a coating that inhibits asphaltene precipitation, and/or a coating comprising an ion exchange resin that removes anions and/or halogens. That is, in some embodiments, the coating can have more than one function. In some embodiments, the dust reducing treatment agent comprises a polysaccharide solution. In some embodiments, the dust reducing treatment agent comprises a $C_6$-$C_{16}$ alkoxylated alcohol. In some embodiments, the dust reducing treatment agent comprises at least one acrylic polymer. In some embodiments, the dust reducing treatment agent comprises an acrylic copolymer. In some embodiments, the dust reducing treatment agent comprises a mixture of at least one $C_6$-$C_{16}$ alkoxylated alcohol and at least one acrylic polymer. In some embodiments, the amount of the dust reducing treatment agent that is applied to the solids is an amount of less than 1 wt % per weight based on the weight of said proppant solids. In some embodiments, the amount is an amount of less than 0.5 wt %. In some embodiments, the amount is an amount of less than 0.35 wt %. In some embodiments, In some embodiments, the amount is an amount of less than 0.25 wt %.

In some embodiments, the dust reducing treatment agent comprises an emulsion of ethoxylated, propoxylated $C_6$-$C_{12}$ alcohols, ethoxylated, propoxylated $C_{10}$-$C_{16}$ alcohols, acrylic polymers, and water. In some embodiments, the dust reducing treatment agent comprises a surfactant. In some embodiments, the dust reducing treatment agent comprises less than 0.1% aqueous ammonia. In some embodiments, the dust reducing treatment agent comprises less than 0.05% free (e.g. residual) monomers. In some embodiments, the dust treatment agent comprises about 15% to about 30%, about 17 to about 28%, or about 20% to about 25% of ethoxylated, propoxylated $C_6$-$C_{12}$ alcohols. In some embodiments, the dust treatment agent comprises about 5% to about 20%, about 8 to about 18%, or about 10% to about 15% of ethoxylated, propoxylated $C_{10}$-$C_{16}$ alcohols. In some embodiments, the dust reducing reagent comprises about 20% to about 25% of ethoxylated, propoxylated $C_6$-$C_{12}$ alcohols, about 10% to about 15% of ethoxylated, propoxylated $C_{10}$-$C_{16}$ alcohols, about 5% to about 10% acrylic polymers, less than 0.1% ammonia, less than 0.05% free monomers. In some embodiments, the dust reducing reagent comprises about 20% to about 25% of ethoxylated, propoxylated $C_6$-$C_{12}$ alcohols, about 10% to about 15% of ethoxylated, propoxylated $C_{10}$-$C_{16}$ alcohols, about 5% to about 10% acrylic polymers, less than 0.1% ammonia, less than 0.05% free monomers with the remaining being water. The dust reducing treatment agent can also be combined with the compatibilizing agent and/or the hydrophobic polymer. In some embodiments, the dust reducing treatment agent is an agent comprising the compatibilizing agent and the hydrophobic polymer, such as those described herein. The dust reduction coating can have other additives, such as tracers and antifreeze agents as described herein.

In some embodiments, a process for coating a free-flowing proppant is provided. In some embodiments, the process comprises contacting the proppant for a period of time as described herein with a treatment agent with an amount of the treatment agent that substantially retains free-flowing characteristics of the proppant to produce coated free-flowing proppant, wherein the coating is coating comprising a compatibilizing agent and/or a hydrophobic polymer, a dust reducing coating, a hydrophobic coating, a coating that reduces friction, a coating that comprises a tracer, an impact modifier coating, a coating for timed or staged release of an additive, a coating that controls sulfides, a different polymeric coating, an acid or base resistant coating, a coating that inhibits corrosion, a coating that increases proppant crush resistance, a coating that inhibits paraffin precipitation or aggregation, a coating that inhibits asphaltene precipitation, and/or a coating comprising an ion exchange resin that removes anions and/or halogens, or any combination thereof. In some embodiments, the coating is a dust reducing coating. In some embodiments, the coating is a hydrophobic coating, a coating that reduces friction, a coating that comprises a tracer, an impact modifier coating, a coating for timed or staged release of an additive, a coating that controls sulfides, a different polymeric coating, an acid or base resistant coating, a coating that inhibits corrosion, a coating that increases proppant crush resistance, a coating that inhibits paraffin precipitation or aggregation, a coating that inhibits asphaltene precipitation, or a coating comprising an ion exchange resin that removes anions and/or halogens, or any combination thereof.

Coated free-flowing proppants comprising a dried and/or cured coating that comprises less than about 3 wt % of a treatment agent are also provided. In some embodiments, the coated, free-flowing proppant exhibits reduced fugitive dust generation as compared to the uncoated proppant. In some embodiments, the coated, free-flowing proppant exhibits an increase in the amount of a hydrophobic surface as compared to the uncoated proppant. In some embodiments, the coated, free-flowing proppant comprises 0.0009-0.5 wt % of the coating. In some embodiments, the coated, free-flowing proppant comprises 0.001-0.35 wt % of the coating. In some embodiments, the coating comprises one or more of: compatibilizing agents, hydrophobic polymers, monosaccharides or polysaccharides, surfactants, alkoxylated alcohols, acrylic polymers, methacrylic polymers, copolymers of acrylic acid and/or methacrylic acid, methacrylates and copolymers thereof, polyvinyl acetates, vinyl acrylic copolymers, polybutadiene, low molecular weight mineral oils, acrylamide polymers, lignosulfonates, water-dispersible natural gums, water-dispersible pectins, water-dispersible starch derivatives, water-dispersible cellulose derivatives, or any mixture thereof.

In some embodiments, the coating comprises one or more monosaccharides or polysaccharides. In some embodiments, the coating comprises one or more alkoxylated alcohols. In some embodiments, the coating comprises at least one $C_6$-$C_{12}$ alkoxylated alcohol and at least one $C_{10}$-$C_{16}$ alkoxylated alcohol. In some embodiments, the coating comprises one or more acrylic polymers. In some embodiments, the coating comprises at least one $C_6$-$C_{12}$ alkoxylated alcohol, at least one $C_{10}$-$C_{16}$ alkoxylated alcohols, and at least one acrylic polymer. In some embodiments, the coating comprises one or more methacrylic polymers, one or more copolymers of acrylic acid and/or methacrylic acid, and one or more of methacrylates. In some embodiments, the coating is a hydrophobic coating, a coating that reduces friction, a coating that comprises a tracer, an impact modifier coating, a coating for timed or staged release of an additive, a coating that controls sulfides, a different polymeric coating, an acid or base resistant coating, a coating that inhibits corrosion, a coating that increases proppant crush resistance, a coating that inhibits paraffin precipitation or aggregation, a coating that inhibits asphaltene precipitation, or a coating comprising an ion exchange resin that removes anions and/or halogens. In some embodiments, the coating further comprises a sulfide scavenger or scale inhibitor.

In some embodiments, a coating is applied to the particulate (e.g. proppant) to reduce drag on the surface of the particulate.

Various treatment agents are described herein. The treatment agents can be applied to the solids according to any of the various embodiments described herein. The treatment agents can be applied simultaneously or consecutively. Additionally, the processes described herein can be used to add multiple layers or coatings to the solids. The treatment agents can also be applied singularly or in any combination with one another. The process is not limited to applying any one coating, unless explicitly stated to the contrary.

The treatment agent that can be used in the methods described herein can be an aqueous solution or emulsion. In some embodiments, the treatment agent can be used to reduce dust produced by the solids. This can be referred to as "fugitive dust control." In some embodiments, a treatment agent for controlling dust can be, for example, an aqueous solution or emulsion comprising one or more polysaccharides, surfactants and alkoxylated alcohols, acrylic polymers, methacrylic polymers and copolymers of acrylic acid and/or methacrylic acid, polyvinyl acetates, vinyl acrylic copolymers, methacrylates (see U.S. Pat. No. 4,594,268) and copolymers with methacrylates, polybutadiene, low molecular weight mineral oils, and mixtures thereof. The use of aqueous solutions permit the treatment agent to be purchased as a concentrate and then diluted to a working concentration when needed or when there is access to a supply of dilution water. The use of water-based dispersions also avoids the need to handle another hydrocarbon material at the wellsite. The use of a water based dispersion also avoids or limits the amount of vapors are released, which may be toxic, during coating or transport of the particulate.

In some embodiments, the treatment agent can be used to enhance the hydrophobicity of the solids. The treatment agent can be used to enhance particulate (solids) transport as compared to a particulate without the enhanced hydrophobicity.

Non-limiting examples of surfactants and alkoxylated alcohols that can be used include, but are not limited to, $C_{10}$-$C_{14}$ alpha-olefin sulfonates, $C_{10}$-$C_{16}$ alcohol sulfates, $C_2$-$C_{16}$ alcohol ether sulfates, $C_2$-$C_{16}$ alpha sulfo esters, highly branched anionic surfactants, nonionic surfactants that are block copolymers of molecular weight less than 600 and derived from ethylene oxide/propylene oxide or other epoxide, nonionic surfactants that are $C_8$-$C_{16}$ branched alcohols that have been ethoxylated with four to ten moles of ethylene oxide per mole alcohol, and mixtures thereof. For example, see the coal dust treatment described in CA Patent No. 2,163,972 and U.S. Pat. No. 4,592,931. See also U.S. Pat. Nos. 6,372,842; 5,194,174; 4,417,992 and 4,801,635. Other examples include those described in EP01234106A2; U.S. Pat. Nos. 3,900,611; and 3,763,072; WO 2005/121272 and U.S. Patent Application Publication No. 2007/073590. Any overlap in molecular length in the above ranges is due to the realities of commercial production and separation and would be so recognized by those in this technology. These can also be used as compatibilizing agents.

A variety of water soluble or water-dispersed polymers or polymer emulsions can also be a part of the treatment agent. Examples include, but are not limited to, acrylic polymers and copolymers, methacrylic polymers and copolymers of acrylic acid and/or methacrylic acid. Examples of alkoxylated alcohols that can be used include, but are not limited to, acrylic acid copolymers of acrylic acid and one or more of unsaturated aliphatic carboxylic acids such as 2-chloroacrylic acid, 2-bromoacrylic acid, maleic acid, fumaric acid, itaconic acid, methacrylic acid, mesaconic acid or the like or unsaturated compounds copolymerizable with acrylic acid, for example, acrylonitrile, methyl acrylate, methyl methacrylate, vinyl acetate, vinyl propionate, methyl itaconate, styrene, 2-hydroxyethyl methacrylate, and the like. These can also be used as compatibilizing agents.

In some embodiments, the polyacrylic acid or acrylic acid copolymer has a weight average molecular weight of from about 5,000 to about 30 million or from about 1 million to about 5 million. In some embodiments, the amount of acrylic polymer present in the mixture with the polybasic acid is about 2 to about 50, about 3 to about 10, or about 4, parts by weight per weight part of polybasic acid. See, U.S.

Pat. No. 4,592,931 the disclosure of which is hereby incorporated by reference. These can also be used as compatibilizing agents.

Polyvinyl acetate and vinyl acrylic solutions and emulsions can also be used in the treatment agent. For example, water-dispersible acrylic and vinyl polymers are suitable, include but are not limited to the homo-, co-, and terpolymers of acrylic acid, vinyl alcohol, vinyl acetate, dimethyl diacrylyl ammonium chloride (DMDAAC), acrylaminyl propyl sulfonate (AMPS) and the like, and combinations thereof.

Acrylamide polymers can also be used in the treatment agent. Examples of acrylamide polymers include, but are not limited to, a polyacrylamide copolymer in an amount within the range from about 0.5 to about 20 wt % of the resulting mixture. In some embodiments, the acrylamide is added in an amount from about 1 to about 2 wt %. Examples of suitable acrylamides include, but are not limited to, anionic charged polyacrylamides or polyacrylamide polyacrylate copolymers with an average molecular weight from 3 million to 25 million g/mol and a charge density from 10% to 60%. Non-limiting examples of commercial acrylamide products include: AN934XD from SNF, Inc., AF306 from Hychem, Inc., and Magnafloc 336 from CIBA.

The polyacrylamide can be used alone or in combination with a starch that has been modified for enhanced solubility in cold water. See U.S. Pat. No. 5,242,248 (polyacrylamide treatment for horse arenas) and Published U.S. Patent Application Publication No. 20130184381, the disclosures of which are hereby incorporated by reference.

Lignosulfonates can also be used as the treatment agent or as a component of the treatment agent. Examples include, but are not limited to, lignin sulfonate salts such as ammonium lignin sulfonate, and alkali metal and alkaline earth metal salts of lignosulfonic acid, such as sodium lignin sulfonate, calcium lignin sulfonate and the like, and combinations thereof. In some embodiments, ammonium lignin sulfonate can be used. Without wishing to be bound by any particular theory, ammonium lignin sulfonate can be used in order to avoid the addition of inorganic materials such as calcium and sodium, particularly sodium.

The treatment agent can also include one or more water-dispersible natural gums, water-dispersible pectins, water-dispersible starch derivatives, or water-dispersible cellulose derivatives. Examples of natural gums include: terrestrial plant exudates including, but not limited to, gum arabic (acacia), gum tragacanth, gum karaya, and the like; terrestrial plant seed mucilages, including but not limited, to *psyllium* seed gum, flax seed gum, guar gum, locust bean gum, tamarind kernel powder, okra, and the like; derived marine plant mucilages, including but not limited to, algin, alginates, carrageenan, agar, furcellaran, and the like; other terrestrial plant extracts including but not limited to arabinogalactan, pectin, and the like; microbial fermentation products including but not limited to xanthan, dextran, scleroglucan, and the like. Cellulose derivatives include chemical derivatives of cellulose, including but not limited to, alkyl, carboxyalkyl, hydroxyalkyl and combination ethers, and the sulfonate and phosphate esters.

In some embodiments, the guar gum is a solution whose viscosity can be adjusted to accommodate variations in the treated solids. For example, the viscosity of a guar gum solution can be adjusted by treatment with gamma radiation to achieve a viscosity of about 40 to about 140 cps at 1% concentration at application temperature. Guar gum (such as that sold by Rantec, Inc. under the trade names SUPER TACK, C7000, J3000, and HVX); carboxymethyl guar gum (such as CM Guar sold by Maharashtra Traders); carboxymethyl *cassia* seed powder (such as CM *CASSIA* sold by Maharashtra Traders); carboxymethyl cellulose (such as FINNFIX300 sold by Noviant); starch (corn, maize, potato, tapioca, and wet milled/spray dried starch such as GW8900 sold by KTM Industries); starches pre-treated with crosslinking agents such as epiclorohydrin and phosphorus oxychloride; Carboxymethyl starch (0.2 to 0.3 degree of substitution (DS), such as AquaBloc, KogumHS, RT3063 and RT3064 sold by Process Products N.W.); hydroxypropyl guar gum; hydroxyethyl guar gum; carboxymethyl-hydroxypropyl guar gum; ethyl starch; oxidized starch; and hydroxyethyl cellulose. Other examples of polymers include *Cassia* seed powder, *psyllium* husk powder, xanthan gum, any cereal grain, annual or perennial dicot seed derived polysaccharide (*sesbania*, locust, bean gum, flax seed, and gum karaya).

In some embodiments, prior to the addition of guar gum, the water for the treatment agent formulation can be treated with a crosslinking agent made with a blend of one part glyoxal and two parts zirconium lactate (e.g., the DuPont product sold under the brand name TYZOR 217) at a rate of 30 to 50 parts crosslinking agent per 100 parts of polymer. For example, to 15 gallons of water (125.1-lb) a dose of 1.75-lb of guar gum is to be added; prior to the polymer addition a dose of 0.70-lb of crosslinking agent (40% of 1.75-lb of polymer) is added. The guar gum polymer can, in some embodiments, be added to the water at a rate of 0.70% to 1.4% by weight. A plasticizer, glycerin, can also be added at a rate of 0.5 to 5% by weight of the guar gum solution. In some embodiments, the cross-linker is after the guar gum is hydrated in the water.

Water-dispersible starch derivatives include, but are not limited to, alkyl, carboxyalkyl, hydroxyalkyl and combination ethers of starch, phosphate or sulfonate esters of starch and the like which are prepared by various chemical or enzymatic reaction processes.

Tables 1 and 2 are non-limiting exemplary lists of liquid, dust suppressing, chemical treatment agents by category and commercial product name that can be used to treat proppant solids for fugitive dust control according to the processes and methods described herein.

TABLE 1

| SUPPRESSANT CATEGORY | PRODUCT NAME | MANUFACTURER OR PRIMARY DISTRIBUTOR |
|---|---|---|
| Molasses/Sugar Beet | Dust Down | Amalgamated Sugar Co. |
| Tall Oil Emulsion | Dust Control E | Pacific Chemicals, Inc./Lyman Dust Control |
|  | Dustrol EX | Pacific Chemicals, Inc/Lyman Dust Control |
|  | Road Oyl | Soil Stabilization Products Co., Inc. |
| Vegetable Oils | Soapstock | Kansas Soybean Association Indiana Soybean Association |
|  | Dust Control Agent SS | Greenland Corp. |
| Enzymes | Bio Cat 300-1 | Soil Stabilization Products Co., Inc. |
|  | EMCSQUARED | Soil Stabilization Products Co., Inc. |
|  | Perma-Zyme 11X | The Charbon Group, Inc. |
|  | UBIX No. 0010 | Enzymes Plus, Div of Anderson Affiliates |
| Ionic | Road Bond EN-1 | C.S.S. Technology, Inc. |
|  | Terrastone | Moorhead Group |

TABLE 1-continued

| SUPPRESSANT CATEGORY | PRODUCT NAME | MANUFACTURER OR PRIMARY DISTRIBUTOR |
|---|---|---|
| Sulfonated Oils | CBR Plus | CBR Plus, Inc. (Canada) |
|  | Condor SS | Earth Sciences Products Corp. |
|  | SA-44 System | Dallas Roadway Products, Inc. |
|  | Settler | Mantex |
|  | TerraBond Clay Stabilizer | Fluid Sciences, LLC |
| Polyvinyl Acetate | Aerospray 70A | Cytec Industries |
|  | Soil Master WR | Enviromental Soil Systems, Inc. |
| Vinyl | Earthbound L | Earth Chem Inc. |
| Acrylic | ECO-110 | Chem-crete |
|  | PolyPavement | PolyPavement Company |
|  | Liquid Dust Control | Enviroseal Corp. |
|  | Marloc | Reclamare Co. |
|  | Soiloc-D | Hercules Soiloc |
|  | Soil Seal | Soil Stabilization Products Co., Inc. |
|  | Soil Sement | Midwestern Industrial Supply, Inc. |
|  | TerraBond PolySeal | Fluid Sciences, LLC |
| Combination of Polymers | Top Shield | Base Seal International, Inc. |

TABLE 2

Polymers

TerraLOC - polyvinyl alcohol from MonoSol, LLC, Portage IN 46368
Tracer Tackifier - copolymer of sodium acrylate and acrylamide with pre-gelatinized starch from Reinco Inc., Plainfield, NJ 07061
DirtGlue - acrylate ester polymer emulsion and organosilicon waterproofing agent (US 2012020755) from TerraFirmer Corporation, Amesbury, Massachusetts 01913
Soil Sement - emulsion of acrylic and vinyl acetate polymer plus a resin-modified emulsion made with a mixture of pitch and rosin (US 2013019128) from Midwest Industrial Supply, Akron, Ohio
Enviroseal LDC - inorganic acrylic copolymers from Enviroseal Corporation, Port St. Lucie, Florida 34952
Envirotac II - acrylic copolymers from Environmental Products & Applications, La Quinta, California 92253
DustShield -- acrylic styrene emulsion polymer from Soil-Loc, Inc., Scottsdale, Arizona 85255
SoilShield-LS - Poly vinyl acrylic copolymer from Soil-Loc, Inc., Scottsdale, Arizona 85255
Marloc - copolymer emulsion from Rantec Corp., Ranchester, WY 82839
SOILOC-MQ - liquid blend of acrylic resins from Hercules Environmental, Inc., Doraville, GA 30340
Polytac - acrylic co-polymer from DustPro, Inc., Phoenix, AZ 85034
Soiltac ® - synthetic copolymer emulsion from Soilworks, LLC., Chandler, AZ 85286

Lignin Sulfonates

Lignosite 458 -- from Georgia-Pacific Chemicals LLC, Atlanta, GA
LS-50 from Prince Minerals, New York, NY 10036

Other Chemical Suppressants

EK-35 -- high viscosity synthetic iso-alkane from Midwest Industrial Supply, Inc., Canton, OH
EnviroKleen - sodium salt of a secondary alkane sulphonate and D-limonene from Milestone Chemicals Australia Pty Ltd., West Heidelberg, Vic. 3081, Australia
Earthzyme -- multi-enzyme product from Cypher International Ltd., Winnipeg, MB Canada RG3 0J8
Diamond Doctor - severely hydrotreated, hydorcracked, hydroisomerized, high viscosity synthetic iso-alkane (CAS 178603-64-0) from Midwest Industrial Supply, Inc., Canton, OH
DUSTRACT - mixture of diethylene glycol, ethyl alcohol and sodium dioctyl succinate from Midwest Industrial Supply, Inc., Canton, OH
DustFloc -- blend of natural and organic polysaccharides from Apex Resources, Inc., Louisville, KY 40228
Roadbond EN1 - sulphonates and surfactants from C.S.S. Technology, Inc., Tolar, TX 76476
TERGITOL ™ NP- or NP-9 -- nonionic surfactants from Dow Chemical
PAVECRYL ™ SUPPRESS -- vinyl/acrylic emulsion from Dow Chemical Other Emulsions ArenaPro -- natural soy-lecithin blend from Dustkill LLC, Columbus, IN 47203
Road Oyl Resin Modified Emulsion - a pine rosin and pitch emulsion alleged to be made in accordance with U.S. Pat. No. 4,822,425; from Midwest Industrial Supply, Inc., Canton, OH The products described herein can be contacted with the solids as described herein. The processes are not limited to the specific examples. Other liquid, dust suppression, treatment agents that are typically commercially available and described as useful for controlling unpaved road dust, dust from storage piles, and similar structures can also be used. Such agents can be aqueous or solvent-based, but are not just water or a volatile solvent. That is, in some embodiments, a treatment agent is not water or a volatile solvent not containing any other components.

In some embodiments, the treatment agent can be in the form of thin coatings that can cure by contact with ambient water or moisture, e.g., an alkyl that can cure on exposure to moisture.

In some embodiments, the treatment agent comprises a light mineral oil which can be contacted with the proppant solids in the form of a light oil or in an aqueous form with a surfactant. Mineral oils that can be used as/in the treatment agent include, but are not limited to, mineral oils characterized by a pour point of from about 30° F. to about 120° F., a viscosity from about 50 SSU to about 350 SSU at 100° F., a distillation temperature above about 500° F., a distillation end point below about 1000° F., a distillation residue of not more than about 15%, and an aromatic content of not more than about 60%.

In some embodiments, mineral oils are characterized by a pour point of from about 35° F. to about 100° F., a viscosity from about 100 SSU to about 310 SSU at 100° F., a 10% distillation temperature from about 500° F. to about 700° F., a distillation end point below about 900° F., a distillation residue of not more than about 15%, and an aromatic content of not more than about 50%.

The mode or modes by which the treatment agent according to the methods disclosed herein reduces fugitive dust is not, as yet, fully understood. While not wishing to be bound by any particular theory, it may be that the applied treatment agent provides a sufficiently adhesive surface that generated fugitive dust merely sticks to the outer surface of a treated solid. It may also be that the treated surface acts as a wetted surface of reduced friction that allows impacts to slide off rather than impart a structural shock impact to the proppant. A further possibility is that the small amount of applied dust control treatment agent acts as an adhesive and that fugitive dust captured on the surface of the treated proppant acts as an impact modifier to cushion impacts and friction that might otherwise generate fugitive dust from the proppant surface. It may also be that when the chosen polymer is applied to some substantial part of the exposed surface area that the polymer acts as an impact modifier to cushion the impact of the grain-to-metal or grain-to-grain contacts. It may also be that, if the treatment process does not fully cover the exposed surface area, that the collision of an uncoated grain with a partially-coated grain still can minimize the generation of dust/broken particles. The exact reason that the processes described herein can be used to reduce dust is not necessarily significant, but rather the result that is achieved is.

The processes described herein can also be used to apply other coatings to proppants. Such other coatings can provide the proppants with additional, functional properties at the same time as the dust control treatment or an independent treatment step. Such other coatings can include the following. The processes can also be used to provide a coating that does not result in fugitive dust control.

Hydrophobic Coatings. Water barriers are useful to prevent reaction or dissolution of proppant under acidic or basic conditions downhole. Chemical reactions of proppant are known to cause reductions in crush resistance, and potential scale formation through diagnosis, i.e., dissolution of the proppant and re-precipitation with dissolved minerals in the formation water.

A water resistant coating can be formed by contacting the proppant solids with one or more organofunctional alkoxy silanes to develop a hydrophobic surface. Examples of organofunctional alkoxy silanes include, but are not limited to, waterborne or anhydrous alkyl or aryl silanes. Triethoxy [$(CH_3CH_2O)_3SiR$], or trimethoxy [$(CH_3O)_3SiR$] where R represents a substituted or unsubstituted alkyl or substituted or unsubstituted aryl moiety, silanes and chlorosilanes could be used as well if a lower reaction temperature and higher speed of reaction are necessary. It should be noted that HCl can be generated as a byproduct of the treatment process, which can cause issues with corrosion. Therefore, in some embodiments, corrosion-resistant treatment heads and handling equipment immediately after the chlorosilane treatment can be used. Other hydrophobic coatings, such as cured and/or curable hydrophobic polymers, curable hydrophobic polymers and thermoplastic hydrophobic polymers are also described herein and can be used. Examples of these polymers, include, but are not limited to, polybutadienes, polyalphaolefin, and the like, and mixtures thereof.

In some embodiments, if a hydrophobic and oleophobic surface is required, treatment of the proppant with a fluoroalkyl silane is performed. A hydrophobic coating can also be applied by utilizing the compatibilizing agent and hydrophobic polymers described herein.

If a thicker crosslinked, polymeric coating is needed for enhanced durability and hydrophobicity, a polymer can be applied after the silane treatment. In such a treatment, the silanes can include, but are not limited to, a triethoxy [$(CH_3CH_2O)_3SiR$], or trimethoxy [$(CH_3O)_3SiR$] silane, where the R can include a functional group that could either react with crosslinkable polymers after they are applied on the surface of the proppant, or can be chemically compatible with the polymer for van der Waals force of adhesion of the polymer. In some embodiments, the R Groups for the silanes include, but are not limited to:

amines (for preparation or polyurethanes, polyureas, polyamides, polyimides or epoxies. Amines can also be used for polysulfones);

isocyanates (for polyurethane, polyurea coatings);

vinyl (for reaction with polybutadiene, polystyrenebutadiene, other addition type olefinic polymers, or reaction with residual vinyl groups in any copolymer blends used as coatings);

epoxides (for reaction with epoxies);

methacrylate or ureido groups (for polyacrylates); and phenyl groups (for use with aromatic-containing polymers such as the polyaryletherketones (PAEKs) and their composites such as polyetherketoneketone (PEKK)/ 50:50 terephthallic:isothallic/amorphous polyetherketoneetherketoneketone (PEKEKK), polyethersulfone (PES), polyphenylsulfone (PPSU), polyetherimine (PEI), or poly(p-phenylene oxide) (PPO)).

The thicker, crosslinked, polymeric coatings can be prepared by a first step of application of silanes, followed by a second step of flash coating with the polymer, prepolymers, or monomers. As used herein, the phrase "flash coating" refers to the process of applying the agent according to a process described herein. In some embodiments, catalysts can be used for inducing reactions at typical operating temperatures of the flash coating process, i.e. room temperature to 85° C. In some embodiments, methoxysilanes tend to react faster than ethoxy silanes, so methoxysilanes can be used for fast, flash-type coatings. If speed of reaction of the silane treatment is a limiting factor for proper coating, chlorosilanes can be used as substitutes for methoxy or ethoxysilanes. In some embodiments, corrosion resistant materials are used in the application process.

In some embodiments, methods for forming flash coatings of high temperature aromatic polymers use a solvent-based slurry or fully dissolved solution. Suitable solvents include, but are not limited to, N-methylpyrrolidone (NMP), dimethylformamide (DMF), and dimethylsulfoxide (DMSO). If excess solvents remain after application, they can be removed via a drying step prior to transfer into containers for shipment.

Scale Inhibition. Several polymeric substances can be used on proppants to inhibit scale formation, including phosphino-polycarboxylates, polyacrylates, poly vinyl sulphonic acids, and sulphonated polyacrylate co-polymers, or any combination thereof. In the past, these polymers had to be injected into the formation where they would then disperse to be effective. See U.S. Pat. No. 5,092,404. Such injections often lead to a substantial volume of the inhibitor being produced back out of the well early in the production cycle. By applying them directly to the proppant as described herein, the coated proppants can provide a targeted, positionable, anti-scale treatment on the relatively large surface area of the proppants in fractured strata. With a large portion of the active surface area treated, the effective surface area where scale can form is reduced as well as prevent scale formation in the spaces between proppant particles (i.e., pores) where scale deposits can have a large negative impact on proppant conductivity.

Suitable scale inhibitors include, but are not limited to, carboxylates and acrylates. These inhibitors can be applied to the surface of a proppant in a similar manner to those other functional coatings described above. Also suitable are fumaric acid (CAS 110-17-8), Diethylene Glycol (CAS 111-46-6), phosphorous acid (CAS 13598-36-2), trisodium 2,2'-({2-[(carboxylatomethyl)amino]ethyl}imino)diacetate (CAS 19019-43-3), sodium glycolate (CAS 2836-32-0), glycine (CAS 38011-25-5), trisodium nitrilotriacetate (CAS 5064-31-3), 1,2-propylene glycol (CAS 57-55-6), methoxyacetic acid (CAS 625-45-6), methylphosphonic acid (CAS 6419-19-8), polyphosphoric acids (CAS 68131-71-5), alkylbenzene (CAS 68648-87-3), phosphino-carboxylic acid (CAS 71050-62-9), trisodium ortho phosphate CAS 7601-54-9), and sodium polyacrylate (CAS 9003-04-7), or any combination thereof.

If additional adhesion to the proppant surface is needed due to too high of a solubility of the scale-inhibiting polymer in the production fluid, amines or ureidosilanes can be used as tethering agents for the acrylates and carboxylates. Full chemical bonding can also be achieved by adding a vinyl silane, and also retaining some vinyl functionality in the carboxylates, acrylates, and polyvinylphosphonic or polyvinylsulfonic acids. Peroxides can be used to initiate coupling of the vinyl silane with the vinyl polymer treatment, via addition of the peroxide in a subsequent treatment, and applying it to a heated substrate. In some embodiments, additives can be mixed with inert polymers to be sprayed to impart scale reduction functionality to the coatings. They could also be imbedded in water soluble polymers to allow timed release of the scale additives. The release time of the additives from the polymeric coating can be adjusted by modifying the swell rates of the polymer via adjustments to the crosslink density or density of concentrations of hydrophilic moieties on the polymer backbones. Other coatings described herein can also serve as a time release coating. For example, the dust reduction coating can be used to serve as a time release function.

Friction Reduction. Currently, when those in the industry refer to "friction reduction" they are talking about the friction pressure generated when moving the frac fluid down the well, typically through tubular conduits to the formation to be treated. Of the mechanisms for friction reduction, the most accepted is thought to involve a reduction in turbulent flow due to the presence of stretched oligomers or high molecular weight polymers that extend into the fluid and disrupt the formation of turbulent eddies in the flowing fluid, often along the walls of a conduit.

Proppant treatment for reduced friction can take the form of a released, high molecular weight polymer that can help with fugitive dust control aboveground but which releases from the proppant into the frac fluid where it serves a second function as a turbulence reducer. Therefore, one can create a proppant that has fugitive dust control and reduced friction properties. In some embodiments, these properties can be imparted onto the solids with the same treatment agent.

In some embodiments, a direct coating of the proppant with one or more releasable or dissolvable polymers can deliver the turbulence-reducing agents for the well via a surface on the proppant. The coating can be designed to release the turbulence-reducing agents immediately or after some time delay. If delayed, such a coating can help reduce the volume of turbulence-reducing polymers in the frac fluid and avoid the associated deposits and loss of conductivity that can accompany such excess quantities. Once the proppant is placed in the fracture, the delayed dissolution or release of the polymeric turbulence-reducing coating on the proppant occurs in-situ for enhanced control and reduced opportunities for unintended deposits and accumulations of polymeric agents.

The turbulence-reducing coatings can be designed by those in this art for immediate release via use of water soluble polymers, or for timed release via tailoring of the water soluble polymer for delayed swelling. Materials that can be used for friction-reducing coatings include caprylic alcohol caprylic alcohol (CAS 111-87-5), polyacrylamide (CAS 25085-02-3), copolymer of acrylamide and sodium acrylate (CAS 25987-30-8), acrylamidelammonium acrylate copolymer (CAS 26100-47-0), ethoxylated oleylamine (CAS 26635-93-8), acrylamide/sodium acryloyldimethyltaurate copolymer (CAS 38193-60-1), 2-propenamide, polymer with 2-propenoic acid and sodium 2-propenoate (CAS 62649-23-4), alcohols, c6-c12, ethoxylated (CAS 68002-97-1), alcohols, c12-14, ethoxylated (CAS 68439-50-9), alcohols, c12-16, ethoxylated (CAS 68551-12-2), ammonium sulfate (CAS 7783-20-2), acrylamid (CAS 79-06-1), ptfe (teflon) (CAS 9002-84-0), polyacrylamide (CAS 9003-05-8), poly(acrylamide-co-acrylic acid) (CAS 9003-06-9), or any combination thereof.

In the so-called "water fracs" where there is no frac fluid system and only a friction reducer in water, the concentration of the friction reducer is very low (<5 lb/1000 gallons). In such a case, the turbulence-reducing polymer is less likely to cause significant damage but surface friction along the proppant pack pores can retard flow and thereby reduce conductivity. Such a situation can benefit from the second type of coating having hydrophobic and/or oleophobic properties to allow flowing fluids to slide off the proppant surfaces and through the pore spaces. A coating that is either hydrophobic and/or oleophobic can permit both materials to move by with reduced friction.

Treatment in this manner can also result in improvement in removal of static water trapped in the interstices of the proppant particle surface and between the particles. This can help minimize water lock, and thus improve overall hydrocarbon production from a well by reducing the surface tension and the amount of force needed to remove the water from the pores and allow hydrocarbons to flow through the proppant pack. In some embodiments, through the use of the particulates described herein there will be a reduction in relative water saturation, which will in turn result in an increase in hydrocarbon production. In some embodiments, the coating described herein can be used to reduce capillary force, and, therefore, for example, ease of water removal from proppant pac.

Suitable materials for flash coating or coating the proppant with such hydrophobic and/or oleophobic agents include, but are not limited to, superhydrophobic coatings such as those found in U.S. Pat. No. 8,431,220 (hydrophobic core-shell nano-fillers dispersed in an elastomeric polymer matrix); U.S. Pat. No. 8,338,351 (hydrophobic nanoparticles of silsesquioxanes containing adhesion promoter groups and low surface energy groups); U.S. Pat. No. 8,258,206 (hydrophobic nanoparticles of fumed silica and/or titania in a solvent); and U.S. Pat. No. 3,931,428 (hydrophobic fumed silicon dioxide particles in resin) and the durable hydrophobic coatings of U.S. Pat. No. 8,513,342 (acrylic polymer resin, polysiloxane oil, and hydrophobic particles); U.S. Pat. No. 7,999,013 (a fluorinated monomer with at least one terminal trifluoromethyl group and a urethane resin); and U.S. Pat. No. 7,334,783 (solid silsesquioxane silicone resins), or any combination thereof. Additional materials that can be used include, but are not limited to, aliphatic or aromatic polymers that exhibit water contact angles of greater than about 90°, such as polybutadiene-containing polymers, polyurethanes with high proportions of soft segments (e.g., aliphatic segments), polymethylmethacrylate, and siloxane resins, including polydimethylsiloxane, or any combination thereof.

The use of a hydrophobic coating on the proppant can also have the effect of preventing water from reaching the surface of the sand grain. It has long been documented that uncoated sand's conductivity decreases with an increasing test temperature. This implies that the combination of elevated temperature and water contact may be damaging to the integrity of the sand particle and the corresponding proppant pack. Therefore, a hydrophobic coating can be used to slow down or minimize the detrimental effects that are observed with increased temperature in water-rich environments like those found downhole. The hydrophobic coating can be a coating comprising the compatibilizing agent and the hydrophobic polymer described herein.

In some embodiments, the proppant is coated with multiple coatings. In some embodiments, the proppant is coated with a first layer of hydrophobic/oleophobic coating followed by a turbulence-reducing coating. Such a layered structure can permit the treated proppant to both reduce turbulence from separation of the top layer and then reduce surface drag by the flowing fluids by the underlying layer. In some embodiments, the particulate (proppant) is coated with the coating comprising the compatibilizing agent and the hydrophobic polymer followed by, or simultaneously with, a turbulence-reducing coating.

Friction reducing coatings can also take the form of materials with a low external, interparticle friction that function as a slip aid. A suitable material for use as such an slip aid is a product sold under the tradename POLYOX from Dow Chemical. This material is a non-ionic water-soluble poly(ethylene) oxide polymer with a high-molecular weight.

Tracer Coatings. Tracers are radioactive isotopes or non-radioactive chemicals that are injected in a well at specific sites with the intent that they will come out in detectable levels at some point in the effluent. Thus, they allow flow tracking of injected fluids from the source of introduction to the effluent stream. In addition, tracers that are location-specific can be used to track production of fluids from specific areas/zones in a well. Often, the tracers are introduced as an additive into the fracturing fluid during completion of a particular zone of interest. The tracers can also be incorporated into the coating comprising compatibilizing agent and the hydrophobic polymer Common radio-isotope chemistries used as tracers include tritiated water ($^3H_2O$); tritiated methane ($^3CH_4$); $^{36}Cl$-$^{131}I$—; $35SO_4^{2-}$; $S^{14}CN^-$; $H^{14}CO^{3-}$; and $^{22}Na^+$.

Common non-radioactive tracer chemicals include halohydrocarbons, halocarbons, $SF_6$, and cobalt hexacyanide, where the cobalt is present as an anionic complex because cationic cobalt can react and precipitate downhole. Various organic compounds of usefulness include sulfonic acids and salts of those acids, mapthalenediol, aniline, substituted analine, and pyridine.

Tracers can be embedded in proppants but usually require actual movement of the proppant particle out of the well (i.e., flowback). The tagged proppant particle itself is then collected as a sample and analyzed for the presence/absence of the tracer. See U.S. Pat. Nos. 7,921,910 and 8,354,279. Others have sought to incorporate non-radioactive tagging chemicals into the proppant resin coating, but such an introduction method has required custom proppant formulations that must be manufactured well in advance of planned usage in a particular well. This can cause issues as the reactive phenolic coated proppants can sometimes have short useful shelf life as the taggants must be released before the phenolic resin becomes fully cured.

One feature in common among the tagged proppant techniques to date is that all of them require substantial pre-planning for production of multiple, different, tagged proppants for different well zones in advance of injection. For example, if five different zones need to be mapped, five different tagged proppant formulations might be needed. This means that five different types of proppants must be prepared at the resin coating plant and stored in inventory by either the proppant manufacturer or by the well completion group.

In some embodiments, the present methods and processes occur so quickly and with such small amounts of applied polymers, resins, or organic compounds that the same tracers, metals, salts and organic compounds could be used as have been used previously in resin coating facilities. Additionally, new polymers or oligomers can be used that contain specific functional groups that have not been previously used, such as fluorescent dyes or phosphorescent pigments that can be detected in even small quantities in produced effluent, whether water or hydrocarbon. Suitable fluorescents include coumarins, napthalimides, perylenes, rhodamines, benzanthrones, benzoxanthrones, and benzothioxanthrones. Phosphorescent pigments include zinc sulfide and strontium aluminate. The coating used in the present process can be tailored to allow for selective or timed release leaching of the tracer salts from the coating into the downhole environment. This would allow the effluent to be used for analysis rather than requiring an analysis of recovered proppants in the flowback. In addition, very short lead times can be gained through use of this process, to allow greater flexibility for the customer to specify numbers of different tagging sections needed in a particular well. In some embodiments, the coatings applied by the processes described herein are applied immediately before moving the sand from terminals into containers for shipment to the well pad. This means that the inventory is reduced to the containers of tracer agent.

Some metal agents, e.g., tin and copper, that were previously used as biocides can also serve the function of a tracer in a proppant coating.

Suitable polymers to prepare tracer coatings include acrylate copolymers with hydrolysable silylacrylate functional groups, such as those described by U.S. Pat. No. 6,767,978. Briefly described, such polymers are made from at least three distinct monomers units selected from the group consisting of fluorinated acrylic monomers, (e.g. 2,2,2-Trifluoroethylmethacrylate (matrife)), triorganosilylacrylic monomers, (e.g., trimethylsilyl methacrylate) and acrylic monomers not containing an organosilyl moiety, (e.g. methyl methacrylate). The three component polymer (i.e. terpolymer) can optionally contain from 0-5 weight percent of a crosslinking agent. Such polymers are copolymers comprising the reaction product of:

a) a monomer of the formula:

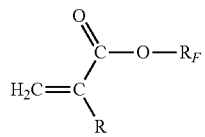

wherein:
R is $CH_3$ or H, and
$R_F$ is $(C)_u(CH)_v(CH_2)_w(CF)_x(CF_2)_y(CF_3)$ where u is from 0 to 1, v is from 0 to 1, w is from 0 to 20, x is from 0 to 1, y is from 0 to 20, z is from 1 to 3, and the sum of w and y is from 0 to 20, b) a monomer of the formula:

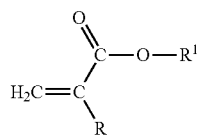

wherein: R is $CH_3$ or H, and $R^1$ alkyl or aryl, and c) a monomer of the formula:

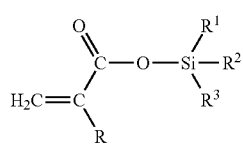

wherein:
R is $CH_3$ or H, and
$R^1$, $R^2$, and $R^3$ can be the same or different and are non-hydrolysable alkyl groups containing from 1 to 20 carbon atoms and/or non-hydrolysable aryl groups containing from 6 to 20 carbon atoms.

In addition, depending on the chemistry used, metal-containing tracer moieties can also be used as biocides, similar to marine antifouling coatings. For example, tin and copper are commonly used as biocides in marine paints. These metals or their salts could also be incorporated into the acrylate latexes for flash coating onto the proppant or added to insoluble polymers for permanent attachment to the exterior of the proppant surface.

Suitable water soluble and dissolvable polymers are described in U.S. Pat. No. 7,678,872. Such polymers can be applied to proppants according to the present flash coating process to allow for introduction timed release functionality of the tracers into the produced fluid as the polymer swells or dissolves while also serving to control fugitive dust from the proppant.

Impact Modifiers. Fines in a well can severely affect the conductivity of a proppant pack. Production of 5% fines can reduce conductivity by as much as 60%. Particle size analysis on pneumatically transferred 20/40 sand with a starting fines distribution of 0.03% showed an increase in fines to 0.6% after one handling step, and 0.9% after two handling steps prior to shipment to a well pad. Transport and further handling at the well site will likely also produce significantly more impact-related fines.

The processes described herein can be used to coat proppants with polymers specifically designed to be more deformable, which will greatly aid in the reduction of impact induced fines production. These polymers reduce the number of grain failures when closure stress is applied, effectively increasing the K value of the proppant, and can reduce fines migration by keeping failed grains encapsulated.

There are at least three ways that a thin, deformable coating on a proppant can improve fracture conductivity. The first is a benefit addressing the handling process. An additive that controls/prevent the generation of dust (through handling and pneumatic transfer) is helping to minimize the generation and inclusion of fine particles that are created through movement of such an abrasive that material as uncoated sand. Without wishing to be bound by any theory, the process that causes the creation of fines is simultaneously creating weakened points everywhere the grain was abraded. Conductivity tests have documented that uncoated sand samples that were moved pneumatically had measurably lower conductivity than the same sand not so handled. The impact-modifying polymer coating can further reduce grain failure by spreading out point-to-point stresses that occur when one grain is pushed against another during the closure of the fracture and subsequent increase of closure stress that occurs as the well is produced. The deformable coating effectively increases the area of contact between two grains. This increase in contact area reduces the point loading that is trying to make the grains fail. Minimizing the generation of fines that occur either during handling or from the pressure applied in the fracture, will mean there are less fines that can be mobilized to create conductivity damage. If the flash coating results in a uniformly distributed film around the sand grain, the coating can be an effective means of preventing fines movement through the encapsulation of any failed grains. Preventing or minimizing the movement of fines can result in controlling a condition that has been proven to be capable of reducing fracture conductivity by as much as 75%.

In some embodiments, for an impact modified layer, the layer comprises lower Tg polyurethanes or lightly cross-linked polyurethanes. The polyurethane formula could be tailored for lower Tg and better resilience by using a very soft polyols (e.g., polybutadiene-based polyols with very light crosslinking). Another embodiment uses the application of a thin coating of polybutadiene polymer as the impact layer. Such a flash coating is applied with either a latex-based or solvent-based formulation, and a peroxide for lightly curing/crosslinking the polybutadiene coating. Other embodiments include, but are not limited to, other rubbery polymers including polyisoprene, polychloroprene, polyisobutylene, crosslinked polyethylene, styrene-butadiene, nitrile rubbers, silicones, polyacrylate rubbers, or fluorocarbon rubbers. The rubber or gum should be in a water-based latex or dispersion or dissolved in a solvent for spray application.

Polybutadiene coatings with unreacted vinyl or alkene groups can also be crosslinked through use of catalysts or curative agents. When catalysts, fast curatives, or curatives with accelerants are introduced during processes described herein, the result will be a very hard, tough coating. Alternately, curative agents can be added that will activate thermally after the materials are introduced downhole at elevated temperatures. This may have the effect of having a soft rubbery coating to protect against handling damage, but that soft rubbery coating could then convert to a hard coating after placement downhole at and cured elevated temperatures.

Curative agents that can be used are those that are typically used for rubbers, including sulfur systems, sulfur systems activated with metal soaps, and peroxides. Accelerators such as sulfonamide thiurams or guanadines might also be used, depending on cure conditions and desired properties. Other curing catalysts could also be employed to perform similarly include ionic catalysts, metal oxides, and platinum catalysts.

Additive Delivery. "Self-suspending proppants" can have an external coating that contains a water swellable polymer that changes the proppant density upon contact with water. See, for example, U.S. 2013/0233545. Such coatings are taught to have about 0.1-10 wt % hydrogel based on the weight of the proppant and can contain one or more chemical additives, such as scale inhibitors, biocides, breakers, wax control agents, asphaltene control agents and tracers. Since the effect of the hydrophobic polymer, along with, for example, the introduction of nitrogen, carbon dioxide, air, or any combination thereof has the net effect of decreasing the density of particles through attachment of bubbles and imparting flotation capability, the coatings described herein comprising the hydrophobic polymer and the compatibilizing agent can also be referred to as a self-suspending proppant. The gas can be used to enhance transport of the oil, gas, and or the sand through the well.

In some embodiments, the water swellable polymer can be applied by processes described herein and present at a much lower concentration, e.g., less than about 0.1 wt %, or from about 0.001 to about 0.07 wt %. At such low levels, the swellable coating is unlikely to produce a self-suspending proppant but, rather, imparts enhanced mobility relative into the fracture to untreated sand while also providing dust control as well as a delivery system upon contact with water for biocides and tracers. For example the swellable polymer coating could act as a dust control when first applied, could swell to enhance mobility for placement, and could also contain tracers, biocides, or other active ingredients that could be released over time through diffusion out of the swollen polymer.

Soluble and semi-soluble polymers that can be used as delivery coatings include, but are not limited to, 2,4,6-tribromophenyl acrylate, cellulose-based polymers, chitosan-based polymers, polysaccharide polymers, guar gum, poly(1-glycerol methacrylate), poly(2-dimethylaminoethyl methacrylate), poly(2-ethyl-2-oxazoline), poly(2-ethyl-2-oxazoline), poly(2-hydroxyethyl methacrylate/methacrylic acid), poly(2-hydroxypropyl methacrylate), poly(2-methacryloxyethyltrimethylammonium bromide), poly(2-vinyl-1-methylpyridinium bromide), poly(2-vinylpyridine n-oxide), polyvinylpyridines, polyacrylamides, polyacrylic acids and their salts (crosslinked and partially crosslinked), poly (butadiene/maleic acid), polyethylenglycol, polyethyleneoxides, poly(methacrylic acids, polyvynylpyrrolidones, polyvinyl alcohols, polyvinylacetates, sulfonates of polystyrene, sulfonates of polyolefins, polyaniline, and polyethylenimines, or any combination thereof.

Biocidal Coatings. A number of nonpolymeric biocides have been used in fracturing fluids. Any of these can be used in solid forms or adsorbed into solid or dissolvable solid carriers for use as additives in an applied coating according to the present disclosure to impart biocidal activity to the proppant coatings. Exemplary biocidal agents include, but are not limited to: 2,2-dibromo-3-nitrilopropionamide (CAS 10222-01-2); magnesium nitrate (CAS 10377-60-3); glutaraldehyde (CAS 111-30-8); 2-bromo-2-cyanoacetamide (CAS 1113-55-9); caprylic alcohol (CAS 111-87-5); triethylene glycol (CAS 112-27-6); sodium dodecyl diphenyl ether disulfonate (CAS 119345-04-9); 2-amino-2-methyl-1-propanol (CAS 124-68-5); ethelenediaminetetraacetate (CAS 150-38-9); 5-chloro-2-methyl-4-isothiazolin-3-one (CAS 26172-55-4); benzisothiazolinone and other isothiazolinones (CAS 2634-33-5); ethoxylated oleylamine (CAS 26635-93-8); 2-methyl-4-isothiazolin-3-one (CAS 2682-20-4); formaldehyde (CAS 30846-35-6); dibromoacetonitrile (CAS 3252-43-5); dimethyl oxazolidine (CAS 51200-87-4); 2-bromo-2-nitro-1,3-propanediol (CAS 52-51-7); tetrahydro-3, 5-dimethyl-2h-1,3,5-thia (CAS 533-73-2); 3,5-dimethyltetrahydro-1,3,5-thiadiazine-2-thione (CAS 533-74-4); tetrakis hydroxymethyl-phosphonium sulfate (CAS 55566-30-8); formaldehyde amine (CAS 56652-26-7); quaternary ammonium chloride (CAS 61789-71-1); $C_6$-$C_{12}$ ethoxylated alcohols (CAS 68002-97-1); benzalkonium chloride (CAS 68424-85-1); C12-C14 ethoxylated alcohols (CAS 68439-50-9); C12-C16 ethoxylated alcohols (CAS 68551-12-2); oxydiethylene bis(alkyldimethyl ammonium chloride) (CAS 68607-28-3); didecyl dimethyl ammonium chloride (CAS 7173-51-5); 3,4,4-trimethyl oxazolidine (CAS 75673-43-7); cetylethylmorpholinium ethyl sulfate (CAS 78-21-7); and tributyltetradecylphosphonium chloride (CAS 81741-28-8), or any combination thereof.

Alternatively, an erodible outer coating with a timed release or staged release can be used that will dissolve and/or release included additives into the groundwater or hydrocarbons downhole. Such coatings can be based on polymers that were substantially insoluble in cool water but soluble in water at downhole temperatures where the active is intended to begin functioning shortly after introduction. Alternatively, the outer layer coating can be prepared in such a way as to render it insoluble in the well fluids and subject to release when crack closure stresses are applied.

The time frame for release of an encapsulated ingredient (biocide, scale inhibitor, etc.) via diffusion can be tailored based on the crosslink density of the coating. A polymer with little to no crosslinking can result a fast dissolving coating. Highly crosslinked materials can have a much slower release of soluble ingredients in the coating. If mobility of the chemicals of interest is too low in a crosslinked membrane, dissolvable fillers like salts, organic crystalline solids, etc. can be incorporated in the coating mixture. Once the coated proppant is introduced downhole, the particles can dissolve to leave larger pores as done for filtration membranes. See U.S. Pat. No. 4,177,228. Insoluble polymers like the thermosets (e.g., alkyds, partially cured acrylics, phenolics, and epoxies) and thermoplastics (e.g., polysulfones, polyethers, and most polyurethanes) can also be used as insoluble outer coatings applied as described herein. Alkyds, which are polyesters, are likely to hydrolyze over time under the hot, wet downhole conditions and can thereby use this property to impart a delayed release through combination of environmental hydrolysis and situational erosion. Polyamides, which can hydrolyze and degrade over time, can be used as well for this type of coating.

Coatings can be prepared by mixing thermoset polymers with the soluble fillers and applying them to the proppant particles according to the various embodiments described herein. Thermoplastic membrane coatings can be applied via dissolving in solvent, mixing with the soluble fillers, and coating the resulting mixture onto the proppant particles with subsequent removal of the solvent by drying with pneumatic conveyance air or air forced through the coated materials. Timings for release can be tailored by proper selection of filler size, shape, and filler concentration.

Biocidal polymer coatings. Biocides are often used at low concentrations in the hydraulic fracturing fluid mixtures, on the order of 0.001% in the fracturing fluid, which corresponds to approximately 0.01% of the total proppant weight. Microorganisms have a significant economic impact on the health and productivity of a well. For example, unchecked bacteria growth can result in "souring" of wells, where the bacteria produces hydrogen sulfide as a waste product of their metabolic function. Such sour gases in the produced fluids are highly undesirable and can be a source for corrosion in the production equipment as well as a cost for sulfur removal from the produced hydrocarbons.

Therefore, in some embodiments, a biocidal polymer can be applied to the proppants as an aid to both fugitive dust control as well as inhibition of bacterial growth downhole. Suitable polymers that can be used as biocides include: acrylate copolymer, sodium salt (CAS 397256-50-7), and formaldehyde, polymer with methyloxirane, 4-nonylphenol and oxirane (CAS63428-92-2), or any combination thereof.

In addition, depending on the chemistry used, metals used as marine antifouling coatings can also serve as biocides on a proppant. For example tin and copper are commonly used as biocides in marine paint. These same agents could be incorporated into the acrylate latexes for flash coating onto the proppant as a biocidal coating. As described herein, in some embodiments, a dust reduction coating can act as a time release mechanism by its presence and the need for the biocide to migrate through the coating before being released into the fluid flowing through the packed fracture. In some embodiments, the time release is independent of whether the coating is uniform or only covers a portion of the surface area.

Sulfide Control. Hydrogen sulfide is a toxic chemical that is also corrosive to metals. The presence of hydrogen sulfide in hydrocarbon reservoirs raises the cost of production, transportation and refining due to increased safety and corrosion prevention requirements. Sulfide scavengers are often used to remove sulfides while drilling as additives in muds or as ingredients in flush treatments.

Depending on the concentration of hydrogen sulfide in the fractured reservoir, the concentrations of the scavengers included on the surface of the proppant can be varied to remove more or less hydrogen sulfide. In sufficient volume, proppants with sulfide scavenging capabilities can reduce the concentration from levels that pose safety hazards (in the range of 500-1000 ppm) to levels where the sulfides are only a nuisance (1-20 ppm). If the surface area of the proppants is high and dispersion of the scavengers is good, high efficiencies in hydrogen sulfide reaction and removal are possible.

A timed release dosage can be delivered according to the present disclosure by including copper salts, such as copper carbonate ($CuCO_3$), in the proppant that can be delivered very slowly into the fracture to treat hydrogen sulfide before it can reach steel components in the wellbore.

Zinc oxide (ZnO) and ferric oxide ($Fe_2O_3$) are used directly as solid particulates to address hydrogen sulfide. These can be incorporated onto the surface of coated proppants or be formed as functional fillers within the proppant coating that is applied. The use of high surface area fillers, even nanometer-sized particulates, can be used to maximize the interaction area between the hydrogen sulfide and the metal oxide.

Also useful are oxidizing agents, such as solid forms of oxidizing agents. Exemplary materials include solid permanganates, quinones, benzoquinone, naphthoquinones, and agents containing quinone functional groups, such as chloranil, 2,3-dichloro-5,6-dicyanobenzoquinone, anthroquinone, and the like, or any combination thereof.

Polymers with pendant aldehyde groups can also be used introduce an aldehyde functionality in a proppant coating for control of hydrogen sulfides. Polyurethanes can be made with such functionalities. See U.S. Pat. No. 3,392,148. Similarly, other polymers can be formed with pendant aldehyde groups, such as polyethers, polyesters, polycarbonates, polybutadiene, hydrogenated polybutadiene, epoxies, and phenolics, or any combination thereof.

In addition, dendrimers can be prepared with multiple terminal aldehyde groups that are available for reaction. These aldehyde-rich dendrimers can be used as fillers, copolymers, or alloys and applied to the proppants as a coating, or a layered coating.

Dioxole monomers and polymers allow introduction of this functionality as pendant groups in polymers. Such dioxane functional groups can serve as oxidative agents to control the production of hydrogen sulfides. Homopolymers of dioxole can be used as well as copolymers of dioxoles with fluorinated alkenes, acrylates, methacrylates, acrylic acids and the like.

Amines and triazines also used as scavengers for hydrogen sulfide. Amine-terminated polymers or dendrimers can be used and have the advantage of being tethered to a polymer so they can stay in place in a proppant coating. High functionality can be achieved by the use of dendrimers, i.e., using multiple functional groups per single polymer molecule.

Triazines can be incorporated into polyurethane crosslink bridges via attachment of isocyanates to the R groups of the triazines. See U.S. Pat. No. 5,138,055 "Urethane-functional s-triazine crosslinking agents". Through variations of the ratio of —OH groups and the use of triol functionality and monofunctional triazine isocyanate, pendant triazines can also be prepared. These functionalized polymers can be added as fillers or prepared as the coating itself to both impart fugitive dust control as well as hydrogen sulfide control downhole.

Metal carboxylates and chelates, some of which are based on or contain zinc or iron, can be used on proppants to remove hydrogen sulfide. See U.S. Pat. No. 4,252,655 (organic zinc chelates in drilling fluid). These carboxylates or chelates are provided in the proppant coating as water soluble complexes which, upon interaction with hydrogen sulfide in-situ downhole, will form insoluble metal sulfates.

Hydrogen sulfide can also be controlled with polymers having functional groups that can act as ligands. Polycarboxylates that have been pretreated with metals to create metal carboxylate complexes can be mixed with other polymers, such as those described elsewhere herein, and applied as a coating to proppant particles. This is also applicable to other polymers with pendant functional groups that act as complexing ligands for sulfide, such as amines and ethers.

In some embodiments, the metals used for sulfide control are not present as a complex in the polymeric backbone so that removal of the metal would not have to involve polymer decomposition. Polymers with metal side chain complexes can be used. Polyvinylferrocenes, polyferrocenylacrylates are two such examples of this class of material. In some embodiments, the main chain metal containing polymer can also be used, but the polymer will degrade upon reaction with hydrogen sulfide.

If the production fluid which contains hydrogen sulfide at a basic pH (i.e., pH of greater than 7 or greater than 8-9), most of the hydrogen sulfide will be present as HS-anion. In this case, anion exchange resins or zeolites can be used to extract the HS-anions from the fluid. The zeolites or anionic exchange resins can be used as active fillers in a resin coated proppant composition include aluminosilicates such as clinoptilolite, modified clinoptilolite, vermiculite, montmorillonite, bentonite, chabazite, heulandite, stilbite, natrolite, analcime, phillipsite, permatite, hydrotalcite, zeolites A, X, and Y; antimonysilicates; silicotitanates; and sodium titanates, and those listed in U.S. Pat. No. 8,763,700, the disclosure of which is hereby incorporated by reference. Suitable ion exchange resins are generally categorized as strong acid cation exchange resins, weak acid cation exchange resins, strong base anion exchange resins, and weak base anion exchange resins, as described in U.S. Pat. No. 8,763,700. Hydrogen sulfide that is produced through biological activity is controlled through use of biocides and biocidal coatings (as discussed above), and removal of sulfate anions ($HSO_4^-$ or $SO_4^{-2}$). Anion exchange resins can be used for removal of sulfate. Nitrates can also be used to disrupt the sulfate conversion by bacterial. Nitrate salts can also be added in a coating layer and then protected from premature release with an erodible or semipermeable coating to allow an extended release of the nitrates.

Composite Coatings. In some embodiments, the processes described can be carried out effectively in series, and such a process provides a cost-effective process to apply multiple layers of coatings with different compositions and different functional attributes. A variety of combinations are possible. For example, in some embodiments, multiple spray heads could be used, each of which can apply a different formulation. If the successive coating formulation is chemically incompatible in that the applied layer does not wet the undercoated layer, one or more primer agents, e.g., block or graft copolymers with similar surface energies and or solubility parameters as the two incompatible layers, can be used for better interfacial bonding. The different spray heads can also be used to apply the same formulation if multiple layers are desired. Some examples of composite coatings include the following.

Two layers for improved proppant physical performance. Different, successive layers are applied with different performance characteristics, such as a hard urethane layer (urethane, crosslinker (such as polyaziridine), and isocyanate) followed by an outer, softer urethane layer. This coating structure can allow some compaction for proppant particle bonding due to the soft outer layer but inhibit further compaction/crushing due to the hard inner layer. The relatively softer outer layer can also tend to reduce interparticle impact damage as well as wear damage on the associated handling and conveying equipment used to handle the proppants after the flash coating was applied.

Successive layers for a timed release functionality. Successive layers can be used to add a first layer with an additive having a first functionality followed by a second layer having properties that control when and how ambient liquids get access to the first layer additive materials. For example, a soft, lightly crosslinked urethane layer with biocide additives is covered with a hard urethane layer that contains dissolvable particles. When the dissolvable particles are removed, the outer coating forms a semipermeable coating that allows slow diffusion of the underlying biocidal additive.

Layers of strongly-bonded polymer followed by weakly-bonded polymer. A silane treatment for silica compatibilization can be applied to the sand proppant outer surface. This treatment is followed by coating with an inner polymer layer containing functional additives, such as $Fe_2O_3$ particulates to provide sulfide scavenging. The outer layer coating contains polyacrylamides that are loosely bonded to the first coating. Once downhole, the polyacrylamide is released and collects on the internal surfaces of metal pipes in the well. This formulation can deliver friction reduction in the short term and offer a level of sulfide control over the lifetime of the well until the iron oxide particles were fully exhausted.

Staged Release Coatings. For example, oxygen related corrosion and asphaltene often are more problematic at the beginning of a well life cycle, while bacterial growth occurs later in the well life cycle. A composite coating of three layers can address such delayed developments. The first, innermost, layer can comprise, for example, a biocidal functionality. The second coating layer can comprise, for example, an asphaltene inhibitor, and the third layer can comprise, for example, a loosely bound polyhydroxyl compound as an oxygen scavenger. The outer layer of this proppant can reduce oxygen levels immediately, especially in dead zones/zones of limited flow from the entrance of the well, which can't be flushed with fluids containing oxygen scavengers. As the well begins production, the outer layer can be consumed and erode from the surface to expose the asphaltene-inhibiting layer of a sulfonated alkylphenol polymer that can also erode or dissolve over time. As the well continues to produce, asphaltene issues can lessen, and the remaining innermost coating can slowly release its biocides to ensure continued health of the well. A single, composite provides these extended benefits with less cost and easier logistics than the use of multiple proppants with different functions introduced into the well as a mixture.

Timed Release Coatings. The use of an outer layer made with dissolvable particles and/or dissolvable or erodible polymers can be used to provide a controlled, timed release of functional additives much like an enteric coating of a medicament. Unlike a staged release structure, a timed release coating does not have a second stage of release. Importantly, the coated proppants according to the present disclosure provide for release over time, in situ, and throughout the fractured strata. Exemplary functional additives can include biocides, scale inhibitors, tracers, and sulfide control agents. Suitable water soluble and dissolvable polymers are described in U.S. Pat. No. 7,678,872. Erodible matrix materials include one or more cellulose derivatives, crystalline or noncrystalline forms that are either soluble or insoluble in water.

The time frame for release of an encapsulated ingredient via diffusion can be adjusted and tailored to the need by adjusting the crosslink density of the encapsulating coating. A polymer with little to no crosslinking exhibits a fast-dissolving coating for a short interval before release. Highly crosslinked materials can have a much slower rate of release of soluble ingredients in the coating. If mobility of the chemicals of interest is too low in a crosslinked membrane, dissolvable fillers like salts, organic crystalline solids, etc. can be incorporated in the coating mixture. Once the coated proppant is introduced downhole, the particles can dissolve to leave larger pores, as has been done with filtration membranes as in U.S. Pat. No. 4,177,228 entitled "Method of Production of a Micro-Porous Membrane for Filtration Plants." If lightly crosslinked or a hydrogel, the polymer swells and will allow a controlled diffusion of the encapsulated additives.

Insoluble polymers, such as the thermosets (e.g., alkyds, partially-cured acrylics, phenolics, and epoxies) and the thermoplastics (e.g., polysulfones, polyethers, and polyurethanes) can be used as thin coatings with dissolvable additives. Such coatings are prepared by mixing, e.g., a thermoset polymer with finely divided, dissolvable solids and applying the resulting mixture to the proppant particles. Thermoplastics can be applied by dissolving the thermoplastic polymer in a solvent, mixing in the finely divided, dissolvable solids, and coating the proppants with the mixture. The solvent is then removed with a drying stage, which may be no more than a cross-flowing air stream. The time before release can be adjusted based on the size, shape, and solids concentration.

In some embodiments, the processes described herein provide for the formation of a self-polishing coating that dissolves over time or is eroded as fluid passes over the surface of the coating. Suitable materials for such coatings include acrylate copolymers with hydrolysable silylacrylate functional groups. (See U.S. Pat. No. 6,767,978.) Alkyds, which are polyesters, can also be used as they tend to hydrolyze over time under downhole conditions and thereby impart a delayed-release mechanism through combination of hydrolysis and erosion.

Cellulosic coatings can also provide a timed release coating. Suitable and include, but are not limited to, the hydroxyalkyl cellulose family such as hydroxyethyl methylcellulose and hydroxypropyl methylcellulose (also known as hypromellose). A suitable material is commercially available under the tradename METHOCEL from Dow Chemical. This material is a cellulose ether made from water-soluble methylcellulose and hydroxypropyl methylcellulose polymers. Rheological modification can also be provided from the use of a hydroxyethyl cellulose agent, such as those commercially available under the tradename CELLOSIZE, from Dow Chemical.

Polyamides, which can be hydrolyzed under downhole conditions, can be used as well.

Acid/Base-Resistant Coatings. Chemical attack of a proppant is a concern in hydraulic fracturing. For silica sand, the acid number of a proppant is often used to designate the sand's quality. The test in ISO 13503-2, section 8 describes the specific testing of proppant sand under acid exposure as a way to determine its suitability for specific well conditions. If components or impurities in the sand dissolve or are unstable in acidic environments, the proppant grains will gain porosity and exhibit a lower overall crush resistance. It can, therefore, be desirable to have a coating that could minimize the attack on the silica sand by acids found in downhole groundwaters.

Basic solutions can also dissolve or partially degrade silica proppants and the resin coating on such proppants, especially at a pH of nine or higher. This can cause issues in conductivities of proppant packs placed in fractures, due to weakening of the grains and possible reduction in particle size due to dissolving of outer layer of the particles.

Ceramic proppants can also suffer under highly basic or acidic waters as a result of diagnosis, a phenomenon in which the ceramic dissolves in aqueous solutions under pressure followed by a re-precipitation with other elements present in the fluid. The re-formed solid is unlikely to be as strong or the same size as the original ceramic proppant and can be a significant concern for its effects on conductivity of a ceramic proppant pack.

In some embodiments, the coatings that are applied are acid resistant, base resistant, or both, and can offer new protections for proppants of all types, including, but not limited to, sand and ceramic proppants. Some of the acid-resistant polymers that can be applied include: polypropylene, acrylic polymers, and most fluoropolymers. For increased coverage of the total exterior surface of the proppants, multiple coating applications of the same base polymer might be needed, depending on the equipment and number of dispersion nozzles that are used. The processes described herein can be repeated until the appropriate number of coatings are applied.

Suitable base-resistant polymers include the polyolefins, some fluoropolymers (except that PVDF and FKM are not particularly resistant to strong bases) and many polyurethanes.

Corrosion Inhibitors. Corrosion of metals in downhole applications is a significant problem in the oil and gas industry. Corrosion can occur via either an acid-induced process or via oxidation. Acidic conditions can be caused by acid treatment of the formation, acid or $H_2S$ producing bacteria, or $CO_2$ that can dissolve in water under pressure to form carbonic acid. Oxidation/oxidative corrosion of the metal can occur in the presence of water and oxygen.

Corrosion in downhole applications is often addressed by addition of corrosion inhibitors and/or acid scavengers during drilling, completion, or hydraulic fracturing. The corrosion inhibitor provides a coating to passivate the metal surfaces exposed to the fluids. Passivating layers of small molecules are also applied via addition of these molecules in a treating fluid, followed by use of complexation chemistry to attach the molecules to the metal, e.g., the use of active ligand sites on small organic molecules or polymers to bind to the metal. Acid scavengers are acid-accepting and basic compounds. Periodic washing or flushing with fluids containing such materials after the initial treatment is also a common method to keep corrosion under control.

Oxygen scavengers are used to remove dissolved oxygen from downhole fluids. Once a well is completed, oxygen is not usually a significant problem as it is not normally present in producing formations, but it can be a problem in drilling muds and fracture fluids. Oxygen scavengers are used in these fluids during drilling, fracturing or completion.

Polymeric coatings for the metallic surfaces to prevent corrosion are often used, and applied to the metals prior to their use. Baked resins, or epoxy coatings, are two examples, but other polymers can be used on the metals. Cathodic protection is also used where possible, by placing a more reactive metal near the metal to be protected, and using the more reactive metal to react or oxidize with the chemistries in the fluid, rather than the metals which are desired to be protected. Zinc, aluminum and other metals which are more reactive than iron (Fe) are used for cathodic protection.

Chemicals that can be applied to the solids for corrosion protection include 1-benzylquinolinium chloride (CAS 15619-48-4), acetaldehyde (CAS 57-07-0), ammonium bisulfite (CAS 10192-30-0), benzylideneacetaldehyde (CAS 104-55-2), castor oil (CAS 8001-79-4), copper chloride anhydrous (CAS 7447-39-4), fatty acid esters (CAS 67701-32-0), formamide (CAS 75-12-7), octoxynol 9 (CAS 68412-54-4), potassium acetate (CAS 127-08-2), propargyl alcohol (CAS 107-19-7), propylene glycol butyl ether (CAS 15821-83-7), pyridinium, 1-(phenylmethyl)-(CAS 68909-18-2), tall oil fatty acids (CAS 61790-12-3), tar bases, quinoline derivatives, benzyl chloride-quaternized (CAS 72480-70-7), and triethylphosphate (CAS 78-40-0), or any combination thereof.

Corrosion inhibitors that are solids can be mixed into resin formulations as a filler, then applied to proppants to form a coating that can deliver the corrosion protection directly downhole. The coatings can be designed to deliver corrosion protection immediately, as might be desired for oxygen scavengers during drilling or completion. The coatings can also be tailored for timed release of corrosion, as discussed above. Cathodic protection can be provided by also including one or more metal particles (Zn, Al, and the like) in highly conductive produced waters/brines.

Corrosion inhibitors that are liquids can be introduced into these systems via selection of a polymer proppant coating in which the liquids/organic chemicals are miscible or semi-soluble. Some examples include digycolamines mixed with polyacrylamides, or lightly crosslinked or thermoplastic polyurethanes.

Other polymers, such as 2-vinyl-2-oxyzoline can be used as water soluble polymer fillers that can be encapsulated in a resin coating on proppant particles, and dissolved over time from the coating. The soluble molecules can then passivate metal surfaces, and inhibit acidic corrosion.

Acid scavenging activity can be provided with a flash coating of polymers having acid scavenging attributes. For example, polymers with nitrogen containing heteroatoms such as polyvinylpyridine and polyvinylpyrrolidone, carboxylates, or pendant amines can provide such acid scavenging activity, i.e., nitrogen can interact with acids to form a salt. The scavenging power of these polymers can be related to the concentration of functional groups on the polymer as well as the mobility and accessibility of these groups to react with the produced fluids and remove acidic impurities.

Improvement in Crush Resistance. Water-based dispersions of precured polyurethanes can be mixed with a polyurethane crosslinking agent such as polyaziridine, isocyanate or carbodiimides to generate a hard, crosslinked, coating in low concentration. Variations of the nature and amount of the crosslinking agent, as exists for one of no more than an ordinary level of skill in this art, allow the cure levels of the coating to be adjusted and tailored for more or less hardness, crosslink density, glass transition temperature, and permeation rate. In some embodiments, coating levels per treatment of up to 0.5% or 01-0.3 wt % based on the weight of the proppant can be applied. In some embodiments, multiple coatings are applied to generate thicker coatings, if desired. In some embodiments, the proppant has, or at least, 1, 2, 3, 4, 5, 6, 7, 8, 9, or 10 coatings.

Increased crush resistance ("K values") can be obtained with polyurethane-treated proppant sand relative to its untreated version at even low coating levels. See Table 3 below. Other types of thermoplastic and thermoset polymeric coatings should exhibit similar results.

TABLE 3

K values From Crush Tests, per ISO 13503-2

| PU Coating Weight | Crush test, K value | Improvement over Raw Sand |
| --- | --- | --- |
| 0% (untreated 20/40 sand) | 6 | 0% (control) |
| 0.25% | 7 | 17% |
| 0.25% | 7 | 17% |
| 0.31% | 7 | 17% |
| 0.50% | 10 | 67% |
| 0.53% | 10 | 67% |

Paraffin Inhibitors. Paraffins are long chain hydrocarbons, typically $C_{18}$ to $C_{100}$ or more (18-100 carbons) that often precipitate out of a hydrocarbon solution due to changes in temperature or composition that decrease the solubility of the paraffin in the hydrocarbon fluids. Once precipitated, those paraffins can crystallize to form a waxy buildup.

In some embodiments, paraffin inhibitors can be coated into or onto proppants. Such a coating places the treatment in the fractured strata and at the elevated temperatures found downhole before the paraffins have begun to precipitate or crystallize. By introducing the inhibitors in the fractured strata while the paraffins are still soluble, the treatment can affect the crystallization rate of paraffin as the produced hydrocarbon stream cools and/or mixes with water as it moves towards the surface and consolidates with other frac streams for recovery. Such conditions often result in reduced paraffin solubility and create conditions where paraffin precipitation and crystallization become problematic.

The paraffin inhibitors of the present disclosure can be added as a polymeric coating on the proppants or as released additives. The coated polymers can stay associated with the proppant particles until the proppant was exposed to hydrocarbons whereupon the polymers can dissolve in the hydrocarbon or mixed hydrocarbon/water effluent. Releasable additives contained in timed release or staged release coatings of the types discussed above allow the paraffin inhibitor additives to be released over time via diffusion out of the swelled or dissolving coating or by migration out of a coating whose soluble particulates had left openings for egress of the paraffin additives.

Polymers that can serve as paraffin inhibitors include, e.g., styrene ester copolymers and terpolymers, esters, novalacs, polyalkylated phenol, and fumerate-vinyl acetate copolymers. Tailoring the molecular weight of the inhibitor as well as the lengths of the pendant chains can be used to modify the nature of the inhibition effects. These characteristics affect both the crystallization rate and size distribution of paraffin crystals and thus the pour point of the resulting solutions.

Paraffin pour point can be decreased by adding solvents to a hydrocarbon mixture to increase solubility of paraffin, and thus reduce the crystallization rate and overall crystallite size distribution of the paraffin crystals. These are often copolymers of acrylic esters with allyl ethers, urea and its derivatives, ethylene-vinylacetate backbone with unsaturated dicarboxylic acid imides, dicarboxylic acid amides, and dicarboxylic acid half amides.

Polymers that are useful for paraffin crystal modification include ethylene-vinyl acetate copolymers, acrylate polymers/copolymers, and maleic anhydride copolymers and esters.

Paraffin dispersants work via changing the paraffin crystal surface, causing repulsion of the paraffin particles and thus inhibit formation of larger paraffin agglomerates that could precipitate from suspension in the reservoir fluids. Typical chemistries include olefin sulphonates, polyalkoxylates and amine ethoxylates.

Asphaltene Inhibitors. Asphaltenes are complex polycyclic aromatic compounds, often with heteroatoms and with aliphatic side chains. They are present in many hydrocarbon reserves at concentrations that vary from <1 to 20%. They are soluble in benzene or aromatic solvents but insoluble in low molecular weight alkanes.

Asphaltenes pose similar issues to the paraffins in that they are typically soluble in the pressurized, heated hydrocarbon mixture in a reservoir field, but changes in temperature and pressure during production from that reservoir can cause precipitation or flocculation. Either of these can have the effect of reducing fluid flow or, in the worst case, stopping fluid flow completely. Once the asphaltenes precipitate, the well must be remediated by mechanically scraping or dislodging the deposits through the application of differential pressures or by cleaning with toluene, xylene, or other suitable aromatic solvent. Cleaning is expensive and stops well production during the process so the asphaltene additives carried by treated proppants represent a substantial economic benefit for well owners and operators.

Asphaltene is controlled via use of dispersing additives or inhibitors. Dispersants reduce the particle size of the precipitated asphaltenes and keep them in suspension. Dispersants are often used as frac fluid additives at a point after asphaltene precipitation is likely to occur, i.e., after a pressure drop or temperature drop as the oil moves from the reservoir into the production channels. Dispersants are usually nonpolymeric surfactants. Some asphaltene dispersants that have been used in frac fluids include: very low polarity alkylaromatics; alklarylsulfonic acids; phosphoric esters and phosphonocarboxylic acids; sarcosinates; amphoteric surfactants; ethercarboxlic acids; aminoalkylene carboxylic acids; alkylphenols and their ethoxylates; imidazolines and alkylamine imidazolines; alkylsuccinimides; alkylpyrrolidones; fatty acid amides and their ethoxylates; fatty esters of polyhydric alcohols; ion-pair salts of imines and organic acids; and ionic liquids.

Inhibitors actually prevent the aggregation of asphaltene molecules and prevent precipitation. Asphaltene inhibitors are typically polymers. Common asphaltene inhibitors that have typically been used in frac fluids include: alkylphenol/aldehyde resins and sulfonated variants of these resins; polyolefin esters, amides, or imides with alkyl, alkylene phenyl, or alkylene pyridyl functional groups; alkenyl/vinylpyrolidone copolymers; graft polymers of polyolefins with maleic anhydride or vinylimidazole; hyperbranched polyesterimides; lignosulfonates; and polyalkoxylated asphaltenes.

Polymeric asphaltene inhibitors can be introduced directly as coatings on the proppant particles. They can be applied as coatings that can be released in a controlled fashion either immediately or slowly over time by the timed release and staged release coatings discussed above.

The asphaltene inhibitors can also be used as an additive in a polymeric coating.

Asphaltene dispersants can be used mainly as ingredients/fillers in a coating to be released over time. Their release over time can be controlled with the coatings discussed herein depending on whether an immediate release or timed release dosing is desired. Branched polymers with arms that contain the dispersant functionality can also be used where the branches are connected to the polymer backbone by reactive groups that might degrade over time, such as esters, hydrolysable groups, and the like to release the dispersants over time.

An advantage of using asphaltene control agents directly on proppant particles is that these agents can be released within the formation prior to asphaltene precipitation. Such an in-situ delivery allows effective treatment before development of the problem and in controlled concentrations.

Fines Migration Control. In addition to higher crush resistance and decreased equipment wear from handling, flash coatings of the present disclosure can help control fines migration downhole and thereby help to maintain conductivity.

Fines produced through crushing of the proppant pack can fill a portion of the interparticle porosity, which is directly linked to conductivity. More importantly fines can be mobilized under pressure in downhole conditions during fluid production to cause a great amount of damage, sometimes more than a 75% reduction in conductivity. Therefore, fines migration can be a major problem because its concentration increases as the produced fluids travels along the fracture toward the wellbore. This means the maximum level of fines will be found near where the fracture was initiated. If fines cause excessive damage near the wellbore it can act as a choke to the entire created fracture system. The particulates described herein can avoid or limit this problem.

The effect of fines migration is not obvious in a standard conductivity test, as the test is performed at too low of a flow rate to mobilize fines. Some control over fines migration downhole can be added to proppants by applying to the treated proppants an external tackifier that will capture fines encountered downhole. The coated proppants are then placed in the well during fracturing. This ensures the fines control treatment is accurately placed on the surface of the particles and ensures that the coating penetrates the fracture as deeply as the proppant particles.

Common tackifier resins or resin dispersions that can be used for fines control on a proppant include: a) rosin resins from aged tree stumps (wood rosin), sap (gum rosin), or by-products of the paper making process (tall oil rosin); b) hydrocarbon resins from petroleum based feedstocks either aliphatic ($C_5$), aromatic ($C_9$), dicyclopentadiene, or mixtures of these; and c) terpene resins from wood sources or from citrus fruit.

Removal of Anions/Halogens from Produced Water. Halogens, particularly bromines, can cause issues in produced water due to the reaction with disinfectants to make disinfection by-product compounds. For bromide, a concentration value of 0.1 mg/L poses a risk for unintended by-product production. These by-products can also be potential carcinogens. For example, some by-product compounds have toxicologic characteristics of human carcinogens, four which are already regulated, e.g., bromodichloromethane, dichloroacetic acid, dibromoacetic acid, and bromate.

The removal of bromines can occur in the context of the present disclosure by adding anion exchange resins into or onto a resin coating on a proppant. Such exchange resins can be added during application of a flash coating as described herein or at the end thereof as the coating dries for adhesive-type incorporation into the coated surface.

The processes and compositions described herein are well-suited to the treatment of a variety of proppant solids in a context other than a formal resin-coating operation or facility. As such, the process can be used to apply, for example, a dust suppressing, treatment agent as an uncured coating over at least a portion, such as a large portion, of the proppant solids within the bulk mixture. Such a treatment process affords the possibility that the process can be used to provide the proppant solids with additional properties without the need for a formal, manufacturing facility-based coating process. Such types of additional functionalities are described in our co-pending U.S. patent application Ser. No. 10/872,532 entitled "Dual Function Proppants", now U.S. Pat. No. 8,763,700, the disclosure of which is hereby incorporated by reference. Such additional materials can include, e.g., pigments, tints, dyes, and fillers in an amount to provide visible coloration in the coatings. Other materials can include, but are not limited to, reaction enhancers or catalysts, crosslinking agents, optical brighteners, propylene carbonates, coloring agents, fluorescent agents, whitening agents, UV absorbers, hindered amine light stabilizers, defoaming agents, processing aids, mica, talc, nano-fillers, impact modifiers, and lubricants. Other additives can also include, for example, solvents, softeners, surface-active agents, molecular sieves for removing the reaction water, thinners and/or adhesion agents can be used. The additives can be present in an amount of about 15 weight percent or less. In one embodiment, the additive is present in an amount of about 0.005-5 percent by weight of the coating composition. The processes described herein can also be used to add other functionalities as described herein.

The proppants described herein can be used in a gas or oil well. For example, the proppants can be used in a fractured subterranean stratum to prop open the fractures as well as use the properties of the proppant in the process of producing the oil and/or gas from the well. In some embodiments, the proppants are contacted with the fractured subterranean stratum. The proppants can be contacted with the fractured subterranean stratum using any traditional methods for introducing proppants and/or sand into a gas/oil well. In some embodiments, a method of introducing a proppant into a gas and/or oil well is provided. In some embodiments, the method comprises placing the proppants into the well. In some embodiments, the well is a well that has already been fractured. Therefore, in some embodiments, methods of refracking a well are provided. In some embodiments, the method comprises contacting (injecting) coated particulates into a well that has been previously fractured and has coated particulates (proppants) are in the fractured subterranean stratum. In some embodiments, the coated particulates that are injected are the particulates described herein comprising a coating comprising the compatibilizing agent and the hydrophobic polymer. In some embodiments, the method comprises contacting a fractured subterranean stratum comprising proppants with a coated particulate, wherein the coated particulate comprises a particulate core with a compatibilizing agent and a hydrophobic polymer coating the particulate core, wherein a portion of the hydrophobic polymer is exposed to provide an exposed hydrophobic surface of the coated particulate. In some embodiments, the method comprises extracting oil and/or gas from the refractured subterranean stratum. The methods for extracting the oil and/or gas can be any method suitable to extract such oil and gas.

In some embodiments, the particulates are injected with a gas or a gas is injected after the particulates are contacted with the subterranean stratum. In some embodiments, the gas is nitrogen, air, or carbon dioxide. As described herein for any of the methods, the subterranean stratum can be fractured and can optionally already have proppants present in the fractured subterranean stratum. In some embodiments, the gas is a mixture of gases. In some embodiments, the gas or mixture of gasses is a nonpolar gas or a mixture of nonpolar gases. In some embodiments, the gas or mixture of gases is nitrogen, air, carbon dioxide, or any combination thereof. In some embodiments, the gas results in bubble formation on the hydrophobic surface of the proppant. The bubble formation can enhance the transport of the coated particulates in the subterranean stratum.

The coated particulate cores described herein can also be used to increase oil mobility out of a fractured subterranean stratum. Accordingly, in some embodiments, method of increasing oil mobility out of a fractured subterranean stratum are provided. In some embodiments, the method comprises injecting into a fractured subterranean stratum a coated particulate comprising a particulate core with a compatibilizing agent and a hydrophobic polymer coating the particulate core, wherein a portion of the hydrophobic polymer is exposed to provide an exposed hydrophobic surface of the coated particulate; and extracting the oil and/or gas from the fractured subterranean stratum with increased. In some embodiments, the coated particulate cores are those as described herein.

As described herein, particulate cores coated with certain coatings can have reduced dust production. Thus, in some embodiments, methods of extracting oil and/or gas from a subterranean stratum with reduced dust production are provided. In some embodiments, the methods comprise injecting into the subterranean stratum a coated particulate comprising a particulate core with a compatibilizing agent and a hydrophobic polymer coating the particulate core, wherein a portion of the hydrophobic polymer is exposed to provide an exposed hydrophobic surface of the coated particulate; and extracting the oil and/or gas from the subterranean stratum, wherein an amount of dust produced is less as compared to an uncoated particulate. In some embodiments, the coated particulate cores are those as described herein.

The following examples are not to be limiting and are only some of the embodiments encompassed by the presently disclosed subject matter.

EXAMPLES

Example 1

Coated Sands

Coated sands were made according to the embodiments described herein. The coated sands have significantly improved properties that will lead to enhanced transport as well as self-suspending properties. For example, the coated sand is found to be able to be suspended water. (Data not shown). The hydrophobic coated sand also led to larger volume and increased pack height. Therefore, the coated sands can be used to provide for increased pack volumes and/or heights in subterranean structure that has been fractured. Illustrations of these properties can be found in FIGS. 13-16 of U.S. Provisional Application No. 62/160,786, filed May 13, 2015, 62/197,916, filed Jul. 28, 2015, 62/220,373, filed Sep. 18, 2015 and/or 62/237,182, filed Oct. 5, 2015, each of which is hereby incorporated by reference in its entirety.

A non-limiting example of how such sand was made is provided here. Dry 20/40 mesh sand (2000 g) is heated to between 180 F and 190 F. Into a syringe, 2.0 g of triethoxy (octyl)silane is weighed; into a second syringe 5.0 g of Evonik VESTOPLAST® W-1750 (amorphous poly-alpha-olefins dispersion) is weighed; into a third syringe 2.0 g of Chembetaine™ CAS is weighed. The hot sand is transferred to the three liter bowl of a Kitchen Aide Professional 600 mixer having the spade shaped blade, and the sand is maintained at 170 F in the center. The mixer is started at a speed setting of "5" and stirring is maintained during additions. Over 20 seconds the 2.0 g of triethoxy(octyl) silane is added and the mixture is allowed to stir for another 20 seconds. Over the next 30 seconds, the VESTOPLAST® W-1750 (amorphous poly-alpha-olefins dispersion) is added and the system is allowed to stir for another 60 seconds. Over the next 20 seconds the Chembetaine™ CAS is added and the system is allowed to stir for another 30 seconds. The mixer is turned off and the sand is allowed to cool.

A 41 mm diameter by 610 mm long glass column having a fritted glass media support, and a ¼" opening screen mounted 6 cm above the frit, is equipped with a controlled feed of water and sparged air from the bottom. The column is filled with tap water and flow of both water and air is stopped. Into the column is poured 50.0 g of sand. Within 2 minutes the water flow was started at 400 ccm. After another 30 seconds, the air flow was started at 60 sccm. After 10 minutes air flow was increased to 120 SCCM. Movement of the sand was monitored by video. The treated sand did not move with water alone, after 4 minutes of air flow at 120 sccm, essentially all of the sand had moved out the top of the column. Illustrations of these properties can be found in FIG. 17 of U.S. Provisional Application No. 62/160,786, filed May 13, 2015, 62/197,916, filed Jul. 28, 2015, 62/220,373, filed Sep. 18, 2015 and/or 62/237,182, filed Oct. 5, 2015, each of which is hereby incorporated by reference in its entirety.

Example 2

Coated Sands

Dry 20/40 mesh sand (2000 g) is heated to between 250 F and 270 F. Into a syringe, 2.0 g of an Example 6 emulsion containing alkylethoxylates and acrylamide is weighed; into a second syringe 5.0 g of Evonik VESTOPLAST® W-1750 (amorphous poly-alpha-olefins dispersion) is weighed. The hot sand is transferred to the three liter bowl of a Kitchen Aide Professional 600 mixer having the spade shaped blade, and the sand is maintained at 250 F in the center. The mixer is started at a speed setting of "5" and stirring is maintained during additions. Over 20 seconds the 2.0 g of alkylethoxylates and acrylamide is added and the mixture is allowed to stir for another 20 seconds. Over the next 30 seconds, the VESTOPLAST® W-1750 (amorphous poly-alpha-olefins dispersion) is added and the system is allowed to stir for another 110 seconds. The mixer is turned off and the sand is allowed to cool.

A 50.0 g sample of the treated sand was placed in the column described in Example 1. After one minute the water flow was started at 400 ccm. After another 30 seconds the air flow was started at 60 sccm and maintained through the test. Within one minute the sand was rising up the column and within four minutes only a small amount of sand remained at the bottom of the column. This demonstrates the unexpected properties of these sands. Illustrations of these properties can be found in FIG. 18 of U.S. Provisional Application No. 62/160,786, filed May 13, 2015, 62/197,916, filed Jul. 28, 2015, 62/220,373, filed Sep. 18, 2015 and/or 62/237, 182, filed Oct. 5, 2015, each of which is hereby incorporated by reference in its entirety.

Example 3

Coated Sands

Dry 20/40 mesh sand (2000 g) was heated to between 250 F and 270 F. Into a syringe, 5.0 g of Evonik VESTOPLAST® W-1750 (amorphous poly-alpha-olefins dispersion) was weighed; into a second syringe 2.0 g of CHEMBETAINE™ CAS (cocamidopropyl hydroxysultaine) was weighed. The hot sand was transferred to the three liter bowl of a Kitchen Aide Professional 600 mixer having the spade shaped blade; the sand temperature was 248 F in the center. The mixer was started at a speed setting of "5" and stirring is maintained during additions. The sand was treated with the cocamidopropyl hydroxysultaine and the VESTOPLAST® W-1750 (amorphous poly-alpha-olefins dispersion). The mixer was turned off and the sand was allowed to cool.

A 50.0 g sample of the treated sand was placed in the column described in Example 1. After one minute the water flow was started at 400 ccm. After another 30 seconds the air flow was started at 120 sccm and maintained throughout the test. The sand did not snake (i.e. does not form large blocks of continuous phase of sand) when added to the water. Most of the sand moved to the top of the column within one minute. Illustrations of these properties can be found in FIG. 19 of U.S. Provisional Application No. 62/160,786, filed May 13, 2015, 62/197,916, filed Jul. 28, 2015, 62/220,373, filed Sep. 18, 2015 and/or 62/237,182, filed Oct. 5, 2015, each of which is hereby incorporated by reference in its entirety.

Example 4

Coated Sands

Using the method in Example 1, except using 40/70 mesh sand in place of the 20/40 sand, treated sand was prepared. A 50.0 g sample of the treated sand was placed in the column described in Example 1. After one minute the water flow was started at 400 ccm. After another 30 seconds the air flow was started at 60 sccm and maintained through the test. Within one minute the sand was rising up the column and within four minutes only a small amount of sand remained at the bottom of the column. Thus, the coating can also be used on different sizes of sand. Illustrations of these properties can be found in FIG. 20 of U.S. Provisional Application No. 62/160,786, filed May 13, 2015, 62/197,916, filed Jul. 28, 2015, 62/220,373, filed Sep. 18, 2015 and/or 62/237,182, filed Oct. 5, 2015, each of which is hereby incorporated by reference in its entirety.

Example 5

Coated Sands

Using the method in Example 2, except using 40/70 mesh sand in place of the 20/40 sand, treated sand was prepared. A 50.0 g sample of the treated sand was placed in the column described in Example 1. After one minute the water flow was started at 400 ccm. After another 30 seconds the air flow was started at 60 sccm and maintained through the test. Within four minutes only a small amount of sand remained at the bottom of the column. Thus, the coating can also be used on different sizes of sand. Illustrations of these properties can be found in FIG. 21 of U.S. Provisional Application No. 62/160,786, filed May 13, 2015, 62/197,916, filed Jul. 28, 2015, 62/220,373, filed Sep. 18, 2015 and/or 62/237,182, filed Oct. 5, 2015, each of which is hereby incorporated by reference in its entirety.

Example 6

Coated Sands

Performance of the proppant sand was demonstrated in a slot test apparatus, i.e. an apparatus which is designed to simulate sand transfer in a well bore by recirculating sand/ water/air slurry through a container having restricted flow at each end. Behavior of the sand was observed through the clear walls of the test bed. The apparatus contained 30 gallons in the test bed, was 1 ft×8 ft long and had a restriction slot with a gap of 0.315 in. The inlet slot had only the middle perforation open. The exit was open for the full size of the slot width.

For operation: the flow was set at 15 gal/min; friction reducer (when used) was added at 1 gpt; nitrogen was injected into the system at 15 vol %; proppant was added at 1 pound per gallon of fluid to the reservoir while the fluid was circulating. After a set period, the shape of any deposited sand dunes is observed through the window and these dunes are used to is characterized the sand flow.

The characteristic dunes for samples tested in water without friction reducer and the sand was found to float as compared to untreated sand, which builds dunes from the bottom. Illustrations of these properties can be found in FIG. 23 of U.S. Provisional Application No. 62/160,786, filed May 13, 2015, 62/197,916, filed Jul. 28, 2015, 62/220,373, filed Sep. 18, 2015 and/or 62/237,182, filed Oct. 5, 2015, each of which is hereby incorporated by reference in its entirety.

The characteristic dunes for samples were tested in water containing friction reducer (slick water). Relative to untreated sand, the dunes were lower for sand prepared as in Example 4 and Example 5, indicating that less treated sand is being deposited during transport. This increased transport can be quantified by the gap above the dune; larger gaps indicate better transport of sand. The treated sand performed better. Illustrations of these properties can be found in FIG. 24 of U.S. Provisional Application No. 62/160,786, filed May 13, 2015, 62/197,916, filed Jul. 28, 2015, 62/220,373, filed Sep. 18, 2015 and/or 62/237,182, filed Oct. 5, 2015, each of which is hereby incorporated by reference in its entirety.

The gaps for proppants are given in the table below. The increase in gap with the treated proppants shows a significant improvement in sand transport for hydrophobically treated sand vs. untreated sand. This is also illustrated in FIG. 25 U.S. Provisional Application No. 62/237,182, filed Oct. 5, 2015 which is hereby incorporated by reference in its entirety.

Dune Formation for Proppants in Slot Test

| Test | Formula | N2 feed | Fluid | Bed height (cm) | Gap (cm) | Gap increase, % | Comments |
|---|---|---|---|---|---|---|---|
| 9 | Untreated 40/70 sand | none | Tap water | 23 | 7 | | CONTROL |
| 10 | Untreated 40/70 sand | N2 | Slick water | 21 | 9 | | CONTROL |
| 11 | Example 4 | N2 | Tap water | 14 | 16 | 78% | Bed built from top down |
| 12 | Example 4 | N2 | Slick water | 15 | 15 | 67% | |
| 13 | Example 5 | N2 | Tap water | 16 | 14 | 56% | |
| 14 | Example 5 | N2 | Slick water | 13 | 17 | 89% | |
| 15 | Example 4 | N2 | Tap water | 14 | −16 | 78% | Bed built from top down |

Example 7

Effect on Dust Control

Particulates coated with the hydrophobic coatings described herein were tested to evaluate the reduction in fugitive dust that might be afforded by the coatings. A lab scale pneumatic sand handler was used to perform tests on approximately 50 lb of sand. The equipment contained a compressed air source (house air) applied at approximately 100 psi, and a flow of approximately 150 SCFM (standard cubic feet per minute), which equates to a linear sand velocity of 100 ft/second. The test equipment was configured to measure dust generation.

Samples were blown through the device and collected in a bucket in a contained enclosure. A Dusttrax DRX8533 was used to measure airborne particulates to estimate dust levels. It was found that untreated sand was above the maximum reading level of 150 mg/m$^3$. The results demonstrated that the hydrophobic coatings were effective to reduce dust produced by the sand.

Example 8

Hydrophobic Coating increases oil mobility

Particulates coated with a hydrophobic coating as described herein were tested for the ability to increase oil mobility out of a proppant pack. It was found that the effect of the hydrophobic coating on the proppant (coated particulate) improves oil mobility out of a proppant pack in a hydraulically fractured, propped well. Since sand is hydrophilic, it is sometimes difficult to displace the water from the proppant pack by oil, especially if the reservoir is depleted or has a lower producing pressure (pressure of the oil flowing out of the well). In order to test the effect on oil, mobility was tested. Packed columns of approximately 1.5 kg of sand in a 1 meter glass column with a fritted glass bottom were prepared. Water was loaded to fill the interparticle porosity. Oil was then loaded into the column, and the time for the oil to pass through the packed column was recorded. The results (shown below) demonstrate that a hydrophobic coated particulate increases oil mobility. Specifically, it was found that a triethoxyoctylsilane compatibilizing agent and a hydrophobic polymer (Example 4) and the alkoxylated alcohol/acrylate compatibilizing agent and a hydrophobic polymer (Example 5) resulted in a significant increase in oil mobility over untreated sand. Example 4 led to an increase of about 297% and Example 5 led to an increase of about 74% as compared to untreated sand.

Example 9

Carbon Dioxide gas in combination with a hydrophobic coated particle enhances transport In some cases carbon dioxide is a fluid used for energizing fluids in oil and gas processes. The coating embodied herein also shows increased buoyancy when $CO_2$ is used as the gas, rather than air or nitrogen. It was found that $CO_2$ can be used successfully as an alternate gas. The test was run a column with the coated sand described in Examples 4 and 5 in tap water at 400 ccm; Carbon dioxide at 120 SCCM. The results demonstrated that the combination of $CO_2$ and hydrophobic combination enhanced transport.

Example 10

Effectiveness of hydrophobic coated proppants in brine solutions

It is desirable to be able to reuse produced water for future hydraulic fracturing jobs at the same locations. Often these produced waters have high concentrations of salt in them. High salt content can interfere with self-suspending proppant technology that uses absorbed acrylamide as the primary mode of enhanced transport. It was evaluated whether proppants coated with the hydrophobic coatings are still effective in brine solutions. In order to test effectiveness in brine solutions, a 2% (wt/wt) KCl solution (10,000 ppm K) was prepared. A static column test was run where the column was filled with the 2% KCl solution and a 13% nitrogen (vol/vol) flow rate. A sample of the coated sand described in Example 4 was tested. It was found that the hydrophobic coated sand is still effective in a brine solution (data not shown). The transport in brine was found to be similar to that in tap water.

Example 11

Hydrophobic coated particulate cores with anti-freezing properties

It has been found during application of aqueous based coatings on proppants that when products are prepared during the winter, or at times where temperatures are below freezing, that the water used to prepare coating emulsions can freeze. This results in issues related to unloading of sand from trucks or railcars, as these often have hatches on the bottom that are opened to remove the sand via gravity. In these situations, water may migrate to the bottoms of the containers during transport (which may take several days to several weeks to transport from a plant or terminal to the wellsite). The water then freezes the hatches shut. To mitigate this issue, the hydrophobic coating is applied with a antifreeze agent. It is found that the freezing point of the proppant pack is reduced by the addition of the anti-freezing agent and the proppants loaded into a truck or railcar do not freeze. The anti-freeze agent can be ethylene glycol, propylene glycol, ethanol or a combination thereof.

Example 12

Labelling of hydrophobic coated particulate

Due to the very low levels of coating applied for certain treatments (0.1 to 0.5% solids applied to sand), it can be difficult to differentiate between coated sand and uncoated sand by visual inspection. It can also be difficult to judge the coating efficiency of a coating process when one cannot accurately measure coating thicknesses or coverage areas. Therefore, a particle is coated with a hydrophobic coating as described in Example 4 and 5, except that a fluorescent dye is added to the formulation. It is found that the fluorescent enables the user to differentiate between coated and uncoated proppant particles as well as determine the efficiency of the coating process.

Example 13

Curing of Hydrophobic Coating

An example of a polybutadiene coating cured by Fenton's Chemistry is given in the table below. A mixture of a polybutadiene polymer, ferrous sulfate, and hydrogen peroxide was prepared at room temperature, and within 5 minutes, added to 2 kg of 40/70 sand at 250 F. After stirring for 2 minutes the product was allowed to cool. On evaluating performance of the product in a flotation column, the sand transport was 82% greater than the uncrosslinked control. Accordingly, the chemistry is suitable for preparing a hydrophobic coated sand.

| Sample ID | polybutadiene | AIBN | Potassium persulfate (g) | $Fe(II)SO_4$, $7H_2O$ (g) | Hydrogen Peroxide- 30% (mL) | Water- Diluent (g) | Relative Flotation Efficiency |
|---|---|---|---|---|---|---|---|
| Control | 5.00 | | | | | | 100% |
| Persulfate | 5.00 | | 0.15 | | | 3 | 241% |
| AIBN | 5.00 | 0.25 | | | | | 200% |
| Fentons Chemistry | 5.00 | | | 0.03 | 0.15 | | 182% |

Improvement of hydrophobicity of polybutadiene polymer by addition of curing agents

Example 14

Persulfate Cured Hydrophobic Coating

A mixture of a polybutadiene polymer, 0.15 grams of potassium persulfate in 3 ml water was prepared at room temperature, and within 5 minutes, added to 2 kg of 40/70 sand at 250 F. After stirring for 2 minutes the coated sand product was allowed to cool. When potassium persulfate was evaluated as a curing agent, as shown in the table in Example 13, flotation transport of sand coated with a persulfate crosslinked polybutadiene was 141% higher than the control. Accordingly, a persulfate cured hydrophobic coating can be used to prepare a hydrophobic coated sand or particle.

While the coating can be performed at 250 F as above, a similar polybutadiene emulsion coating can also be applied at 170 F, producing similar improvement in hydrophobicity when curing agents are added. For example, a polybutadiene polymer (5.0 g) and potassium persulfate (0.5 g dissolved in 3.0 g water before mixing with the emulsion) were added to 40/70 sand (2 kg) at 170 F, and mixed for two minutes. On evaluating performance of the product in a flotation column, the sand transport was 81% greater than the uncrosslinked control for 170 F application of the coating. Thus, the temperature can be varied to achieve results, that would not be expected, allowing for more moderate temperatures to be used.

Example 15

AIBN cured hydrophobic coating

A mixture of a polybutadiene polymer, 0.15 grams of 0.25 grams of azobisisobutylnitrile (AIBN) was prepared at room temperature, and within 5 minutes, added to 2 kg of 40/70 sand at 250 F. After stirring for 2 minutes the coated sand product was allowed to cool. When AIBN was evaluated as a curing agent, as shown in the above table, flotation transport of sand coated with an AIBN crosslinked polybutadiene was 200% higher than the control.

Example 16

Crosslinked polyalphaolefins form a hydrophobic coated particulate maintains or improves the transport/flotation efficiency, while enhancing the durability of the coating A 1.53 g portion of 6.67% AIBN in acetone was added to 10.00 g of VESTOPLAST® W-1750 (amorphous poly-alpha-olefins dispersion). The mixture was stirred for 3 minutes maintaining a stable emulsion, and then within 10 minutes, 5.75 g of this mixture was added to 2.00 kg of 40/70 sand at 250 F, stirring in a KitchenAide mixer (5.75 g mixture delivers 5.0 g of VESTOPLAST® W-1750 (amorphous poly-alpha-olefins dispersion)). After two minutes of stirring following completion of the additions, the product was allowed to cool. A 1.50 g portion of 6.67% dicumyl peroxide in acetone was added to 10.00 g of VESTOPLAST® W-1750 (amorphous poly-alpha-olefins dispersion). The mixture was stirred for 3 minutes maintaining a stable emulsion, then within 10 minutes, 5.75 g of this mixture was added to 2.00 kg of 40/70 sand at 250 F, stirring in a KitchenAide mixer. After two minutes of stirring following completion of the additions, the product was allowed to cool. A 3.00 g portion of 1.44% ferrous sulfate heptahydrate in water was added to 2.00 kg of 40/70 sand at 250 F stirred in a KitchenAide mixer, immediately followed by addition of a mixture containing 5.00 g of VESTOPLAST® W-1750 (amorphous poly-alpha-olefins dispersion) and 0.162 g of 30% hydrogen peroxide. After two minutes of stirring following completion of the additions, the product was allowed to cool. The products were evaluated for hydrophobicity in a flotation column, as summarized in the table below. The data demonstrates that the additional cross-linking maintains or improves the transport/flotation efficiency, while enhancing the durability of the coating.

| Sample | Sample | Relative flotation Efficiency in 0.05% FR-50 (%) |
|---|---|---|
| control | Control (W1750 preparation) | 100 |
| 1 | Control + AIBN | 164 |
| 2 | Control + dicumyl peroxide | 91 |
| 3 | Control + Fenton's Reagent | 109 |

Example 17

Sand was placed in a mixer and allowed to mix for about 5 seconds

An alkoxylated alcohol/acrylic polymer mixture was added in a ratio of about 1:1000 (alkoxylated alcohol/acrylic polymer mixture:sand) and allowed to mix for about 15 seconds after the entire mixture was added to the sand. Subsequently, an amorphous polyalphaolefin (e.g. VESTOPLAST® W-1750 (amorphous poly-alpha-olefins dispersion)) was added to the mixture and allowed to mix for an additional 20 seconds. The amorphous polyalphaolefin was added in a ratio of about 1.25:1000 (polyalphaolefin:sand). A second amount of the same amorphous polyalphaolefin was mixed in a ratio of about 1.25:1000 (polyalphaolefin:sand) and allowed to mix for about 50 seconds. The coated sand was discharged from the mixer and was ready to use for any purpose, such as extraction of oil and gas. The sand was found to be hydrophobic and it enhanced the transport of oil and/or gas out of a well according to the methods described herein.

Example 18

Hydrophobic coated sand can withstand increased pressure

Sand coated according to Example 17, was resistant to pressures up to 10,000-12,000 psi with fines being less than 10% of the starting amount at such pressures. These results demonstrate that the coating does not negatively affect crush resistance and performance. These tests were performed according to the standard crush test (ISO 13503-2).

Example 19

Hydrophobic coated sand enhances the effects of friction reducer

Hydrophobic coating technology was designed to aid proppant transport. An important component of the hydrophobic coating is its compatibility with "slick water" friction reducers, which decrease friction pressure encountered when the frac slurry is pumped through the treating string.

This friction pressure is a key contributor to the surface treating pressure that pumping equipment must sustain during the fracturing treatment. The ability of the coated sand to improve proppant transport can be observed by performing "frac model" tests to measure settled proppant volume. To determine whether the hydrophobic coated stand of Example 17 affects a friction reducer's ability to reduce friction pressure encountered when pumping the frac slurry down the treating string, a series of friction loop tests were performed.

The test is performed as follows. The measurement system consists of a 57 ft loop made of ½" 316 stainless steel tubing (ID=0.43", a moyno-type pump, mixing/addition vessel, liquid flow meter and two pressure transducers; The system was filled with 9 gallons of base water and a flow rate of 10 gallons per minute (gpm) was established. The baseline differential pressure (dP) vs. flow rate was measured. Standard polyacrylamide friction reducer was added at a concentration of 0.5 gal/1000 gal and mixed for one minute and allowed to hydrate. In the second and third test where untreated sand or hydrophobic coated sand were introduced, the slurry (containing the friction reducer) was held in the mixing tank while the untreated sand or hydrophobic coated was added at a concentration of 0.5 lb/gal and then the slurry was diverted to the frac model. Nitrogen (in gas form) was introduced to the slurry downstream of the pump but before entering the frac model at a rate of 6.66 gpm to reach an $N_2$ concentration level of 25% by volume. The flow rate was increased to 20 gpm for approximately 5 minutes, and then the flow rate was decreased to 10 gpm for approximately 1 minute before clean up.

In "Test 1," to establish a friction reducer performance baseline, neither hydrophobic coated sand nor untreated sand were introduced. The results demonstrated that the friction reducer maintained significant shear stability, even when the pumping rate was increased to 20 gpm. The measured friction reduction properties remained relatively constant at +70% as the flow rate increased from 10 gpm to 20 gpm.

A second test ("Test 2") followed the same basic procedure as Test 1, with the modification that during the one minute hydration of the friction reducer, untreated sand was added until a concentration of 0.5 lb./gal was reached. The results demonstrated that the addition of a relatively small amount of sand could have a significantly negative impact on friction reducer performance. As the pump rate increased to 20 gpm, the measured friction reduction reached 72%, which is virtually the same level as was noted in Test 1 performed without untreated sand. Unlike the previous test, however, as the test continued friction reducer performance substantially decreased. At test conclusion, the measured friction reduction decreased to 46%, a 24% decrease from Test 1 performed without untreated sand.

A third test ("Test 3") followed the same basic procedure as Test 1, with the modification that during the one minute hydration of the friction reducer the coated sand of Example 17 (rather than untreated sand) was added until a concentration of 0.5 lb./gal was reached. The results demonstrate that the addition of the hydrophobic coated sand had a substantially positive impact on friction reducer performance when compared to untreated sand. As the pump rate increased to 20 gpm, the measured friction reduction reached 73%, which is virtually the same level as Test 1 (no proppant) and Test 2(untreated sand). At test conclusion, the measured friction reduction had decreased to only 62%, which is a 35% improvement over Test 2 (untreated sand).

Accordingly, the tests documented improved friction reducer performance with the hydrophobic coated sand.

Untreated sand had a significantly negative effect on friction reducer performance. The addition of untreated sand decreased friction reducer performance by almost 40%. The substitution of the hydrophobic coated sand for untreated sand, however, improved friction reducer performance by approximately 35%. Without being bound to any particular theory, normally there are two basic causes of friction reducer performance loss: (i) the friction reducer shear degrading over time or (ii) an insufficient amount of available friction reducer. Here, because the friction reducer concentration was constant throughout each of the three tests, either the presence of uncoated sand accelerated shearing or the friction reducer itself is negatively impacted by the presence of untreated sand. Prior test results widely available in the industry demonstrate friction reduction polymer plating out on the surface of sand grains, which can translate to less polymer in the solution to maintain friction reduction performance.

In our tests, the results show that hydrophobic coated sand improves friction reducer performance compared to untreated sand. Without being bound to any particular theory, there are at least two theories that support the results. First, if the loss in friction reduction performance is caused by polymer plating out on the sand, the hydrophobic coating could be hindering polymer plating, ultimately resulting in more friction reducer remaining in solution to help maintain friction reduction performance. Alternatively, if the loss in friction reduction performance is caused by added shear, then the hydrophobic coating could be reducing shear by reducing abrasion in the slurry as a result of the dust reduction properties of the hydrophobic coating. Regardless of the reason, the results demonstrate the superiority and benefits of the hydrophobic coatings described herein.

Example 20

Hydrophobic coated proppants increase well production

Hydrophobic coated sand prepared according to Example 17 was used to extract hydrocarbons from 2 wells in the United States after being stimulated by a multi-stage fracturing treatment. Both wells had significantly higher initial production after 30 days evaluation. The estimated ultimate recovery (EUR) was evaluated to be 2.5 times greater than the average EUR of the wells in the area and 1.6 times greater than second best well in the same area. Thus, it was found that the hydrophobic coated sands increases well production by a significant amount, which was unexpected. The coated sand also led to other advantages besides increased production. It was also found that one was able to pump proppants at a concentration of 6 PPG of 30/50 hydrophobic coated proppants with low viscosity slickwater fluid at a rate of 95-100 BPM, which is impossible to achieve with untreated sand in a slickwater treatment system at similar bottomhole conditions and would not have been predicted to be possible with prior proppants, coated or uncoated. The proppants had also been pumped in with nitrogen gas at a concentration of about 3-4%. Thus, these experiments demonstrated that the hydrophobic coated proppants lead to significant savings on pumping time due to their properties, which also means less water is needed and fewer chemicals (i.e., less biocide) are needed to extract oil and gas out via hydraulic fracturing treatments. These results were surprising, unexpected, and not the result of routine optimization.

Example 21

Preparation of Hydrophobic Coated Sand

Sand was placed in a mixer and allowed to mix for about 5 seconds. An alkoxylated alcohol/acrylic polymer mixture was added in a ratio of about 1:1000 (alkoxylated alcohol/acrylic polymer mixture:sand) and allowed to mix for about 10-15 seconds after the entire mixture was added to the sand. Subsequently, fumed silica (CAB-O-SPERSE PG022) was added to the mixture in a ratio of about 1:1000 to 1.25:1000 (fumed silica:sand) and allowed to mix for about 10-20 seconds after the entire mixture was added to the sand. With the fumed silica, an amorphous polyalphaolefin (e.g. VESTOPLAST® W-1750 (amorphous poly-alpha-olefins dispersion)) was added to the mixture and allowed to mix. The amorphous polyalphaolefin was added in a ratio of about 1:400 (polyalphaolefin:sand). The mixer continued to mix for about another 30 seconds and then coated sand was discharged from the mixer. The mixing was done at a temperature of about 250° F. The sand was preheated. The coated sand was discharged from the mixer and was ready to use for any purpose, such as extraction of oil and gas. The sand was found to be hydrophobic and it enhanced the transport of oil and/or gas out of a well according to the methods described herein.

Example 22

Preparation of Hydrophobic Coated Sand

Sand was placed in a mixer and allowed to mix for about 5 seconds. An alkoxylated alcohol/acrylic polymer mixture was added in a ratio of about 0.7:1000 (alkoxylated alcohol/acrylic polymer mixture:sand) and allowed to mix for about 10 seconds. Subsequently, fumed silica (CAB-O-SPERSE PG022) was added to the mixture in a ratio of about 0.9:1000 (fumed silica:sand) and allowed to mix for about 10-20 seconds. With the fumed silica, an amorphous polyalphaolefin (e.g. VESTOPLAST® W-1750 (amorphous poly-alpha-olefins dispersion)) was added to the mixture and allowed to mix. The amorphous polyalphaolefin was added in a ratio of about 1:500 (polyalphaolefin:sand). The mixer continued to mix for about another 15-20 seconds and then coated sand was discharged from the mixer. The mixing was done at a temperature of about 250° F. The sand was preheated as described herein. The coated sand was discharged from the mixer and was ready to use for any purpose, such as extraction of oil and gas. The sand was found to be hydrophobic and it enhanced the transport of oil and/or gas out of a well according to the methods described herein.

Example 23

Preparation of Hydrophobic Coated Sand

Sand was placed in a mixer and allowed to mix for about 5 seconds. Subsequently, fumed silica (CAB-O-SPERSE PG022) was added to the mixture in a ratio of about 1:500 (fumed silica:sand) and allowed to mix for about 5-35 seconds. Simultaneously, polybutadiene (e.g. POLYVEST 58) was added to the mixture and allowed to mix for about 5-45 seconds. The polybutadiene was added in a ratio of about 1.25:500 (polybutadiene:sand). The mixer continued to mix for about another 40-105 seconds and then coated sand was discharged from the mixer. The mixing was done at a temperature of about 75° F. The sand can be preheated or not. The coated sand was discharged from the mixer and was ready to use for any purpose, such as extraction of oil and gas. The sand is expected enhance the transport of oil and/or gas out of a well according to the methods described herein.

The examples described herein demonstrate that a particulate coated with the coatings described herein have surprising and unexpected properties and lead to a significant improvement in sand transport that could not have been predicted.

This description is not limited to the particular processes, compositions, or methodologies described, as these may vary. The terminology used in the description is for the purpose of describing the particular versions or embodiments only, and it is not intended to limit the scope of the embodiments described herein. Unless defined otherwise, all technical and scientific terms used herein have the same meanings as commonly understood by one of ordinary skill in the art. In some cases, terms with commonly understood meanings are defined herein for clarity and/or for ready reference, and the inclusion of such definitions herein should not necessarily be construed to represent a substantial difference over what is generally understood in the art. However, in case of conflict, the patent specification, including definitions, will prevail.

It must also be noted that as used herein and in the appended claims, the singular forms "a", "an", and "the" include plural reference unless the context clearly dictates otherwise.

As used in this document, terms "comprise," "have," and "include" and their conjugates, as used herein, mean "including but not limited to." While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

Various references and patents are disclosed herein, each of which are hereby incorporated by reference for the purpose that they are cited.

From the foregoing, it will be appreciated that various embodiments of the present disclosure have been described herein for purposes of illustration, and that various modifications can be made without departing from the scope and spirit of the present disclosure. Accordingly, the various embodiments disclosed herein are not intended to be limiting.

What is claimed is:

1. A coated particulate, wherein the coating comprises:
    an inner layer comprising a coating mixture of an alkoxylate or an alkoxylated alcohol and an acrylic polymer; and
    an outer layer comprising an amorphous polyalphaolefin.

2. The coated particulate of claim 1, wherein the coating further comprises fumed silica.

3. The coated particulate of claim 1, wherein the particulate is a sand particle, a bauxite particle or a ceramic particle.

4. The coated particulate of claim 1, wherein the alkoxylate has a formula of Formula I, II, III, IV, or V:

$R_aO-(AO)_z-H$ (I), wherein $R_a$ is aryl, or linear or branched $C_6$-$C_{24}$ alkyl, AO at each occurrence is independently ethyleneoxy, propyleneoxy, butyleneoxy, or random or block mixtures thereof, and z is from 1 to 50;

$R-O-(C_3H_6O)_x(C_2H_4O)_y-H$ (II), wherein x is a real number within a range of from 0.5 to 10; y is a real number within a range of from 2 to 20, and each R independently selected from the group consisting of two or more linear alkyl moieties each containing one or more linear alkyl group with an even number of carbon atoms from 4 to 20;

$R^1O-(CH_2CH(R^2)-O)_p-(CH_2CH_2O)_q-H$ (III), wherein $R^1$ is linear or branched $C_4$-$C_{18}$ alkyl; $R^2$ is $CH_3$ or $CH_3CH_2$; p is a real number from 0 to 11; and q is a real number from 1 to 20;

$R_a-O-(C_2H_4O)_m(C_4H_8O)_n-H$ (IV), wherein each $R_a$ is independently selected from the group consisting of one or more independently straight chain or branched alkyl groups or alkenyl groups having 3-22 carbon atoms, m is from 1 to 12, and n is from 1 to 8;

$C_4H_9O-(C_2H_4O)_r(C_3H_9O)_s(C_2H_4O)_t-H$ (V), wherein r is from 3-10, s is from 3 to 40, and t is from 10 to 45;

$R-O-(-CH-CH_3-CH_2-O-)_x-(-CH_2-CH_2-O-)_y-H$ (VI), wherein x is from 0.5 to 10, y is from 2 to 20, and each R is independently selected from the group consisting of a mixture of two or more linear alkyl moieties having an even number of carbon atoms between 4 and 20.

5. The coated particulate of claim 1, wherein the acrylic polymer comprises an aqueous dispersion of particles made from a copolymer, based on the weight of the copolymer, comprising:
   i) from 90 to 99.9 weight percent of at least one ethylenically unsaturated monomer not including component ii; and
   ii) from 0.1 to 10 weight percent of (meth)acrylamide.

6. The coated particulate of claim 1, wherein the acrylic polymer comprises an aqueous dispersion of particles made from a copolymer, based on the weight of the copolymer, comprising:
   i) from 80 to 99.9 weight percent of at least one ethylenically unsaturated monomer not including component ii; and
   ii) from 0.1 to 20 weight percent of a carboxylic acid monomer.

7. The coated particulate of claim 1, wherein the acrylic polymer comprises an aqueous dispersion of particles made from a copolymer, based on the weight of the copolymer, comprising:
   i) from 75 to 99 weight percent of at least one ethylenically unsaturated monomer not including component ii;
   ii) from 1 to 25 weight percent of an ethylenically unsaturated carboxylic acid monomer stabilized with a polyvalent metal.

8. The coated particulate of claim 5 wherein the ethylenically unsaturated monomer is (meth)acrylic acid.

9. The coated particulate of 7, wherein the polyvalent metal is zinc or calcium.

10. The coated particulate of claim 1 wherein the acrylic polymer comprises a vinyl aromatic diene copolymer.

11. The coated particulate of claim 1 wherein the % wt of coating is less than or equal to 1.0% wt of the particulate.

12. The coated particulate of claim 1, wherein the coated particulate is substantially free of a hydrogel.

13. A method of cleaning out a well bore comprising a coated particulate of claim 1, the method comprising injecting a gas into the well bore to suspend the coated particulates in the well bore and displacing the coated particulate from the well bore.

14. The method of claim 13, wherein the gas is air, nitrogen, carbon dioxide, or any combination thereof.

15. The method of claim 13, wherein the displacing comprises injecting a fluid into the well bore to displace the suspended particulates from the well bore.

16. A method of preparing coated particulates of claim 1, the method comprising mixing the particulates with:
   a) an alkoxylate or an alkoxylated alcohol and an acrylic polymer to coat the sand; and
   b) mix the coated sand of step a) with an amorphous polyalphaolefin to form the coated particulates with the coating comprising the inner layer comprising the coating mixture of the alkoxylate or the alkoxylated alcohol and the acrylic polymer and the outer layer comprising the amorphous polyalphaolefin.

17. The method of claim 16, further comprising mixing the particulate with fumed silica with the amorphous polyalphaolefin).

18. The method of claim 16, wherein the total weight of the alkoxylate or an alkoxylated alcohol and the acrylic polymer to the weight of the particulates is in a ratio of about 0.75:1000 to 1.25:1000.

19. The method of claim 16, wherein the total weight of the amorphous poly-alpha-olefin to the weight of the particulates is in a ratio of about 0.75:1000 to 3.00:1000.

20. The method of claim 16, further comprising:
   c) mixing the product of step b) with a second amorphous poly-alpha-olefin to produce the coated particulate.

21. The method of claim 20, wherein the second amorphous poly-alpha-olefin is the same or different than the amorphous poly-alpha-olefin of step b).

22. The method of claim 16, wherein the particulates are mixed with the alkoxylate or the alkoxylated alcohol, the acrylic polymer, and the amorphous poly-alpha-olefin for about 30 to about 180 seconds.

\* \* \* \* \*

UNITED STATES PATENT AND TRADEMARK OFFICE
CERTIFICATE OF CORRECTION

PATENT NO. : 9,862,881 B2  
APPLICATION NO. : 15/073840  
DATED : January 9, 2018  
INVENTOR(S) : Kerry Drake et al.

Page 1 of 1

It is certified that error appears in the above-identified patent and that said Letters Patent is hereby corrected as shown below:

Column 82 Lines 3-4 Claim 9 should read:  
The coated particulate of claim 7, wherein the polyvalent metal is zinc or calcium.

Signed and Sealed this  
Eighth Day of May, 2018

Andrei Iancu  
*Director of the United States Patent and Trademark Office*